(12) United States Patent
Vorbach et al.

(10) Patent No.: US 7,996,827 B2
(45) Date of Patent: Aug. 9, 2011

(54) METHOD FOR THE TRANSLATION OF PROGRAMS FOR RECONFIGURABLE ARCHITECTURES

(76) Inventors: Martin Vorbach, Munich (DE); May Frank, Munich (DE); Armin Nückel, Neupotz (DE)

( * ) Notice: Subject to any disclaimer, the term of this patent is extended or adjusted under 35 U.S.C. 154(b) by 1041 days.

(21) Appl. No.: 10/486,771

(22) PCT Filed: Aug. 16, 2002

(86) PCT No.: PCT/EP02/10065
§ 371 (c)(1),
(2), (4) Date: Sep. 20, 2004

(87) PCT Pub. No.: WO03/017095
PCT Pub. Date: Feb. 27, 2003

(65) Prior Publication Data
US 2005/0086649 A1 Apr. 21, 2005

(30) Foreign Application Priority Data

| Aug. 16, 2001 | (DE) | 101 39 170 |
|---|---|---|
| Sep. 3, 2001 | (DE) | 101 42 903 |
| Sep. 11, 2001 | (DE) | 101 44 732 |
| Sep. 17, 2001 | (DE) | 101 45 792 |
| Nov. 5, 2001 | (DE) | 101 54 260 |
| Feb. 21, 2002 | (DE) | 102 07 225 |
| Mar. 5, 2002 | (EP) | PCT/EP02/02398 |
| Aug. 15, 2002 | (EP) | PCT/EP02/09131 |

(51) Int. Cl.
*G06F 9/45* (2006.01)
*G06F 9/44* (2006.01)
(52) U.S. Cl. .......... 717/149; 717/121; 717/161
(58) Field of Classification Search .......... 717/100, 717/101, 149, 148, 176; 712/28–30, 36, 712/37, 38
See application file for complete search history.

(56) References Cited

U.S. PATENT DOCUMENTS

| 2,067,477 A | 1/1937 | Cooper |
|---|---|---|
| 3,242,998 A | 3/1966 | Gubbins |
| 3,681,578 A | 8/1972 | Stevens |
| 3,753,008 A | 8/1973 | Guarnaschelli |
| 3,757,608 A | 9/1973 | Willner |
| 3,855,577 A | 12/1974 | Vandierendonck |
| 4,151,611 A | 4/1979 | Sugawara et al. |
| 4,233,667 A | 11/1980 | Devine et al. |

(Continued)

FOREIGN PATENT DOCUMENTS
AO 100 28 397 12/2001
(Continued)

OTHER PUBLICATIONS

"Generation of very large circuits to benchmark the partitioning of FPGA", Pistorius et al., Apr. 1999, pp. 67-73, <http://delivery.acm.org/10.1145/310000/300026/p67-pistorius.pdf>.*

(Continued)

*Primary Examiner* — Thuy Dao
(74) *Attorney, Agent, or Firm* — Kenyon & Kenyon LLP

(57) ABSTRACT

A method for advantageously translating high-level language codes for data processing using a reconfigurable architecture, memories addressable internally from within said reconfigurable architecture, and memories external to said reconfigurable architecture, may include constructing a finite automaton for computation in such a way that a complex combinatory network of individual functions is formed, assigning memories to the network for storage of operands and results, and separating external memory accesses for providing a transfer of at least one of operands and results as data from an external memory to a memory addressable internally by the reconfigurable architecture.

80 Claims, 9 Drawing Sheets

U.S. PATENT DOCUMENTS

| | | | |
|---|---|---|---|
| 4,414,547 A | 11/1983 | Knapp et al. | |
| 4,498,134 A | 2/1985 | Hansen et al. | |
| 4,498,172 A | 2/1985 | Bhavsar | |
| 4,566,102 A | 1/1986 | Hefner | |
| 4,571,736 A | 2/1986 | Agrawal et al. | |
| 4,590,583 A | 5/1986 | Miller | |
| 4,591,979 A | 5/1986 | Iwashita | |
| 4,594,682 A | 6/1986 | Drimak | |
| 4,623,997 A | 11/1986 | Tulpule | |
| 4,663,706 A | 5/1987 | Allen et al. | |
| 4,667,190 A | 5/1987 | Fant et al. | |
| 4,682,284 A | 7/1987 | Schrofer | |
| 4,686,386 A | 8/1987 | Tadao | |
| 4,706,216 A | 11/1987 | Carter | |
| 4,720,778 A | 1/1988 | Hall et al. | |
| 4,720,780 A | 1/1988 | Dolecek | |
| 4,739,474 A | 4/1988 | Holsztynski | |
| 4,761,755 A | 8/1988 | Ardini et al. | |
| 4,791,603 A | 12/1988 | Henry | |
| 4,811,214 A | 3/1989 | Nosenchuck et al. | |
| 4,852,043 A | 7/1989 | Guest | |
| 4,852,048 A | 7/1989 | Morton | |
| 4,860,201 A | 8/1989 | Miranker et al. | |
| 4,870,302 A | 9/1989 | Freeman | |
| 4,882,687 A | 11/1989 | Gordon | |
| 4,884,231 A | 11/1989 | Mor et al. | |
| 4,891,810 A | 1/1990 | de Corlieu et al. | |
| 4,901,268 A | 2/1990 | Judd | |
| 4,910,665 A | 3/1990 | Mattheyses et al. | |
| 4,918,440 A | 4/1990 | Furtek et al. | |
| 4,959,781 A | 9/1990 | Rubenstein et al. | |
| 4,967,340 A | 10/1990 | Dawes | |
| 4,972,314 A | 11/1990 | Getzinger et al. | |
| 4,992,933 A | 2/1991 | Taylor | |
| 5,010,401 A | 4/1991 | Murakami et al. | |
| 5,014,193 A | 5/1991 | Garner et al. | |
| 5,015,884 A | 5/1991 | Agrawal et al. | |
| 5,021,947 A | 6/1991 | Campbell et al. | |
| 5,023,775 A | 6/1991 | Poret | |
| 5,034,914 A | 7/1991 | Osterlund | |
| 5,036,473 A | 7/1991 | Butts et al. | |
| 5,036,493 A | 7/1991 | Nielsen | |
| 5,041,924 A | 8/1991 | Blackborow et al. | |
| 5,043,978 A | 8/1991 | Nagler et al. | |
| 5,047,924 A | 9/1991 | Matsubara et al. | |
| 5,055,997 A | 10/1991 | Sluijter et al. | |
| 5,065,308 A | 11/1991 | Evans | |
| 5,072,178 A | 12/1991 | Matsumoto | |
| 5,076,482 A | 12/1991 | Kozyrski | |
| 5,081,375 A | 1/1992 | Pickett et al. | |
| 5,099,447 A | 3/1992 | Myszewski | |
| 5,103,311 A | 4/1992 | Sluijter et al. | |
| 5,109,503 A | 4/1992 | Cruickshank et al. | |
| 5,113,498 A | 5/1992 | Evan et al. | |
| 5,115,510 A | 5/1992 | Okamoto et al. | |
| 5,123,109 A | 6/1992 | Hillis | |
| 5,125,801 A | 6/1992 | Nabity et al. | |
| 5,128,559 A | 7/1992 | Steele | |
| 5,142,469 A | 8/1992 | Weisenborn | |
| 5,144,166 A | 9/1992 | Camarota et al. | |
| 5,193,202 A | 3/1993 | Lee et al. | |
| 5,203,005 A | 4/1993 | Horst | |
| 5,204,935 A | 4/1993 | Mihara et al. | |
| 5,208,491 A | 5/1993 | Ebeling et al. | |
| 5,212,716 A | 5/1993 | Ferraiolo et al. | |
| 5,212,777 A | 5/1993 | Gove et al. | |
| 5,218,302 A | 6/1993 | Loewe et al. | |
| 5,226,122 A | 7/1993 | Thayer et al. | |
| RE34,363 E | 8/1993 | Freeman | |
| 5,233,539 A | 8/1993 | Agrawal et al. | |
| 5,237,686 A | 8/1993 | Asano et al. | |
| 5,243,238 A | 9/1993 | Kean | |
| 5,247,689 A | 9/1993 | Ewert | |
| RE34,444 E | 11/1993 | Kaplinsky | |
| 5,274,593 A | 12/1993 | Proebsting | |
| 5,276,836 A | 1/1994 | Fukumaru et al. | |
| 5,287,472 A | 2/1994 | Horst | |
| 5,287,511 A | 2/1994 | Robinson et al. | |
| 5,287,532 A | 2/1994 | Hunt | |
| 5,294,119 A | 3/1994 | Vincent et al. | |
| 5,301,284 A | 4/1994 | Estes et al. | |
| 5,301,344 A | 4/1994 | Kolchinsky | |
| 5,303,172 A | 4/1994 | Magar et al. | |
| 5,311,079 A | 5/1994 | Ditlow et al. | |
| 5,327,125 A | 7/1994 | Iwase et al. | |
| 5,336,950 A | 8/1994 | Popli et al. | |
| 5,343,406 A | 8/1994 | Freeman et al. | |
| 5,347,639 A | 9/1994 | Rechtschaffen et al. | |
| 5,349,193 A | 9/1994 | Mott et al. | |
| 5,353,432 A | 10/1994 | Richek et al. | |
| 5,355,508 A | 10/1994 | Kan | |
| 5,361,373 A | 11/1994 | Gilson | |
| 5,365,125 A | 11/1994 | Goetting et al. | |
| 5,379,444 A | 1/1995 | Mumme | |
| 5,386,154 A | 1/1995 | Goetting et al. | |
| 5,386,518 A | 1/1995 | Reagle et al. | |
| 5,392,437 A | 2/1995 | Matter et al. | |
| 5,408,643 A | 4/1995 | Katayose | |
| 5,410,723 A | 4/1995 | Schmidt et al. | |
| 5,412,795 A | 5/1995 | Larson | |
| 5,418,952 A | 5/1995 | Morley et al. | |
| 5,418,953 A | 5/1995 | Hunt et al. | |
| 5,421,019 A | 5/1995 | Holsztynski et al. | |
| 5,422,823 A | 6/1995 | Agrawal et al. | |
| 5,425,036 A | 6/1995 | Liu et al. | |
| 5,426,378 A | 6/1995 | Ong | |
| 5,428,526 A | 6/1995 | Flood et al. | |
| 5,430,687 A | 7/1995 | Hung et al. | |
| 5,440,245 A | 8/1995 | Galbraith et al. | |
| 5,440,538 A | 8/1995 | Olsen et al. | |
| 5,442,790 A | 8/1995 | Nosenchuck | |
| 5,444,394 A | 8/1995 | Watson et al. | |
| 5,448,186 A | 9/1995 | Kawata | |
| 5,450,022 A | 9/1995 | New | |
| 5,455,525 A | 10/1995 | Ho et al. | |
| 5,457,644 A | 10/1995 | McCollum | |
| 5,465,375 A | 11/1995 | Thepaut et al. | |
| 5,469,003 A | 11/1995 | Kean | |
| 5,473,266 A | 12/1995 | Ahanin et al. | |
| 5,473,267 A | 12/1995 | Stansfield | |
| 5,475,583 A | 12/1995 | Bock et al. | |
| 5,475,803 A | 12/1995 | Stearns et al. | |
| 5,475,856 A | 12/1995 | Kogge | |
| 5,477,525 A | 12/1995 | Okabe | |
| 5,483,620 A | 1/1996 | Pechanek et al. | |
| 5,485,103 A | 1/1996 | Pedersen et al. | |
| 5,485,104 A | 1/1996 | Agrawal et al. | |
| 5,489,857 A | 2/1996 | Agrawal et al. | |
| 5,491,353 A | 2/1996 | Kean | |
| 5,493,239 A | 2/1996 | Zlotnick | |
| 5,497,498 A | 3/1996 | Taylor | |
| 5,504,439 A | 4/1996 | Tavana | |
| 5,506,998 A | 4/1996 | Kato et al. | |
| 5,510,730 A | 4/1996 | El Gamal et al. | |
| 5,511,173 A | 4/1996 | Yamaura et al. | |
| 5,513,366 A | 4/1996 | Agarwal et al. | |
| 5,521,837 A | 5/1996 | Frankle et al. | |
| 5,522,083 A | 5/1996 | Gove et al. | |
| 5,525,971 A | 6/1996 | Flynn | |
| 5,530,873 A | 6/1996 | Takano | |
| 5,530,946 A | 6/1996 | Bouvier et al. | |
| 5,532,693 A | 7/1996 | Winters et al. | |
| 5,532,957 A | 7/1996 | Malhi | |
| 5,535,406 A | 7/1996 | Kolchinsky | |
| 5,537,057 A | 7/1996 | Leong et al. | |
| 5,537,580 A | 7/1996 | Giomi et al. | |
| 5,537,601 A | 7/1996 | Kimura et al. | |
| 5,541,530 A | 7/1996 | Cliff et al. | |
| 5,544,336 A | 8/1996 | Kato et al. | |
| 5,548,773 A | 8/1996 | Kemeny et al. | |
| 5,550,782 A | 8/1996 | Cliff et al. | |
| 5,555,434 A | 9/1996 | Carlstedt | |
| 5,559,450 A | 9/1996 | Ngai et al. | |
| 5,561,738 A | 10/1996 | Kinerk et al. | |
| 5,568,624 A | 10/1996 | Sites et al. | |
| 5,570,040 A | 10/1996 | Lytle et al. | |

| Patent | Date | Inventor |
|---|---|---|
| 5,572,710 A | 11/1996 | Asano et al. |
| 5,574,930 A | 11/1996 | Halverson, Jr. et al. |
| 5,581,731 A | 12/1996 | King et al. |
| 5,581,734 A | 12/1996 | DiBrino et al. |
| 5,583,450 A | 12/1996 | Trimberger et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Phillips et al. |
| 5,596,742 A | 1/1997 | Agarwal et al. |
| 5,600,265 A | 2/1997 | El Gamal Abbas et al. |
| 5,600,597 A | 2/1997 | Kean et al. |
| 5,600,845 A | 2/1997 | Gilson |
| 5,606,698 A | 2/1997 | Powell |
| 5,608,342 A | 3/1997 | Trimberger |
| 5,611,049 A | 3/1997 | Pitts |
| 5,617,547 A | 4/1997 | Feeney et al. |
| 5,617,577 A | 4/1997 | Barker et al. |
| 5,619,720 A | 4/1997 | Garde et al. |
| 5,625,806 A | 4/1997 | Kromer |
| 5,625,836 A | 4/1997 | Barker et al. |
| 5,627,992 A | 5/1997 | Baror |
| 5,634,131 A | 5/1997 | Matter et al. |
| 5,635,851 A | 6/1997 | Tavana |
| 5,642,058 A | 6/1997 | Trimberger et al. |
| 5,646,544 A | 7/1997 | Iadanza |
| 5,646,545 A | 7/1997 | Trimberger et al. |
| 5,649,176 A | 7/1997 | Selvidge et al. |
| 5,649,179 A | 7/1997 | Steenstra et al. |
| 5,652,529 A | 7/1997 | Gould et al. |
| 5,652,894 A | 7/1997 | Hu et al. |
| 5,655,069 A | 8/1997 | Ogawara et al. |
| 5,655,124 A | 8/1997 | Lin |
| 5,656,950 A | 8/1997 | Duong et al. |
| 5,657,330 A | 8/1997 | Matsumoto |
| 5,659,785 A | 8/1997 | Pechanek et al. |
| 5,659,797 A | 8/1997 | Zandveld et al. |
| 5,675,262 A | 10/1997 | Doung et al. |
| 5,675,743 A | 10/1997 | Mavity |
| 5,675,757 A | 10/1997 | Davidson et al. |
| 5,680,583 A | 10/1997 | Kuijsten |
| 5,682,491 A | 10/1997 | Pechanek et al. |
| 5,687,325 A | 11/1997 | Chang |
| 5,694,602 A | 12/1997 | Smith |
| 5,696,791 A | 12/1997 | Yeung |
| 5,696,976 A | 12/1997 | Nizar et al. |
| 5,701,091 A | 12/1997 | Kean |
| 5,705,938 A | 1/1998 | Kean |
| 5,706,482 A | 1/1998 | Matsushima et al. |
| 5,713,037 A | 1/1998 | Wilkinson et al. |
| 5,717,943 A | 2/1998 | Barker et al. |
| 5,732,209 A | 3/1998 | Vigil et al. |
| 5,734,869 A | 3/1998 | Chen |
| 5,734,921 A | 3/1998 | Dapp et al. |
| 5,737,516 A | 4/1998 | Circello et al. |
| 5,737,565 A | 4/1998 | Mayfield |
| 5,742,180 A | 4/1998 | Detton et al. |
| 5,745,734 A | 4/1998 | Craft et al. |
| 5,748,872 A | 5/1998 | Norman |
| 5,748,979 A | 5/1998 | Trimberger |
| 5,752,035 A | 5/1998 | Trimberger |
| 5,754,459 A | 5/1998 | Telikepalli |
| 5,754,820 A | 5/1998 | Yamagami |
| 5,754,827 A | 5/1998 | Barbier et al. |
| 5,754,871 A | 5/1998 | Wilkinson et al. |
| 5,760,602 A | 6/1998 | Tan |
| 5,761,484 A | 6/1998 | Agarwal et al. |
| 5,773,994 A | 6/1998 | Jones |
| 5,778,439 A | 7/1998 | Trimberger et al. |
| 5,781,756 A | 7/1998 | Hung |
| 5,784,636 A | 7/1998 | Rupp |
| 5,794,059 A | 8/1998 | Barker et al. |
| 5,794,062 A | 8/1998 | Baxter |
| 5,801,547 A | 9/1998 | Kean |
| 5,801,715 A | 9/1998 | Norman |
| 5,801,958 A | 9/1998 | Dangelo et al. |
| 5,802,290 A | 9/1998 | Casselman |
| 5,804,986 A | 9/1998 | Jones |
| 5,815,004 A | 9/1998 | Trimberger et al. |
| 5,815,715 A | 9/1998 | Kayhan |
| 5,815,726 A | 9/1998 | Cliff |
| 5,821,774 A | 10/1998 | Veytsman et al. |
| 5,828,229 A | 10/1998 | Cliff et al. |
| 5,828,858 A | 10/1998 | Athanas et al. |
| 5,831,448 A | 11/1998 | Kean |
| 5,838,165 A | 11/1998 | Chatter |
| 5,841,973 A | 11/1998 | Kessler et al. |
| 5,844,422 A | 12/1998 | Trimberger et al. |
| 5,844,888 A | 12/1998 | Markkula, Jr. et al. |
| 5,848,238 A | 12/1998 | Shimomura et al. |
| 5,854,918 A | 12/1998 | Baxter |
| 5,857,097 A | 1/1999 | Henzinger et al. |
| 5,857,109 A | 1/1999 | Taylor |
| 5,859,544 A | 1/1999 | Norman |
| 5,860,119 A | 1/1999 | Dockser |
| 5,862,403 A | 1/1999 | Kanai et al. |
| 5,865,239 A | 2/1999 | Carr |
| 5,867,691 A | 2/1999 | Shiraishi |
| 5,867,723 A | 2/1999 | Peters et al. |
| 5,870,620 A | 2/1999 | Kadosumi et al. |
| 5,884,075 A | 3/1999 | Hester et al. |
| 5,887,162 A | 3/1999 | Williams et al. |
| 5,887,165 A | 3/1999 | Martel et al. |
| 5,889,533 A | 3/1999 | Lee |
| 5,889,982 A | 3/1999 | Rodgers et al. |
| 5,892,370 A | 4/1999 | Eaton et al. |
| 5,892,961 A | 4/1999 | Trimberger |
| 5,892,962 A | 4/1999 | Cloutier |
| 5,894,565 A | 4/1999 | Furtek et al. |
| 5,901,279 A | 5/1999 | Davis, III |
| 5,915,123 A | 6/1999 | Mirsky et al. |
| 5,924,119 A | 7/1999 | Sindhu et al. |
| 5,926,638 A | 7/1999 | Inoue |
| 5,927,423 A | 7/1999 | Wada et al. |
| 5,933,023 A | 8/1999 | Young |
| 5,933,642 A | 8/1999 | Baxter et al. |
| 5,936,424 A | 8/1999 | Young et al. |
| 5,943,242 A | 8/1999 | Vorbach et al. |
| 5,956,518 A | 9/1999 | DeHon et al. |
| 5,960,193 A | 9/1999 | Guttag et al. |
| 5,960,200 A | 9/1999 | Eager et al. |
| 5,966,143 A | 10/1999 | Breternitz, Jr. |
| 5,966,534 A | 10/1999 | Cooke et al. |
| 5,970,254 A | 10/1999 | Cooke et al. |
| 5,978,260 A | 11/1999 | Trimberger et al. |
| 5,978,583 A | 11/1999 | Ekanadham et al. |
| 5,996,048 A | 11/1999 | Cherabuddi et al. |
| 5,996,083 A | 11/1999 | Gupta et al. |
| 5,999,990 A | 12/1999 | Sharrit et al. |
| 6,003,143 A | 12/1999 | Kim et al. |
| 6,011,407 A | 1/2000 | New |
| 6,014,509 A | 1/2000 | Furtek et al. |
| 6,020,758 A | 2/2000 | Patel et al. |
| 6,020,760 A | 2/2000 | Sample et al. |
| 6,021,490 A | 2/2000 | Vorbach et al. |
| 6,023,564 A | 2/2000 | Trimberger |
| 6,023,742 A | 2/2000 | Ebeling et al. |
| 6,026,481 A | 2/2000 | New et al. |
| 6,034,538 A | 3/2000 | Abramovici |
| 6,035,371 A | 3/2000 | Magloire |
| 6,038,650 A | 3/2000 | Vorbach et al. |
| 6,038,656 A | 3/2000 | Cummings et al. |
| 6,044,030 A | 3/2000 | Zheng et al. |
| 6,047,115 A | 4/2000 | Mohan et al. |
| 6,049,222 A | 4/2000 | Lawman |
| 6,049,866 A | 4/2000 | Earl |
| 6,052,773 A | 4/2000 | DeHon et al. |
| 6,054,873 A | 4/2000 | Laramie |
| 6,055,619 A | 4/2000 | North et al. |
| 6,058,469 A | 5/2000 | Baxter |
| 6,076,157 A | 6/2000 | Borkenhagen et al. |
| 6,077,315 A | 6/2000 | Greenbaum et al. |
| 6,078,736 A | 6/2000 | Guccione |
| 6,081,903 A | 6/2000 | Vorbach et al. |
| 6,084,429 A | 7/2000 | Trimberger |
| 6,085,317 A | 7/2000 | Smith |
| 6,086,628 A | 7/2000 | Dave et al. |

| | | |
|---|---|---|
| 6,088,795 A | 7/2000 | Vorbach et al. |
| 6,092,174 A | 7/2000 | Roussakov |
| 6,105,105 A | 8/2000 | Trimberger et al. |
| 6,105,106 A | 8/2000 | Manning |
| 6,108,760 A | 8/2000 | Mirsky et al. |
| 6,118,724 A | 9/2000 | Higginbottom |
| 6,119,181 A | 9/2000 | Vorbach et al. |
| 6,122,719 A | 9/2000 | Mirsky et al. |
| 6,125,408 A | 9/2000 | McGee et al. |
| 6,127,908 A | 10/2000 | Bozler et al. |
| 6,128,720 A | 10/2000 | Pechanek et al. |
| 6,134,166 A | 10/2000 | Lytle et al. |
| 6,137,307 A | 10/2000 | Iwanczuk et al. |
| 6,435,054 B1 * | 10/2000 | Nguyen |
| 6,145,072 A | 11/2000 | Shams et al. |
| 6,150,837 A | 11/2000 | Beal et al. |
| 6,150,839 A | 11/2000 | New et al. |
| 6,154,048 A | 11/2000 | Iwanczuk et al. |
| 6,154,049 A | 11/2000 | New |
| 6,157,214 A | 12/2000 | Marshall |
| 6,170,051 B1 | 1/2001 | Dowling |
| 6,172,520 B1 | 1/2001 | Lawman et al. |
| 6,173,419 B1 | 1/2001 | Barnett |
| 6,173,434 B1 | 1/2001 | Wirthlin et al. |
| 6,178,494 B1 | 1/2001 | Casselman |
| 6,185,256 B1 | 2/2001 | Saito et al. |
| 6,185,731 B1 | 2/2001 | Maeda et al. |
| 6,188,240 B1 | 2/2001 | Nakaya |
| 6,188,650 B1 | 2/2001 | Hamada et al. |
| 6,198,304 B1 | 3/2001 | Sasaki |
| 6,201,406 B1 | 3/2001 | Iwanczuk et al. |
| 6,202,182 B1 | 3/2001 | Abramovici et al. |
| 6,204,687 B1 | 3/2001 | Schultz et al. |
| 6,211,697 B1 | 4/2001 | Lien et al. |
| 6,212,544 B1 | 4/2001 | Borkenhagen et al. |
| 6,212,650 B1 | 4/2001 | Guccione |
| 6,215,326 B1 | 4/2001 | Jefferson et al. |
| 6,216,223 B1 * | 4/2001 | Revilla et al. ............... 712/245 |
| 6,219,833 B1 * | 4/2001 | Solomon et al. ............. 717/149 |
| RE37,195 E | 5/2001 | Kean |
| 6,230,307 B1 * | 5/2001 | Davis et al. |
| 6,240,502 B1 | 5/2001 | Panwar et al. |
| 6,243,808 B1 | 6/2001 | Wang |
| 6,247,147 B1 | 6/2001 | Beenstra et al. |
| 6,252,792 B1 | 6/2001 | Marshall et al. |
| 6,256,724 B1 * | 7/2001 | Hocevar et al. |
| 6,260,114 B1 | 7/2001 | Schug |
| 6,260,179 B1 | 7/2001 | Ohsawa et al. |
| 6,262,908 B1 | 7/2001 | Marshall et al. |
| 6,263,430 B1 | 7/2001 | Trimberger et al. |
| 6,266,760 B1 * | 7/2001 | DeHon et al. .................. 712/15 |
| 6,279,077 B1 | 8/2001 | Nasserbakht et al. |
| 6,282,627 B1 | 8/2001 | Wong et al. |
| 6,282,701 B1 * | 8/2001 | Wygodny et al. |
| 6,285,624 B1 | 9/2001 | Chen |
| 6,286,134 B1 * | 9/2001 | Click et al. .................... 717/138 |
| 6,288,566 B1 | 9/2001 | Hanrahan et al. |
| 6,289,440 B1 | 9/2001 | Casselman |
| 6,298,396 B1 | 10/2001 | Loyer et al. |
| 6,298,472 B1 | 10/2001 | Phillips et al. |
| 6,301,706 B1 * | 10/2001 | Maslennikov et al. |
| 6,311,200 B1 | 10/2001 | Hanrahan et al. |
| 6,311,265 B1 | 10/2001 | Beckerle et al. |
| 6,321,366 B1 | 11/2001 | Tseng et al. |
| 6,321,373 B1 * | 11/2001 | Ekanadham et al. |
| 6,338,106 B1 | 1/2002 | Vorbach et al. |
| 6,339,840 B1 * | 1/2002 | Kothari et al. ............... 717/149 |
| 6,341,318 B1 | 1/2002 | Dakhil |
| 6,347,346 B1 | 2/2002 | Taylor |
| 6,349,346 B1 | 2/2002 | Hanrahan et al. |
| 6,353,841 B1 | 3/2002 | Marshall et al. |
| 6,362,650 B1 | 3/2002 | New et al. |
| 6,370,596 B1 | 4/2002 | Dakhil |
| 6,373,779 B1 | 4/2002 | Pang et al. |
| 6,374,286 B1 | 4/2002 | Gee |
| 6,378,068 B1 | 4/2002 | Foster et al. |
| 6,381,624 B1 | 4/2002 | Colon-Bonet et al. |
| 6,389,379 B1 | 5/2002 | Lin et al. |
| 6,389,579 B1 | 5/2002 | Phillips et al. |
| 6,392,912 B1 | 5/2002 | Hanrahan et al. |
| 6,398,383 B1 * | 6/2002 | Huang |
| 6,400,601 B1 | 6/2002 | Sudo et al. |
| 6,404,224 B1 * | 6/2002 | Azegami et al. |
| 6,405,185 B1 | 6/2002 | Pechanek et al. |
| 6,405,299 B1 | 6/2002 | Vorbach et al. |
| 6,421,808 B1 | 7/2002 | McGeer |
| 6,421,809 B1 * | 7/2002 | Wuytack et al. |
| 6,421,817 B1 | 7/2002 | Mohan et al. |
| 6,425,054 B1 * | 7/2002 | Nguyen |
| 6,425,068 B1 | 7/2002 | Vorbach et al. |
| 6,426,649 B1 | 7/2002 | Fu et al. |
| 6,427,156 B1 | 7/2002 | Chapman et al. |
| 6,430,309 B1 | 8/2002 | Pressman et al. |
| 6,434,642 B1 | 8/2002 | Camilleri et al. |
| 6,434,672 B1 | 8/2002 | Gaither |
| 6,434,695 B1 | 8/2002 | Esfahani et al. |
| 6,434,699 B1 * | 8/2002 | Jones et al. |
| 6,437,441 B1 * | 8/2002 | Yamamoto |
| 6,438,747 B1 | 8/2002 | Schreiber et al. |
| 6,457,116 B1 | 9/2002 | Mirsky et al. |
| 6,476,634 B1 * | 11/2002 | Bilski |
| 6,477,643 B1 | 11/2002 | Vorbach et al. |
| 6,480,937 B1 | 11/2002 | Vorbach et al. |
| 6,480,954 B2 | 11/2002 | Trimberger et al. |
| 6,483,343 B1 | 11/2002 | Faith et al. |
| 6,487,709 B1 | 11/2002 | Keller et al. |
| 6,490,695 B1 * | 12/2002 | Zagorski et al. |
| 6,496,902 B1 | 12/2002 | Faanes et al. |
| 6,496,971 B1 * | 12/2002 | Lesea et al. |
| 6,504,398 B1 * | 1/2003 | Lien et al. |
| 6,507,898 B1 | 1/2003 | Gibson et al. |
| 6,507,947 B1 * | 1/2003 | Schreiber et al. ............. 717/160 |
| 6,512,804 B1 | 1/2003 | Johnson et al. |
| 6,513,077 B2 | 1/2003 | Vorbach et al. |
| 6,516,382 B2 | 2/2003 | Manning |
| 6,518,787 B1 | 2/2003 | Allegrucci et al. |
| 6,519,674 B1 * | 2/2003 | Lam et al. |
| 6,523,107 B1 | 2/2003 | Stansfield et al. |
| 6,525,678 B1 * | 2/2003 | Veenstra et al. |
| 6,526,520 B1 * | 2/2003 | Vorbach et al. |
| 6,538,468 B1 * | 3/2003 | Moore |
| 6,538,470 B1 | 3/2003 | Langhammer et al. |
| 6,539,415 B1 | 3/2003 | Mercs |
| 6,539,438 B1 | 3/2003 | Ledzius et al. |
| 6,539,477 B1 * | 3/2003 | Seawright |
| 6,542,394 B2 | 4/2003 | Marshall et al. |
| 6,542,844 B1 | 4/2003 | Hanna |
| 6,542,998 B1 * | 4/2003 | Vorbach et al. |
| 6,553,395 B2 | 4/2003 | Marshall et al. |
| 6,553,479 B2 | 4/2003 | Mirsky et al. |
| 6,567,834 B1 | 5/2003 | Marshall et al. |
| 6,571,381 B1 | 5/2003 | Vorbach et al. |
| 6,587,939 B1 * | 7/2003 | Takano |
| 6,598,128 B1 | 7/2003 | Yoshioka |
| 6,606,704 B1 | 8/2003 | Adiletta et al. |
| 6,624,819 B1 | 9/2003 | Lewis |
| 6,631,487 B1 | 10/2003 | Abramovici et al. |
| 6,633,181 B1 * | 10/2003 | Rupp |
| 6,657,457 B1 * | 12/2003 | Hanrahan et al. |
| 6,658,564 B1 | 12/2003 | Smith et al. |
| 6,665,758 B1 | 12/2003 | Frazier et al. |
| 6,668,237 B1 | 12/2003 | Guccione et al. |
| 6,681,388 B1 * | 1/2004 | Sato et al. ..................... 717/159 |
| 6,687,788 B2 * | 2/2004 | Vorbach et al. |
| 6,697,979 B1 * | 2/2004 | Vorbach et al. |
| 6,704,816 B1 | 3/2004 | Burke |
| 6,708,325 B2 | 3/2004 | Cooke et al. |
| 6,717,436 B2 * | 4/2004 | Kress et al. |
| 6,721,830 B2 | 4/2004 | Vorbach et al. |
| 6,725,334 B2 | 4/2004 | Barroso et al. |
| 6,728,871 B1 | 4/2004 | Vorbach et al. |
| 6,745,317 B1 | 6/2004 | Mirsky et al. |
| 6,748,440 B1 | 6/2004 | Lisitsa et al. |
| 6,751,722 B2 | 6/2004 | Mirsky et al. |
| 6,754,805 B1 | 6/2004 | Juan |
| 6,757,847 B1 | 6/2004 | Farkash et al. |
| 6,757,892 B1 | 6/2004 | Gokhale et al. |
| 6,782,445 B1 * | 8/2004 | Olgiati et al. ................. 711/100 |

| | | |
|---|---|---|
| 6,785,826 B1 | 8/2004 | Durham et al. |
| 6,802,026 B1 | 10/2004 | Patterson et al. |
| 6,803,787 B1* | 10/2004 | Wicker, Jr. |
| 6,820,188 B2 | 11/2004 | Stansfield et al. |
| 6,829,697 B1 | 12/2004 | Davis et al. |
| 6,836,842 B1 | 12/2004 | Guccione et al. |
| 6,847,370 B2 | 1/2005 | Baldwin et al. |
| 6,868,476 B2 | 3/2005 | Rosenbluth |
| 6,871,341 B1 | 3/2005 | Shyr |
| 6,874,108 B1 | 3/2005 | Abramovici et al. |
| 6,886,092 B1* | 4/2005 | Douglass et al. |
| 6,901,502 B2* | 5/2005 | Yano et al. |
| 6,928,523 B2* | 8/2005 | Yamada |
| 6,961,924 B2* | 11/2005 | Bates et al. |
| 6,975,138 B2 | 12/2005 | Pani et al. |
| 6,977,649 B1 | 12/2005 | Baldwin et al. |
| 7,000,161 B1 | 2/2006 | Allen et al. |
| 7,007,096 B1 | 2/2006 | Lisitsa et al. |
| 7,010,667 B2 | 3/2006 | Vorbach et al. |
| 7,028,107 B2 | 4/2006 | Vorbach et al. |
| 7,036,114 B2* | 4/2006 | McWilliams et al. ........ 717/149 |
| 7,038,952 B1 | 5/2006 | Zack et al. |
| 7,043,416 B1 | 5/2006 | Lin |
| 7,210,129 B2* | 4/2007 | May et al. .................... 717/136 |
| 7,216,204 B2 | 5/2007 | Rosenbluth |
| 7,237,087 B2* | 6/2007 | Vorbach et al. |
| 7,249,351 B1 | 7/2007 | Songer et al. |
| 7,254,649 B2 | 8/2007 | Subramanian et al. |
| 7,340,596 B1 | 3/2008 | Crosland et al. |
| 7,346,644 B1 | 3/2008 | Langhammer et al. |
| 7,350,178 B1 | 3/2008 | Crosland et al. |
| 7,382,156 B2 | 6/2008 | Pani et al. |
| 7,595,659 B2 | 9/2009 | Vorbach et al. |
| 7,650,448 B2 | 1/2010 | Vorbach et al. |
| 7,657,877 B2* | 2/2010 | Vorbach et al. ............. 717/141 |
| 7,759,968 B1 | 7/2010 | Hussein et al. |
| 2001/0001860 A1 | 5/2001 | Bieu |
| 2001/0003834 A1 | 6/2001 | Shimonishi |
| 2001/0010074 A1 | 7/2001 | Nishihara et al. |
| 2001/0018733 A1 | 8/2001 | Fujii et al. |
| 2001/0032305 A1* | 10/2001 | Barry |
| 2002/0010853 A1 | 1/2002 | Trimberger et al. |
| 2002/0013861 A1 | 1/2002 | Adiletta et al. |
| 2002/0038414 A1* | 3/2002 | Taylor et al. |
| 2002/0045952 A1 | 4/2002 | Blemel |
| 2002/0073282 A1 | 6/2002 | Chauvel et al. |
| 2002/0083308 A1* | 6/2002 | Pereira et al. |
| 2002/0099759 A1 | 7/2002 | Gootherts |
| 2002/0103839 A1* | 8/2002 | Ozawa |
| 2002/0124238 A1 | 9/2002 | Metzgen |
| 2002/0138716 A1* | 9/2002 | Master et al. |
| 2002/0143505 A1* | 10/2002 | Drusinsky |
| 2002/0144229 A1* | 10/2002 | Hanrahan |
| 2002/0152060 A1* | 10/2002 | Tseng ............................. 703/17 |
| 2002/0156962 A1 | 10/2002 | Chopra et al. |
| 2002/0165886 A1* | 11/2002 | Lam |
| 2003/0001615 A1 | 1/2003 | Sueyoshi et al. |
| 2003/0014743 A1* | 1/2003 | Cooke et al. .................. 717/161 |
| 2003/0046607 A1* | 3/2003 | Vorbach et al. |
| 2003/0052711 A1* | 3/2003 | Taylor et al. |
| 2003/0055861 A1* | 3/2003 | Lai et al. |
| 2003/0056085 A1* | 3/2003 | Vorbach |
| 2003/0056091 A1* | 3/2003 | Greenberg |
| 2003/0056202 A1* | 3/2003 | Vorbach et al. |
| 2003/0061542 A1 | 3/2003 | Bates et al. |
| 2003/0062922 A1 | 4/2003 | Douglass et al. |
| 2003/0070059 A1 | 4/2003 | Dally et al. |
| 2003/0086300 A1 | 5/2003 | Noyes et al. |
| 2003/0093662 A1* | 5/2003 | Vorbach et al. |
| 2003/0097513 A1* | 5/2003 | Vorbach et al. |
| 2003/0123579 A1* | 7/2003 | Safavi et al. |
| 2003/0135686 A1* | 7/2003 | Vorbach et al. |
| 2003/0154349 A1 | 8/2003 | Berg et al. |
| 2003/0192032 A1 | 10/2003 | Andrade et al. |
| 2004/0015899 A1* | 1/2004 | May et al. |
| 2004/0025005 A1* | 2/2004 | Vorbach et al. |
| 2004/0039880 A1 | 2/2004 | Pentkovski et al. |
| 2004/0078548 A1 | 4/2004 | Claydon et al. |
| 2004/0168099 A1 | 8/2004 | Vorbach et al. |

| | | |
|---|---|---|
| 2004/0199688 A1* | 10/2004 | Vorbach et al. |
| 2005/0066213 A1 | 3/2005 | Vorbach et al. |
| 2005/0091468 A1 | 4/2005 | Morita et al. |
| 2005/0144210 A1 | 6/2005 | Simkins et al. |
| 2005/0144212 A1 | 6/2005 | Simkins et al. |
| 2005/0144215 A1 | 6/2005 | Simkins et al. |
| 2006/0230094 A1 | 10/2006 | Simkins et al. |
| 2006/0230096 A1* | 10/2006 | Thendean et al. |
| 2007/0083730 A1 | 4/2007 | Vorbach et al. |
| 2008/0313383 A1 | 12/2008 | Morita et al. |
| 2009/0085603 A1* | 4/2009 | Paul et al. |

FOREIGN PATENT DOCUMENTS

| | | | |
|---|---|---|---|
| DE | 42 21 278 | | 1/1994 |
| DE | 44 16 881 | | 11/1994 |
| DE | 38 55 673 | | 11/1996 |
| DE | 196 51 075 | | 6/1998 |
| DE | 196 54 593 | | 7/1998 |
| DE | 196 54 595 | | 7/1998 |
| DE | 196 54 846 | | 7/1998 |
| DE | WO98/28697 | | 7/1998 |
| DE | 197 04 044 | | 8/1998 |
| DE | 197 04 728 | | 8/1998 |
| DE | 197 04 742 | | 9/1998 |
| DE | 198 22 776 | * | 3/1999 |
| DE | 198 07 872 | | 8/1999 |
| DE | 198 61 088 | | 2/2000 |
| DE | 199 26 538 | | 12/2000 |
| DE | 100 36 627 | | 2/2002 |
| DE | 101 29 237 | | 4/2002 |
| DE | 102 04 044 | | 8/2003 |
| EP | 0 208 457 | | 1/1987 |
| EP | 0 221 360 | * | 5/1987 |
| EP | 0 398 552 | | 11/1990 |
| EP | 0 428 327 | * | 5/1991 |
| EP | 0 463 721 | | 1/1992 |
| EP | 0 477 809 | * | 4/1992 |
| EP | 0 485 690 | | 5/1992 |
| EP | 0 497 029 | | 8/1992 |
| EP | 0 539 595 | * | 5/1993 |
| EP | 0 638 867 A2 | | 8/1994 |
| EP | 0 628 917 | * | 12/1994 |
| EP | 0 678 985 | * | 10/1995 |
| EP | 0 686 915 | * | 12/1995 |
| EP | 0 707 269 | * | 4/1996 |
| EP | 0 726 532 | | 8/1996 |
| EP | 0 735 685 | | 10/1996 |
| EP | 0 835 685 | | 10/1996 |
| EP | 0 746 106 | | 12/1996 |
| EP | 0 748 051 | | 12/1996 |
| EP | 0 726 532 | * | 7/1998 |
| EP | 0 926 594 | | 6/1999 |
| EP | 1 102 674 | | 7/1999 |
| EP | 1 061 439 | | 12/2000 |
| EP | 1 115 204 | * | 7/2001 |
| EP | 1 146 432 | | 10/2001 |
| EP | 0 696 001 | | 12/2001 |
| EP | 1 669 885 | * | 6/2006 |
| FR | 2 752 466 | | 2/1998 |
| GB | 2 304 438 | | 3/1997 |
| JP | 58-58672 | | 4/1983 |
| JP | 1044571 | | 2/1989 |
| JP | 1-229378 | * | 9/1989 |
| JP | 2-130023 | | 5/1990 |
| JP | 2-226423 | | 9/1990 |
| JP | 5-265705 | | 10/1993 |
| JP | 5-276007 | | 10/1993 |
| JP | 6-266605 | * | 9/1994 |
| JP | 7-086921 | * | 3/1995 |
| JP | 7-154242 | | 6/1995 |
| JP | 8-148989 | * | 6/1995 |
| JP | 7-182160 | | 7/1995 |
| JP | 7-182167 | | 7/1995 |
| JP | 8-44581 | | 2/1996 |
| JP | 08069447 | * | 3/1996 |
| JP | 8-101761 | * | 4/1996 |
| JP | 8-102492 | * | 4/1996 |
| JP | 8-106443 | | 4/1996 |
| JP | 8-221164 | * | 8/1996 |

| | | |
|---|---|---|
| JP | 8-250685 | 9/1996 |
| JP | 9-27745 | 1/1997 |
| JP | 9-237284 | 9/1997 |
| JP | 9-294069 | * 11/1997 |
| JP | 11-046187 | 2/1999 |
| JP | 11-184718 | 7/1999 |
| JP | 11-307725 | 11/1999 |
| JP | 2000-076066 | * 3/2000 |
| JP | 2000-181566 | 6/2000 |
| JP | 2000-201066 | * 7/2000 |
| JP | 2000-311156 | * 11/2000 |
| JP | 2001-500682 | * 1/2001 |
| JP | 2001-167066 | 6/2001 |
| JP | 2001-510650 | 7/2001 |
| JP | 2001-236221 | 8/2001 |
| JP | 2002-0033457 | 1/2002 |
| JP | 05-509184 | 12/2003 |
| JP | 3-961028 | 8/2007 |
| WO | WO90/04835 | 5/1990 |
| WO | WO90/11648 | 10/1990 |
| WO | WO92/01987 | 2/1992 |
| WO | WO93/11503 | 6/1993 |
| WO | WO94/06077 | 3/1994 |
| WO | WO94/08399 | 4/1994 |
| WO | WO95/00161 | 1/1995 |
| WO | WO95/26001 | 9/1995 |
| WO | WO98/10517 | * 3/1998 |
| WO | WO98/26356 | 6/1998 |
| WO | WO98/29952 | 7/1998 |
| WO | WO98/31102 | 7/1998 |
| WO | WO98/35294 | * 8/1998 |
| WO | WO98/35299 | 8/1998 |
| WO | WO99/00731 | 1/1999 |
| WO | WO99/00739 | 1/1999 |
| WO | WO 99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | WO00/45282 | 8/2000 |
| WO | WO00/49496 | * 8/2000 |
| WO | WO00/77652 | 12/2000 |
| WO | WO 01/55917 | 8/2001 |
| WO | WO02/13000 | 2/2002 |
| WO | WO02/21010 | 3/2002 |
| WO | WO02/29600 | 4/2002 |
| WO | WO02/50665 | * 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |
| WO | WO 03/091875 | * 11/2003 |
| WO | WO2004/053718 | * 6/2004 |
| WO | WO2004/114128 | 12/2004 |
| WO | WO2005/045692 | * 5/2005 |

OTHER PUBLICATIONS

"Structural gate decomposition for depth-optimal technology mapping in LUT-based FPGA designs", Cong et al., Apr. 2000, pp. 193-225, <http://delivery.acm.org/10.1145/340000/335045/p193-cong.pdf>.*
"Hardware-software co-design of embedded reconfigurable architectures", Li et al., Jun. 2000, pp. 507-512, <http://delivery.acm.org/10.1145/340000/337559/p507-li.pdf>.*
Arabi et al., "PLD Integrates Dedicated High-speed Data Buffering, Complex State Machine, and Fast Decode Array," conference record on WESCON '93, Sep. 28, 1993, pp. 432-436.
Ade et al., "Minimum Memory Buffers in DSP Applications," Electronics Letters, vol. 30, No. 6, Mar. 17, 1994, pp. 469-471.
Villasenor, John et al., "Configurable Computing," *Scientific American*, vol. 276, No. 6, Jun. 1997, pp. 66-71.
Villasenor, John et al., "Configurable Computing Solutions for Automatic Target Recognition," *IEEE*, 1996 pp. 70-79.
Tau, Edward et al., "A First Generation DPGA Implementation," *FPD'95*, pp. 138-143.
Athanas, Peter et al., "Quantitative analysis of floating point arithmetic on FPGA based custom computing machines," IEEE Symposium on FPGAs For Custom Computing Machines, *IEEE Computer Society Press*, Apr. 19-21, 1995, pp. i-vii, 1-222.
Athanas, Peter et al., "An Adaptive Hardware Machine Architecture and Compiler for Dynamic Processor Reconfiguration", IEEE, Laboratory for Engineering Man/Machine Systems Division of Engineering, Box D, Brown University Providence, Rhode Island, 1991, pp. 397-400.
Bittner, Ray A. Jr., "Wormhole Run-time Reconfiguration: Conceptualization and VLSI Design of a High Performance Computing System," *Dissertation*, Jan. 23, 1997, pp. I-XX, 1-415.
Myers, G. "Advances in Computer Architecture," Wiley-Interscience Publication, 2nd ed., John Wiley & Sons, Inc. pp. 463-494, 1978.
M. Saleeba, "A Self-Contained Dynamically Reconfigurable Processor Architecture," Sixteenth Australian Computer Science Conference, ASCS-16, QLD, Australia, Feb. 1993.
M. Morris Mano, "Digital Design," by Prentice Hall, Inc., Englewood Cliffs, New Jersey 07632, 1984, pp. 119-125, 154-161.
Maxfield, C. "Logic that Mutates While-U-Wait" EDN (Bur. Ed) (USA), EDN (European Edition), Nov. 7, 1996, Cahners Publishing, USA.
Norman, Richard S., "Hyperchip Business Summary, The Opportunity," Jan. 31, 2000, pp. 1-3.
Ferrante J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.
Hwang L. et al., "Min-cut Replication in Partitioned Networks" IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.
Baumgarte, V., et al., PACT XPP "A Self-reconfigurable Data Processing Architecture," PACT Info. GMBH, Munchen Germany 2001.
Jantsch, Axel et al., "A Case Study on Hardware/software Partitioning," Royal Institute of Technology, Kista, Sweden, Apr. 10, 1994 IEEE, pp. 111-118.
Becker, J. et al., "Parallelization in Co-compilation for Configurable Accelerators—a Host/accelerator Partitioning Compilation Method," proceedings of Asia and South Pacific Design Automation Conference, Yokohama, Japan, Feb. 10-13, 1998.
Isshiki, Tsuyoshi et al., "Bit-Serial Pipeline Synthesis for Multi-FPGA Systems with C++ Design Capture," 1996 IEEE, pp. 38-47.
Weinhardt, Markus, "Ubersetzingsmethoden fur strukturprogrammierbare rechner ," Dissertation for Doktors der Ingenieurwissenschaften der Universitat Karlsruhe: Jul. 1, 1997.
Hammes, Jeff et al., "Cameron: High Level Language Compilation for Reconfigurable Systems," Department of Computer Science, Colorado State University, Conference on Parallel Architectures and Compilation Techniques, Oct. 12-16, 1999.
K. Wada et al., "A Performance Evaluation of Tree-based Coherent Distributed Shared Memory" Proceedings of the Pacific RIM Conference on Communications, Comput and Signal Processing, Victoria, May 19-21, 1993.
Nilsson et al., "The Scalable Tree Protocol—A Cache Coherence Approaches for Large-Scale Multiprocessors" IEEE, pp. 498-506 Dec. 1992.
Wu et al., "A New Cache Directory Scheme", IEEE, pp. 466-472, Jun. 1996.
Hauck "The Roles of FPGA's in Reprogrammable Systems," IEEE, Apr. 1998, pp. 615-638.
Wittig et al., "OneChip: An FPGA Processor with Reconfigurable Logic" IEEE, 1996 pp. 126-135.
Cadambi et al., "Managing Pipeline-reconfigurable FPGAs," ACM, 1998, pp. 55-64.
Hong Yu Xu et al., "Parallel QR Factorization on a Block Data Flow Architecture" Conference Proceeding Article, Mar. 1, 1992, pp. 332-336 XPO10255276, p. 333, Abstract 2.2, 2.3, 2.4—p. 334.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-1666.
Weinhardt, M. "Compilation Methods for Structure-programmable Computers", dissertation, ISBN 3-89722-011-3, 1997.
Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (English Abstract included).
Kung, "Deadlock Avoidance for Systolic Communication", 1988 Conference Proceedings of 15th Annual International Symposium on Computer Architecture, May 30, 1988, pp. 252-260.
TMS320C54X DSP: CPU and Peripherals, Texas Instruments, 1996, pp. 6-26 to 6-46.
TMS320C54x DSP: Mnemonic Instruction Set, Texas Instruments, 1996, p. 4-64.
Miller, Michael J. et al., "High-Speed FIFOs Contend with Widely Differing Data Rates: Dual-port RAM Buffer and Dual-pointer System Provide Rapid, High-density Data Storage and Reduce Overhead", Computer Design, Sep. 1, 1985, pp. 83-86.
Forstner, Peter "Wer Zuerst Kommt, Mahlt Zuerst!: Teil 3: Einsatzgebiete and Anwendungsbeispiele von FIFO-Speichern", Elektronik, Aug. 2000, pp. 104-109.
John R. Hauser et al., "Garp: A MIPS Processor with a Reconfigurable Coprocessor", University of California, Berkeley, IEEE, 1997, pp. 12-21.
Jorg Donandt, "Improving Response Time of Programmable Logic Controllers by Use of a Boolean Coprocessor", AEG Research Institute Berlin, IEEE, 1989, pp. 4-167-4-169.
Alexandre F. Tenca et al., "A Variable Long-Precision Arithmetic Unit Design for Reconfigurable Coprocessor Architectures", University of California, Los Angeles, 1998, pp. 216-225.
Andreas Koch et al, "Practical Experiences with the SPARXIL Co-Processor", 1998, IEEE, pp. 394-398.
Gokhale M. B. et al., "Automatic Allocation of Arrays to Memories in FPGA processors with Multiple Memory Banks", Field-Programmable Custom Computing Machines, 1999, IEEE, pp. 63-67.
Christian Siemers, "Rechenfabrik Ansaetze Fuer Extrem Parallele Prozessoren", Verlag Heinze Heise GmbH., Hannover, DE No. 15, Jul. 16, 2001, pp. 170-179.
Pedro Diniz et al., "Automatic Synthesis of Data Storage and Control Structures for FPGA-based Computing Engines", 2000, IEEE, pp. 91-100.
Markus Weinhardt et al., "Pipeline Vectorization for Reconfigurable Systems", 1999, IEEE, pp. 52-60.
Lizy John et al., "A Dynamically Reconfigurable Interconnect for Array Processors", vol. 6, No. 1, Mar. 1998, IEEE, pp. 150-157.
Fineberg, Samuel et al., "Experimental Analysis of a Mixed-Mode Parallel Architecture Using Bitonic Sequence Sorting", vol. 11. No. 3, Mar. 1991, pp. 239-251.
Jacob, Jeffrey et al., "Memory Interfacing and Instruction Specification for Reconfigurable Processors", ACM 1999, pp. 145-154.
Athanas, "A Functional Reconfigurable Architecture and Compiler for Adoptive Computing," IEEE (1993), pp. 49-55.
Baumgarte, V., et al., PACT XPP "A Self-reconfigurable Data Processing Architecture," PACT Info. GMBH, Munchen Germany, 2001, 7 pages.
Beck et al., "From control flow to data flow," TR 89-1050, Oct. 1989, Dept. of Computer Science, Cornell University, Ithaca, NY, pp. 1-25.
Becker, J. et al., "Parallelization in Co-compilation for Configurable Accelerators—a Host/accelerator Partitioning Compilation Method," proceedings of Asia and South Pacific Design Automation Conference, Yokohama, Japan, Feb. 10-13, 1998, 11 pages.
Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and English Abstract only).
Hammes, Jeff et al., "Cameron: High Level Language Compilation for Reconfigurable Systems," Department of Computer Science, Colorado State University, Conference on Parallel Architectures and Compilation Techniques, Oct. 12-16, 1999, 9 pages.

Hauser, J.R. et al., "Garp: A MIPS Processor with a Reconfigurable Coprocessor", University of California, Berkeley, IEEE, 1997, pp. 24-33.
Maxfield, C., "Logic That Mutates While-U-Wait," EDN (Bur. Ed.) USA, EDN (European Edition), Nov. 7, 1996, Cahners Publishing, USA, pp. 137-140, 142.
Jantsch, Axel et al., "A Case Study on Hardware/software Partitioning," Royal Institute of Technology, Kista, Sweden, Apr. 10, 1994 IEEE, pp. 111-118.
Myers, G. "Advances in Computer Architecture," Wiley-Interscience Publication, 2nd ed., John Wiley & Sons, Inc. , 1978, pp. 463-494.
Mirsky, E. et al, "MATRIX: A Reconfigurable Computing Architecture with Configurable Instruction Distribution and Deployable Resources," Proceedings of the IEEE Symposium on FPGAs for Custom Computing Machines, 1996, pp. 157-166.
Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.
Wada et al., "A Performance Evaluation of Tree-based Coherent Distributed Shared Memory" Proceedings of the Pacific RIM Conference on Communications, Comput and Signal Processing, Victoria, May 19-21, 1993, pp. 390-393.
Weinhardt, Markus et al., "Pipeline Vectorization," IEEE Transactions on Computer-Aided Design of Integrated Circuits and Systems, vol. 20, No. 2, Feb. 2001, pp. 234-248.
Abnous, A., et al., "The Pleiades Architecture," Chapter I of *The Application of Programmable DSPs in Mobile Communications*, A. Gatherer and A. Auslander, Ed., Wiley, 2002, pp. 1-33.
Alippi, et al., "Determining the Optimum Extended Instruction Set Architecture for Application Specific Reconfigurable VLIW CPUs," IEEE, 2001, pp. 50-56.
Athanas et al., "Processor Reconfiguration Through Instruction-Set Metamorphosis," 1993, IEEE Computers, pp. 11-18.
Callahan, et al., "The Garp Architecture and C Compiler," Computer, Apr. 2000, pp. 62-69.
Cardoso, Joao M.P. and Markus Weinhardt, "XPP-VC: A C Compiler with Temporal Partitioning for the PACT-XPP Architecture," Field-Programmable Logic and Applications. Reconfigurable Computing is Going Mainstream, 12th International Conference FPL 2002, Proceedings (Lecture Notes in Computer Science, vol. 2438) Springer-Verlag Berlin, Germany, 2002, pp. 864-874.
Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.
DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.
Fornaciari, et al., System-level power evaluation metrics, 1997 Proceedings of the 2nd Annual IEEE International Conference on Innovative Systems in Silicon, New York, NY, Oct. 1997, pp. 323-330.
Franklin, Manoj et al., "A Fill-Unit Approach to Multiple Instruction Issue," Proceedings of the Annual International Symposium on Microarchitecture, Nov. 1994, pp. 162-171.
Hartenstein, R., "Coarse grain reconfigurable architectures," Design Automation Conference, 2001, Proceedings of the ASP-DAC 2001 Asia and South Pacific, Jan. 30- Feb. 2, 2001, IEEE Jan. 30, 2001, pp. 564-569.
Hastie et al., "The implementation of hardware subroutines on field programmable gate arrays," Custom Integrated Circuits Conference, 1990, Proceedings of the IEEE 1990, May 16, 1990, pp. 31.3.1-31. 4.3 (3 pages).
Hedge, S.J., "3D WASP Devices for On-line Signal and Data Processing," 1994, International Conference on Wafer Scale Integration, pp. 11-21.
Hwang, L. et al., "Min-cut Replication in Partitioned Networks," IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.
Iseli, C.,et al. "A C++ Compiler for FPGA Custom Execution Units Synthesis," IEEE, 1995, pp. 173-179.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Koren et al., "A data-driven VLSI array for arbitrary algorithms," IEEE Computer Society, Long Beach, CA vol. 21, No. 10, Oct. 1, 1988, pp. 30-34.

Lee, Jong-eun et al., "Reconfigurable ALU Array Architecture with Conditional Execution," International Soc. Design Conference (ISOOC) [online] Oct. 25, 2004, Seoul, Korea, 5 pages.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317. [This references is in Chinese, but should be comparable in content to the Ling et al. reference above].

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

Piotrowski, A., "IEC-BUS, Die Funktionsweise des IEC-BUS unde seine Anwendung in Geräten und Systemen," 1987, Franzis-Verlag GmbH, München, pp. 20-25.

Razdan et al., A High-Performance Microarchitecture with Hardware-Programmable Functional Units, Micro-27, Proceedings of the 27$^{th}$ Annual International Symposium on Microarchitecture, IEEE Computer Society and Association for Computing Machinery, Nov. 30-Dec. 2, 1994, pp. 172-180.

Schmit, et al., Hidden Markov Modeling and Fuzzy Controllers in FPGAs, FPGAs for Custom Computing machines, 1995; Proceedings, IEEE Symposium in Napa Valley, CA, Apr. 1995, pp. 214-221.

Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the 3$^{rd}$ Australian Computer Architecture Conference, Perth, John Morris, Ed., Feb. 2-3, 1998, pp. 169-178.

Simunic, et al., Source Code Optimization and Profiling of Energy Consumption in Embedded Systems, Proceedings of the 13$^{th}$ International Symposium on System Synthesis, Sep. 2000, pp. 193-198.

Skokan, Z.E., "Programmable logic machine (A programmable cell array)," IEEE Journal of Solid-State Circuits, vol. 18, Issue 5, Oct. 1983, pp. 572-578.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].

The XPP White Paper, Release 2.1, PACT—A Technical Perspective, Mar. 27, 2002, pp. 1-27.

Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.

Weinhardt, M., "Compilation Methods for Structure-programmable Computers," dissertation, ISBN 3-89722-011-3, 1997. [Table of Contents and English Abstract Provided].

XILINX, "Spartan and SpartanXL Families Field Programmable Gate Arrays," Jan. 1999, Xilinx, pp. 4-3 through 4-70.

Ye, Z.A. et al., "A C-Compiler for a Processor With a Reconfigurable Functional Unit," FPGA 2000 ACM/SIGNA International Symposium on Field Programmable Gate Arrays, Monterey, CA Feb. 9-11, 2000, pp. 95-100.

Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.

Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.

Zhang, et al., Architectural Evaluation of Flexible Digital Signal Processing for Wireless Receivers, Signals, Systems and Computers, 2000; Conference Record of the Thirty-Fourth Asilomar Conference, Bd. 1, Oct. 29, 2000, pp. 78-83.

Albahama, O.T. et al., "On the Viability of FPGA-Based Integrated Coprocessors," Dept. of Electrical and Electronic Engineering, Imperial College of Science, London, 1999 IEEE, pp. 206-215.

Arabi, et al., "PLD Integrates Dedicated High-speed Data Buffering, Complex State machine, and Fast Decode Array," conference record on WESCON '93, Sep. 28, 1993, pp. 432-436.

Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.

Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.

Cardoso, J.M.P. et al., "A novel algorithm combining temporal partitioning and sharing of functional units," University of Algarve, Faro, Portugal, 2001 IEEE, pp. 1-10.

Compton, K. et al., "Configurable Computing: A Survey of Systems and Software," Northwestern University, Dept. of ECE, Technical Report, 1999, (XP-002315148), 39 pages.

Diniz, P., et al., "A behavioral synthesis estimation interface for configurable computing," University of Southern California, Marina Del Rey, CA, 2001 IEEE, pp. 1-2.

Dutt, et al., "If Software is King for Systems-in-Silicon, What's New in Compilers?," IEEE, 1997, pp. 322-325.

Hwang, K., "Advanced Computer Architecture—Parallelism, Scalability, Programmability," 1993, McGraw-Hill, Inc., pp. 348-355.

IBM Technical Disclosure Bulletin, IBM Corp., New York, XP000424878, Bd. 36, Nr. 11, Nov. 1, 1993, pp. 335-336.

Kaul, M., et al., "An automated temporal partitioning and loop fission approach of FPGA based reconfigurable synthesis of DSP applications," University of Cincinnati, Cincinnati, OH, ACM 1999, pp. 616-622.

Knittel, Gunter, "A PCI-compatible FPGA-Coprocessor for 2D/3D Image Processing," University of Turgingen, Germany, 1996 IEEE, pp. 136-145.

Lee et al., "A new distribution network based on controlled switching elements and its applications," IEEE/ACT Trans. of Networking, vol. 3, No. 1, pp. 70-81, Feb. 1995.

Margolus, N., "An FPGA architecture for DRAM-based systolic computations," Boston University Center for Computational Science and MIT Artificial Intelligence Laboratory, IEEE 1997, pp. 2-11.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Schmidt, H. et al., "Behavioral synthesis for FGPA-based computing," Carnegie Mellon University, Pittsburgh, PA, 1994 IEEE, pp. 125-132.

Tsutsui, A., et al., "YARDS: FPGA/MPU Hybrid Architecture for Telecommunication Data Processing," NTT Optical Network Systems Laboratories, Japan, 1997 ACM, pp. 93-99.

XILINX, "Logic Cell Array Families XC4000, XC4000A and XC4000H," 1994, product description, pp. 2-7, 2-9, 2-14, 2-15, 8-16, and 9-14.

Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

XILINX, "Logic Cell Array Families: XC4000, XC4000A and XC4000II," 1994, product description, pp. 2-7, 2-9, 2-14, 2-15, 8-16, and 9-14.

XILINX, "Spartan and SpartanXL Families Field Programmable Gate Arrays," Jan. 1999, Xilinx, pp. 4-3 through 4-70.

Abnous, A. et al., "Ultra-Low-Power Domain-Specific Multimedia Processors," U.C. Berkeley, 1996 IEEE, pp. 461-470.

Sutton et al., "A Multiprocessor DSP System Using PADDI-2," U.C. Berkeley, 1998 ACM, pp. 62-65.

Zhang, et al., "Abstract: Low-Power Heterogeneous Reconfigurable Digital Signal Processors with Energy-Efficient Interconnect Network," U.C. Berkeley 2004, pp. 1-120.

Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

U.S. Appl. No. 60/109,417, filed Nov. 18, 1998, Jefferson et al.

Advanced Risc Machines, "Introduction to AMBA," Oct. 1996, Section 1, pp. 1-7.*

Arm, "The Architecture for the Digital World," http://www.arm.com/products/ Mar. 18, 2009, 3 pages.*

Arm, "The Architecture for the Digital World; Milestones,"http://www.arm.com/aboutarm/milestones.html Mar. 18, 2009, 5 pages.*

Altera, "Flex 8000 Programmable Logic Device Family," Altera Corporation product description, Jan. 2003, pp. 1-62.*

Altera, "Flex 10K Embedded Programmable Logic Device Family," Altera Corporation product description, Jan. 2003, pp. 1-128.

Asari, K. et al., "FeRAM circuit technology for system on a chip," *Proceedings First NASA/DoD Workshop on Evolvable Hardware* (1999), pp. 193-197.

Atmel, 5-K-50K Gates Coprocessor FPGA with Free Ram, Data Sheet, Jul. 2006, 55 pages.

Atmel, FPGA-based FIR Filter Application Note, Sep. 1999, 10 pages.

Atmel, "An Introduction to DSP Applications using the AT40K FPGA," FPGA Application Engineering, San Jose, CA, Apr. 2004, 15 pages.

Atmel, Configurable Logic Design & Application Book, Atmel Corporation, 1995, pp. 2-19 through 2-25.

Atmel, Field Programmable Gate Array Configuration Guide, AT6000 Series Configuration Data Sheet, Sep. 1999, pp. 1-20.

Bacon, D. et al., "Compiler Transformations for High-Performance Computing," ACM Computing Surveys, 26(4):325-420 (1994).

Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).

Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).

Becker et al., "Automatic Parallelism Exploitation for FPL-Based Accelerators," 1998, Proc. 31$^{st}$ Annual Hawaii International Conference on System Sciences, pp. 169-178.

Cardoso, J.M.P., et al., "Compilation and Temporal Partitioning for a Coarse-Grain Reconfigurable Architecture," New Algorithms, Architectures and Applications for Reconfigurable Computing, LYSACHT, P. & ROSENTIEL, W. eds., (2005) pp. 105-115.

Cardoso, J.M.P., et al., "Macro-Based Hardware Compilation of Javan™ Bytecodes into a Dynamic Reconfigurable Computing System," Field-Programmable Custom Computing Machines (1999) FCCM '99. Proceedings. Seventh Annual IEEE Symposium on NAPA Valley, CA, USA, Apr. 21-23, 1999, IEEE Comput. Soc, US, (Apr. 21, 1999) pp. 2-11.

Chaudhry, G.M. et al., "Separated caches and buses for multiprocessor system," Circuits and Systems, 1993; Proceedings of the 36$^{th}$ Midwest Symposium on Detroit, MI, USA, Aug. 16-18, 1993, New York, NY IEEE, Aug. 16, 1993, pp. 1113-1116, XP010119918 ISBN: 0-7803-1760-2.

Clearspeed, CSX Processor Architecture, Whitepaper, PN-1110-0702, 2007, pp. 1-15, www.clearspeed.com.

Clearspeed, CSX Processor Architecture, Whitepaper, PN-1110-0306, 2006, pp. 1-14, www.clearspeed.com.

Cook, Jeffrey J., "The Amalgam Compiler Infrastructure," Thesis at the University of Illinois at Urbana-Champaign (2004) Chapter 7 & Appendix G.

Cronquist, D. et al., Architecture Design of Reconfigurable Pipelined Datapaths, Department of Computer Science and Engineering, University of Washington, Seattle, WA, Proceedings of the 20$^{th}$ Anniversary Conference on Advanced Research in VSLI, 1999, pp. 1-15.

Culler, D.E; Singh, J.P., "Parallel Computer Architecture," pp. 434-437, 1999, Morgan Kaufmann, San Francisco, CA USA, XP002477559.

DeHon, Andre, "Reconfigurable Architectures for General-Purpose Computing," Massachusetts Institute of Technology, Technical Report AITR-1586, Oct. 1996, XP002445054, Cambridge, MA, pp. 1-353.

Del Corso et al., "Microcomputer Buses and Links," Academic Press Inc. Ltd., 1986, pp. 138-143, 277-285.

Ebeling, C. et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium*, Publication Date: Apr. 16-18, 1997, 10 pages.

Equator, Pixels to Packets, Enabling Multi-Format High Definition Video, Equator Technologies BSP-15 Product Brief, www.equator.com, 2001, 4 pages.

Fawcett, B.K., "Map, Place and Route: The Key to High-Density PLD Implementation," Wescon Conference, IEEE Center (Nov. 7, 1995) pp. 292-297.

Freescale Slide Presentation, An Introduction to Motorola's RCF (Reconfigurable Compute Fabric) Technology, Presented by Frank David, Launched by Freescale Semiconductor, Inc., 2004, 39 pages.

Genius, D. et al., "A Case for Array Merging in Memory Hierarchies," Proceedings of the 9th International Workshop on Compilers for Parallel Computers, CPC'01 (Jun. 2001), 10 pages.

Hartenstein, R. et al., "A new FPGA architecture for word-oriented datapaths," Proc. FPL'94, Springer LNCS, Sep. 1994, pp. 144-155.

Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.

Hwang, K., "Computer Architecture and Parallel Processing," Data Flow Computers and VLSI Computations, XP-002418655, 1985 McGraw-Hill, Chapter 10, pp. 732-807.

"IEEE Standard Test Access Port and Boundary-Scan Architecture," IEEE Std. 1149.1-1990, 1993, pp. 1-127.

Inside DSP, "Ambric Discloses Massively Parallel Architecture," Aug. 23, 2006, HTTP://insidedsp.com/tabid/64/articleType/ArticleView/articleId/155/Defa..., 2 pages.

Intel, Intel MXP5800/MXP5400 Digital Media Processors, Architecture Overview, Jun. 2004, Revision 2.4, pp. 1-24.

Jantsch, Axel et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.

Kean, T.A., "Configurable Logic: A Dynamically Programmable Cellular Architecture and its VLSI Implementation," University of Edinburgh (Dissertation) 1988, pp. 1-286.

Kean, T., et al., "A Fast Constant Coefficient Multiplier for the XC6200," Xilinx, Inc., Lecture Notes in Computer Science, vol. 1142, Proceedings of the 6$^{th}$ International Workshop of Field-Programmable Logic, 1996, 7 pages.

Kim et al., "A Reconfigurable Multifunction Computing Cache Architecture," IEEE Transactions on Very Large Scale Integration (VLSI) Systems vol. 9, Issue 4, Aug. 2001 pp. 509-523.

Koch, Andreas et al., "High-Level-Language Compilation for Reconfigurable Computers," Proceedings of European Workshop on Reconfigurable Communication-Centric SOCS (Jun. 2005) 8 pages.

Lange, H. et al., "Memory access schemes for configurable processors," Field-Programmable Logic and Applications, International Workshop, FPL, Aug. 27, 2000, pp. 615-625, XP02283963.

Larsen, S. et al., "Increasing and Detecting Memory Address Congruence," Proceedings of the 2002 IEEE International Conference on Parallel Architectures and Compilation Techniques (PACT'02), pp. 1-2 (Sep. 2002).

Lee, Ming-Hau et al., "Designs and Implementation of the MorphoSys Reconfigurable Computing Processors," The Journal of VLSI Signal Processing, Kluwer Academic Publishers, BO, vol. 24, No. 2-3, Mar. 2, 2000, pp. 1-29.

Lee, R. B., et al., "Multimedia extensions for general-purpose processors," *IEEE Workshop on Signal Processing Systems, SIPS 97—Design and Implementation* (1997), pp. 9-23.

Mei, Bingfeng et al., "Adres: An Architecture with Tightly Coupled VLIW Processor and Coarse-Grained Reconfigurable Matrix," Proc. *Field-Programmable Logic and Applications* (FPL 03), Springer, 2003, pp. 61-70.

Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).

Mei, Bingfeng, et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

Miyamori, T. et al., "REMARC: Reconfigurable Multimedia Array Coprocessor," Computer Systems Laboratory, Stanford University, IEICE Transaction on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.

Moraes, F., et al., "A Physical Synthesis Design Flow Based on Virtual Components," XV Conference on Design of Circuits and Integrated Systems (November 2000) 6 pages.

Muchnick, S., "Advanced Compiler Design and Implementation" (Morgan Kaufmann 1997), Table of Contents, 11 pages.

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Nageldinger, U., "Design-Space Exploration for Coarse Grained Reconfigurable Architectures," (Dissertation) Universitaet Kaiserslautern, 2000, Chapter 2, pp. 19-45.

Neumann, T., et al., "A Generic Library for Adaptive Computing Environments," Field Programmable Logic and Applications, $11_{th}$ International Conference, FPL 2001, Proceedings (Lecture Notes in Computer Science, vol. 2147) (2001) pp. 503-512.

Olukotun, K., "The Case for a Single-Chip Microprocessor," ACM Sigplan Notices, ACM, Association for Computing Machinery, New York, vol. 31, No. 9, Sep. 1996 pp. 2-11.

PACT Corporation, "The XPP Communication System," Technical Report 15 (2000), pp. 1-16.

Parhami, B., "Parallel Counters for Signed Binary Signals," Signals, Systems and Computers, 1989, Twenty-Third Asilomar Conference, vol. 1, pp. 513-516.

PCI Local Bus Specification, Production Version, Revision 2.1, Jun. 1, Portland, OR, 1995, pp. 1-281.

Pirsch, P. et al., "VLSI implementations of image and video multi-media processing systems," *IEEE Transactions on Circuits and Systems for Video Technology*, vol. 8, No. 7, Nov. 1998, pp. 878-891.

Ryo, A., "Auszug aus Handbuch der Informationsverarbeitung," ed. Information Processing Society of Japan, *Information Processing Handbook, New Edition*, Software Information Center, Ohmsha, Dec. 1998, 4 pages. [Translation provided].

Saleeba, Z.M.G., "A Self-Reconfiguring Computer System," Department of Computer Science, Monash University (Dissertation) 1998, pp. 1-306.

Salefski, B. et al., "Re-configurable computing in wireless," *Annual ACM IEEE Design Automation Conference: Proceedings of the 38th conference on Design automation* (2001) pp. 178-183.

Schmidt, U. et al., "Datawave: A Single-Chip Multiprocessor for Video Applications," *IEEE Micro*, vol. 11, No. 3, May/Jun. 1991, pp. 22-25, 88-94.

Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, ( Oct. 1, 1995) vol. 11(1/2), pp. 51-74.

Shin, D., et al., "C-based Interactive RTL Design Methodology," Technical Report CECS-03-42 (Dec. 2003) pp. 1-16.

Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.

Sondervan, J., "Retiming and logic synthesis," Electronic Engineering (Jan. 1993) vol. 65(793), pp. 33, 35-36.

Soni, M., "VLSI Implementation of a Wormhole Run-time Reconfigurable Processor," Jun. 2001, (Masters Thesis)Virginia Polytechnic Institute and State University, 88 pages.

Vasell et al., "The Function Processor: A Data-Driven Processor Array for Irregular Computations," Chalmers University of Technology, Sweden, pp. 1-21.

Waingold, E., et al., "Baring it all to software: Raw machines," IEEE Computer, Sep. 1997, at 86-93.

Weinhardt, Markus et al., "Memory Access Optimization for Reconfigurable Systems," IEEE Proceedings Computers and Digital Techniques, 48(3) (May 2001) pp. 1-16.

Wolfe, M. et al., "High Performance Compilers for Parallel Computing" (Addison-Wesley 1996) Table of Contents, 11 pages.

XILINX, "The Programmable Logic Data Book," 1994, Section 2, pp. 1-231, Section 8, pp. 1, 23-25, 29, 45-52, 169-172.

XILINX, "Logic Cell Array Families: XC4000, XC4000A and XC4000H," 1994, product description, pp. 2-7, 2-9, 2-14, 2-15, 8-16, and 9-14.

XILINX, "XC6200 Field Programmable Gate Arrays," Apr. 24, 1997, Xilinx product description, pp. 1-73.

XILINX, "XC3000 Series Field Programmable Gate Arrays," Nov. 6, 1998, Xilinx product description, pp. 1-76.

XILINX, "XC4000E and XC4000X Series Field Programmable Gate Arrays," May 14, 1999, Xilinx product description, pp. 1-68.

XILINX, "Virtex-E 1.8 V Extended Memory Field Programmable Gate Arrays," Jul. 17, 2002, Xilinx Production Product Specification, pp. 1-118.

XILINX, "Virtex-II and Virtex-II Pro X FPGA User Guide," Mar. 28, 2007, Xilinx user guide, pp. 1-559.

Zima, H. et al., "Supercompilers for parallel and vector computers" (Addison-Wesley 1991) Table of Contents, 5 pages.

Altera, "APEX 20K Programmable Logic Device Family," Altera Corporation Data Sheet, Mar. 2004, ver. 5.1, pp. 1-117.

IMEC, "ADRES multimedia processor & 3MF multimedia platform," Transferable IP, IMEC Technology Description, (Applicants believe the date to be Oct. 2005), 3 pages.

Kanter, David, "NVIDIA's GT200: Inside a Parallel Processor," http://www.realworldtech.com/page.cfm?ArticleID=RWT090989195242&p=1, Sep. 8, 2008, 27 pages.

XILINX, "Virtex-E 1.8 V Extended Memory Field Programmable Gate Arrays," (v2.2) Sep. 10, 2002, Xilinx Production Product Specification, pp. 1-52.

XILINX, "Virtex-II and Virtex-II Pro X FPGA Platform FPGAs: Complete Data Sheet," (v4.6) Mar. 5, 2007, pp. 1-302.

XILINX, "Virtex-II Platform FPGAs: Complete Data Sheet," (v3.5) Nov. 5, 2007, pp. 1-226.

Agaiwal, A., et al., "APRIL: A Processor Architecture for Multiprocessing," Laboratory for Computer Science, MIT, Cambridge, MA, IEEE 1990, pp. 104-114.

Almasi and Gottlieb, *Highly Parallel Computing*, The Benjamin/Cummings Publishing Company, Inc., Redwood City, CA, 1989, 3 pages (Fig. 4.1).

Advanced RISC Machines Ltd (ARM), "AMBA—Advanced Microcontroller Bus Architecture Specification," (Document No. ARM IHI 0001C), Sep. 1995, 72 pages.

Alfke, Peter; New, Bernie, *Xilinx Application Note*, "Additional XC3000 Data," XAPP 024.000, 1994, pp. 8-11 through 8-20.

Alfke, Peter; New, Bernie, *Xilinx Application Note*, "Adders, Subtracters and Accumulators in XC3000," XAPP 022.000, 1994, pp. 8-98 through 8-104.

Alfke, Peter, *Xilinx Application Note*, "Megabit FIFO in Two Chips: One LCA Device and One DRAM," XAPP 030.000, 1994, pp. 8-148 through 8-150.

Alfke, Peter, *Xilinx Application Note*, "Dynamic Reconfiguration," XAPP 093, Nov. 10, 1997, pp. 13-45 through 13-46.

Alfke, Peter; New, Bernie, *Xilinx Application Note*, "Implementing State Machines in LCA Devices," XAPP 027.001, 1994, pp. 8-169 through 8-172.

Algotronix, Ltd., CAL64K Preliminary Data Sheet, Apr. 1989, pp. 1-24.

Algotronix, Ltd., CAL4096 Datasheet, 1992, pp. 1-53.

Algotronix, Ltd., CHS2x4 User Manual, "CHA2x4 Custom Computer," 1991, pp. 1-38.

Allaire, Bill; Fischer, Bud, *Xilinx Application Note*, "Block Adaptive Filter," XAPP 055, Aug. 15, 1996 (Version 1.0), pp. 1-10.
Altera Application Note (73), "Implementing FIR Filters in FLEX Devices," Altera Corporation, Feb. 1998, ver. 1.01, pp. 1-23.
Athanas, P. (Thesis), "An adaptive machine architecture and compiler for dynamic processor reconfiguration," Brown University 1992, pp. 1-157.
Berkeley Design Technology, Inc., *Buyer's Guide to DSP Processors*, 1995, Fremont, CA., pp. 673-698.
Bittner, R. et al., "Colt: An Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.
Camilleri, Nick; Lockhard, Chris, *Xilinx Application Note*, "Improving XC4000 Design Performance," XAPP 043.000, 1994, pp. 8-21 through 8-35.
Cartier, Lois, *Xilinx Application Note*, "System Design with New XC4000EX I/O Features," Feb. 21, 1996, pp. 1-8.
Chen, D., (Thesis) "Programmable arithmetic devices for high speed digital signal processing," U. California Berkeley 1992, pp. 1-175.
Churcher, S., et al., "The XC6200 FastMap TM Processor Interface," Xilinx, Inc., Aug. 1995, pp. 1-8.
Cowie, Beth, *Xilinx Application Note*, "High Performance, Low Area, Interpolator Design for the XC6200," XAPP 081, May 7, 1997 (Version 1.0), pp. 1-10.
Duncan, Ann, *Xilinx Application Note*, "A32×16 Reconfigurable Correlator for the XC6200," XAPP 084, Jul. 25, 1997 (Version 1.0), pp. 1-14.
Ebeling, C., et al., "RaPiD—Reconfigurable Pipelined Datapath," Dept. of Computer Science and Engineering, U. Washington, 1996, pp. 126-135.
Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.
Fawcett, B., "New SRAM-Based FPGA Architectures Address New Applications," Xilinx, Inc. San Jose, CA, Nov. 1995, pp. 231-236.
Goslin, G; Newgard, B, *Xilinx Application Note*, "16-Tap, 8-Bit FIR Filter Applications Guide," Nov. 21, 1994, pp. 1-5.
Iwanczuk, Roman, *Xilinx Application Note*, "Using the XC4000 RAM Capability," XAPP 031.000, 1994, pp. 8-127 through 8-138.
Knapp, Steven, "Using Programmable Logic to Accelerate DSP Functions," Xilinx, Inc., 1995, pp. 1-8.
New, Bernie, *Xilinx Application Note*, "Accelerating Loadable Counters in SC4000," XAPP 023.001, 1994, pp. 8-82 through 8-85.
New, Bernie, *Xilinx Application Note*, "Boundary Scan Emulator for XC3000," XAPP 007.001, 1994, pp. 8-53 through 8-59.
New, Bernie, *Xilinx Application Note*, "Ultra-Fast Synchronous Counters," XAPP 014.001, 1994, pp. 8-78 through 8-81.
New, Bernie, *Xilinx Application Note*, "Using the Dedicated Carry Logic in XC4000," XAPP 013.001, 1994, pp. 8-105 through 8-115.
New, Bernie, *Xilinx Application Note*, "Complex Digital Waveform Generator," XAPP 008.002, 1994, pp. 8-163 through 8-164.
New, Bernie, *Xilinx Application Note*, "Bus-Structured Serial Input-Output Device," XAPP 010.001, 1994, pp. 8-181 through 8-182.
Ridgeway, David, *Xilinx Application Note*, "Designing Complex 2-Dimensional Convolution Filters," XAPP 037.000, 1994, pp. 8-175 through 8-177.
Rowson, J., et al., "Second-generation compilers optimize semicustom circuits," Electronic Design, Feb. 19, 1987, pp. 92-96.
Schewel, J., "A Hardware/Software Co-Design System using Configurable Computing Technology," Virtual Computer Corporation, Reseda, CA, IEEE 1998, pp. 620-625.
Segers, Dennis, Xilinx Memorandum, "MIKE—Product Description and MRD," Jun. 8, 1994, pp. 1-29.
Texas Instruments, "TMS320C8x System-Level Synopsis," Sep. 1995, 75 pages.
Texas Instruments, "TMS320C80 Digital Signal Processor," Data Sheet, Digital Signal Processing Solutions 1997, 171 pages.
Texas Instruments, "TMS320C80 (MVP) Parallel Processor," User's Guide, Digital Signal Processing Products 1995, 73 pages.
Trainor, D.W., et al., "Implementation of the 2D DCT Using A Xilinx XC6264 FPGA," 1997, IEEE Workshop of Signal Processing Systems SiPS 97, pp. 541-550.
Trimberger, S, (Ed.) et al., "Field-Programmable Gate Array Technology," 1994, Kluwer Academic Press, pp. 1-258 (and the Title Page, Table of Contents, and Preface) [274 pages total].
Trimberger, S., "A Reprogrammable Gate Array and Applications," IEEE 1993, Proceedings of the IEEE, vol. 81, No. 7, Jul. 1993, pp. 1030-1041.
Trimberger, S., et al., "A Time-Multiplexed FPGA," Xilinx, Inc., 1997 IEEE, pp. 22-28.
Ujvari, Dan, *Xilinx Application Note*, "Digital Mixer in an XC7272," XAPP 035.002, 1994, p. 1.
Veendrick, H., et al., "A 1.5 GIPS video signal processor (VSP)," Philips Research Laboratories, The Netherlands, IEEE 1994 Custom Integrated Circuits Conference, pp. 95-98.
Wilkie, Bill, *Xilinx Application Note*, "Interfacing XC6200 To Microprocessors (TMS320C50 Example)," XAPP 064, Oct. 9, 1996 (Version 1.1), pp. 1-9.
Wilkie, Bill, *Xilinx Application Note*, "Interfacing XC6200 To Microprocessors (MC68020 Example)," XAPP 063, Oct. 9, 1996 (Version 1.1), pp. 1-8.
XCELL, Issue 18, Third Quarter 1995, "Introducing three new FPGA Families!"; "Introducing the XC6200 FPGA Architecture: The First FPGA Architecture Optimized for Coprocessing in Embedded System Applications," 40 pages.
*Xilinx Application Note*, Advanced Product Specification, "XC6200 Field Programmable Gate Arrays," Jun. 1, 1996 (Version 1.0), pp. 4-253-4-286.
*Xilinx Application Note*, A Fast Constant Coefficient Multiplier for the XC6200, XAPP 082, Aug. 24, 1997 (Version 1.0), pp. 1-5.
Xilinx Technical Data, "XC5200 Logic Cell Array Family," Preliminary (v1.0), Apr. 1995, pp. 1-43.
Xilinx Data Book, "The Programmable Logic Data Book," 1996, 909 pages.
Xilinx, Series 6000 User's Guide, Jun. 26, 1997, 223 pages.
Yeung, K., (Thesis) "A Data-Driven Multiprocessor Architecture for High Throughput Digital Signal Processing," Electronics Research Laboratory, U. California Berkeley, Jul. 10, 1995, pp. 1-153.
Yeung, L., et al., "A 2.4GOPS Data-Driven Reconfigurable Multiprocessor IC for DSP," Dept. of EECS, U. California Berkeley, 1995 IEEE International Solid State Circuits Conference, pp. 108-110.
ZILOG Preliminary Product Specification, "Z86C95 CMOS Z8 Digital Signal Processor," 1992, pp. 1-82.
ZILOG Preliminary Product Specification, "Z89120 Z89920 (ROMless) 16-Bit Mixed Signal Processor," 1992, pp. 1-82.
Defendants' Invalidity Contentions in *PACT XPP Technologies, AG v. XILINX, Inc., et al.*, (E.D. Texas Dec. 28, 2007) (No. 2:07cv563)., including Exhibits A through K in separate PDF files.
Becker, J., "A Partitioning Compiler for Computers with Xputer-based Accelerators," 1997, Kaiserslautern University, 326 pp.
Hartenstein et al., "Parallelizing Compilation for a Novel Data-Parallel Architecture," 1995, PCAT-94, Parallel Computing: Technology and Practice, 13 pp.
Hartenstein et al., "A Two-Level Co-Design Framework for Xputer-based Data-driven Reconfigurable Accelerators," 1997, Proceedings of the Thirtieth Annual Hawaii International Conference on System Sciences, 10 pp.
Huang, Libo et al., "A New Architecture for Multiple-Precision Floating-Point Multiply-Add Fused Unit Design," School of Computer National University of Defense Technology, China, IEEE 2007, 8 pages.
Jo, Manhwee et al., "Implementation of Floating-Point Operations for 3D Graphics on a Coarse-Grained Reconfigurable Architecture," Design Automation Laboratory, School of EE/CS, Seoul National University, Korea, IEEE 2007, pp. 127-130.
XILINX, White Paper 370: (Virtex-6 and Spartan-6 FPGA Families) "Reducing Switching Power with Intelligent Clock Gating," Frederic Rivoallon, May 3, 2010, pp. 1-5.
XILINX, White Paper 298: (Spartan-6 and Virtex-6 Devices) "Power Consumption at 40 and 50 nm," Matt Klein, Apr. 13, 2009, pp. 1-21.
Altera, "2. TriMatrix Embedded Memory Blocks in Stratix & Stratix GX Devices," Altera Corporation, Jul. 2005, 28 pages.

Altera, "APEX II Programmable Logic Device Family," Altera Corporation Data Sheet, Aug. 2002, Ver. 3.0, 99 pages.

"BlueGene/L—Hardware Architecture Overview," BlueGene/L design team, IBM Research, Oct. 17, 2003 slide presentation, pp. 1-23.

"BlueGene/L: the next generation of scalable supercomputer," Kissel et al., Lawrence Livermore National Laboratory, Livermore, California, Nov. 18, 2002, 29 pages.

BlueGene Project Update, Jan. 2002, IBM slide presentation, 20 pages.

BlueGene/L, "An Overview of the BlueGene/L Supercomputer," The BlueGene/L Team, IBM and Lawrence Livermore National Laboratory, 2002 IEEE. pp. 1-22.

Epstein, Dave, "IBM Extends DSP Performance with Mfaxt," Microprocessor Report, vol. 9, No. 16 (MicroDesign Resources), Dec. 4, 1995, pp. 1-4 [XL0029013].

Galanis, M.D. et al., "Accelerating Applications by Mapping Critical Kernels on Coarse-Grain Reconfigurable Hardware in Hybrid Systems," Proceedings of the 13$^{th}$ Annual IEEE Symposium on Field-Programmable Custom Computing Machines, 2005, 2 pages.

Guo, Z. et al., "A Compiler Intermediate Representation for Reconfigurable Fabrics," University of California, Riverside, Dept. of Electrical Engineering, IEEE 2006, 4 pages.

Gwennap, Linley, "P6 Underscores Intel's Lead," Microprocessor Report, vol. 9., No. 2, Feb. 16, 1995 (MicroDesign Resources), p. 1 and pp. 6-15.

Gwennap, Linley, "Intel's P6 Bus Designed for Multiprocessing," Microprocessor Report, vol. 9, No. 7 (MicroDesign Resources), May 30, 1995, p. 1 and pp. 6-10.

Intel, "Pentium Pro Family Developer's Manual , vol. 3: Operating System Writer's Guide," Intel Corporation, Dec. 1995, [submitted in 4 PDF files: Part I, Part II, Part III and Part IV], 458 pages.

Hauser, John Reid, (Dissertation) "Augmenting A Microprocessor with Reconfigurable Hardware," University of California, Berkeley, Fall 2000, 255 pages. (submitted in 3 PDFs, Parts 1-3).

Hauser, John R., "The Garp Architecture," University of California at Berkeley, Computer Science Division, Oct. 1997, pp. 1-55.

Venkatachalam et al., "A highly flexible, distributed multiprocessor architecture for network processing," Computer Networks, The International Journal of Computer and Telecommunications Networking, vol. 41, No. 5, Apr. 5, 2003, pp. 563-568.

XILINX, "Virtex-II and Virtex-II Pro X FPGA User Guide," Mar. 28, 2007, Xilinx user guide, pp. 1-559.

Xilinx, Inc.'s and Avnet, Inc.'s Disclosure Pursuant to P.R 4-2; Pact XPP Technologies, AG. V. XILINX, Inc. and Avnet, Inc., Case No. 2:07-cv-00563-TJW-CE, U.S. District Court for the Eastern District of Texas, Dec. 28, 2007, 4 pages.

Xilinx, Inc.'s and Avnet, Inc.'s Disclosure Pursuant to P.R 4-1; Pact XPP Technologies, AG. V. XILINX, Inc. and Avnet, Inc., Case No. 2:07-cv-00563-TJW-CE, U.S. District Court for the Eastern District of Texas, Dec. 28, 2007, 9 pages.

Defendant's Claim Construction Chart for P.R. 4-2 Constructions and Extrinsic Evidence for Terms Proposed by Defendants, Pact XPP Technologies, AG. V. XILINX, Inc. and Avnet, Inc., Case No. 2:07-cv-00563-TJW-CE, U.S. District Court for the Eastern District of Texas, Dec. 28, 2007, pp. 1-19.

Pact's P.R. 4-1 List of Claim Terms for Construction, Pact XPP Technologies, AG. V. XILINX, Inc. and Avnet, Inc., Case No. 2:07-cv-00563-TJW-CE, U.S. District Court for the Eastern District of Texas, Dec. 28, 2007, pp. 1-7.

Pact's P.R. 4-2 Preliminary Claim Constructions and Extrinsic Evidence, Pact XPP Technologies, AG. V. XILINX, Inc. and Avnet, Inc., Case No. 2:07-cv-00563-TJW-CE, U.S. District Court for the Eastern District of Texas, Dec. 28, 2007, pp. 1-16, and Exhibits re Extrinsic Evidence Parts in seven (7) separate additional PDF files (Parts 1-7).

U.S. Appl. No. 90/010,979, filed May 4, 2010, Vorbach et al.

U.S. Appl. No. 90/011,087, filed Jul. 8, 2010, Vorbach et al.

Ballagh et al., "Java Debug Hardware Models Using JBits," 8$^{th}$ Reconfigurable Architectures Workshop, 2001, 8 pages.

Bellows et al., "Designing Run-Time Reconfigurable Systems with JHDL," Journal of VLSI Signal Processing, vol. 28, Kluwer Academic Publishers, The Netherlands, 2001, pp. 29-45.

Guccione et al., "JBits: Java based interface for reconfigurable computing," Xilinx, Inc., San Jose, CA, 1999, 9 pages.

Price et al., "Debug ofReconfigurable Systems," Xilinx, Inc., San Jose, CA, Proceedings of SPIE, 2000, pp. 181-187.

Sundararajan et al., "Testing FPGA Devices Using JBits," Proc. MAPLD 2001, Maryland, USA, Katz (ed.), NASA, CA, 8 pages.

Li, Zhiyuan, et al., "Configuration prefetching techniques for partial reconfigurable coprocessor with relocation and defragmentation," International Symposium on Field Programmable Gate Arrays, Feb. 1, 2002, pp. 187-195.

ARM Limited, "ARM Architecture Reference Manual," Dec. 6, 2000, pp. A10-6-A10-7.

Culler, D.E; Singh, J.P., "Parallel Computer Architecture," p. 17, 1999, Morgan Kaufmann, San Francisco, CA USA, XP002477559.

Short, Kenneth L., *Microprocessors and Programmed Logic*, Prentice Hall, Inc., New Jersey 1981, p. 34.

Webster's Ninth New Collegiate Dictionary, Merriam-Webster, Inc., 1990, p. 332 (definition of "dedicated").

* cited by examiner

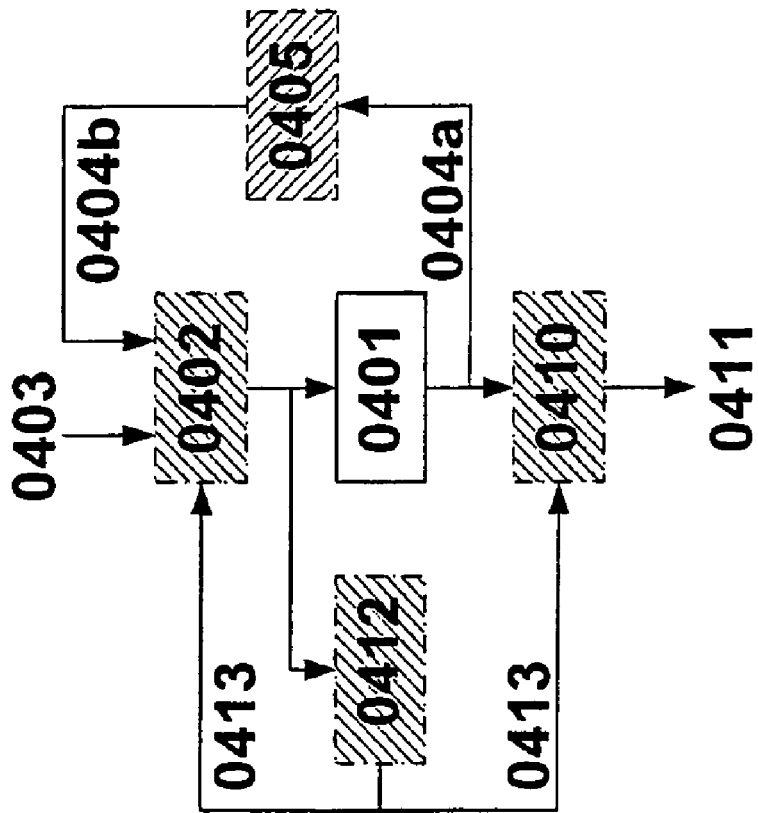
Fig. 4b
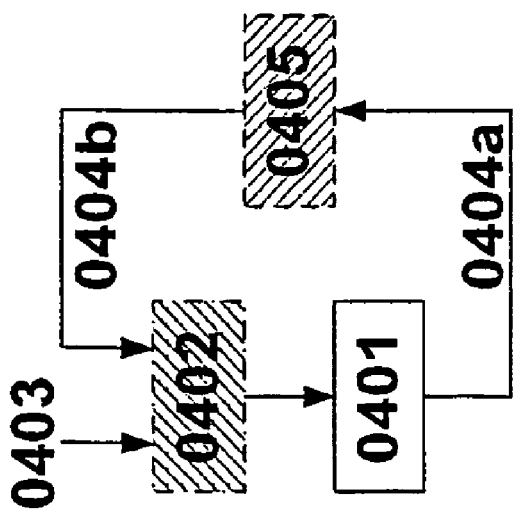
Fig. 4a
 0420
 0421

US 7,996,827 B2

METHOD FOR THE TRANSLATION OF PROGRAMS FOR RECONFIGURABLE ARCHITECTURES

FIELD OF THE INVENTION

The present invention relates to optimal use of reconfigurable architectures and optimal execution of instructions in a given high-level language in reconfigurable architectures.

BACKGROUND INFORMATION

To implement execution of instructions for handling data (programs) that are written in high-level languages in a particular architecture used for data handling, there are conventional compilers which translate the instructions of the high-level language into instructions that are better adapted to the architecture used. Compilers which support highly parallel architectures in particular are thus parallelizing compilers.

Conventional parallelizing compilers normally use special constructs such as semaphores and/or other methods for synchronization. Technology-specific methods are typically used. Conventional methods are not suitable for combining functionally specified architectures with the particular dynamic response and imperatively specified algorithms. The methods used therefore yield satisfactory results only in special cases.

Compilers for reconfigurable architectures, in particular for reconfigurable processors, generally use macros created specifically for the intended reconfigurable hardware, mostly using hardware description languages such as Verilog, VHDL, or System C to create the macros. These macros are then called up from the program flow (instantiated) by an ordinary high-level language (e.g., C, C++).

There are conventional compilers for parallel computers which map program parts onto multiple processors on a coarse-grained structure, mostly based on complete functions or threads.

In addition, there are conventional vectorizing compilers which convert extensive linear data processing, such as computations of large expressions, into a vectorized form and thus permit computation on superscalar processors and vector processors (e.g., Pentium, Cray).

A method for automatic mapping of functionally or imperatively formulated computation procedures onto different target technologies is described here, in particular on ASICs, reconfigurable modules (FPGAs, DPGAs, VPUs, chess array, kress array, Chameleon, etc.; hereinafter combined under the term VPU), sequential processors (CISC/RISC CPUs, DSPs, etc.; hereinafter summarized by the term CPU) and parallel computer systems (SMP, MMP, etc.). In this connection, reference is made in particular to the following patents and patent applications by the present applicant: P 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE 00/01869, DE 100 36 627.9-33, DE 100 28 397.7, DE 101 10 530.4, DE 101 11 014.6, PCT/EP 00/10516, EP 01 102 674.7, PACT13, PACT17, PACT18, PACT22, PACT24, PACT25, PACT26US, PACT02, PACT04, PACT08, PACT10, PACT15, PACT18(a), PACT27, PACT19. Each of these are hereby fully incorporated herein by reference for disclosure purposes.

VPUs are basically composed of a multidimensional, homogeneous or inhomogeneous, flat or hierarchical array (PA) of cells (PAEs) which are capable of executing any functions, in particular logic functions and/or arithmetic functions and/or memory functions and/or network functions. PAEs are typically assigned a loading unit (CT) which determines the function of the PAEs by configuration and optionally reconfiguration.

This method is based on an abstract parallel machine model which in addition to the finite automaton also integrates imperative problem specifications and permits an efficient algorithmic derivation of an implementation on different technologies.

The following compiler classes are conventional:

Classical compilers, which often generate stack machine code and are suitable for very simple processors, which are essentially designed as normal sequencers (see N. Wirth, Compilerbau [*Compiler Design*], Teubner Verlag).

Vectorizing compilers construct mostly linear code which is intended for special vector computers or for highly pipelined processors. These compilers were originally available for vector computers such as the Cray. Modern processors such as Pentium processors require similar methods because of the long pipeline structure. Since the individual computation steps are performed as vectorized (pipelined) steps, the code is much more efficient. However, the conditional jump means problems for the pipeline. Therefore, a jump prediction which assumes a jump destination is appropriate. If this assumption is incorrect, however, the entire processing pipeline must be deleted. In other words, each jump for these compilers is problematical and actually there is no parallel processing. Jump predictions and similar mechanisms require a considerable extra complexity in terms of hardware.

There are hardly any coarse-grained parallel compilers in the actual sense, parallelism typically being marked and managed by the programmer or the operating system, e.g., it is usually performed on a thread level in MMP computer systems such as various IBM architectures, ASCI Red, etc. A thread is a largely independent program block or even a separate program. Therefore, threads are easily parallelized on a coarse-grained level. Synchronization and data consistency must be ensured by the programmer or the operating system. This is complex to program and requires a significant portion of the computation power of a parallel computer. In addition, only a fragment of the parallelism which is actually possible is in fact usable due to this coarse parallelization.

Fine-grained parallel compilers (e.g., VLIW) attempt to map the parallelism in a fine-grained form into VLIW arithmetic means that are capable of executing a plurality of computation operations in one clock cycle but may have a common register set. This limited register set is a significant problem because it must provide the data for all the computation operations. In addition, the data dependencies and inconsistent read/write operations (LOAD/STORE) make parallelization difficult. Reconfigurable processors have a large number of independent arithmetic units, typically located in a field. These are typically interconnected by buses instead of by a common register set. Therefore, vector arithmetic units are easily constructed, while it is also possible to perform simple parallel operations. In contrast with traditional register concepts, data dependencies are resolved by the bus connections.

SUMMARY

According to an example embodiment of the present invention, concepts of vectorizing compilers and parallelizing compilers (e.g., VLIW) are used at the same time for a compiler for reconfigurable processors and thus vectorization and parallelization are performed on a fine-grained level.

An advantage is that the compiler need not map onto a fixedly predetermined hardware structure, but instead the hardware structure may be configured using an example method according to the present invention so that it is optimally suitable for mapping the particular compiled algorithm.

BRIEF DESCRIPTION OF THE DRAWINGS

FIGS. 4a-4b shows implementations of loops.

FIG. 5a shows the iterative computation of

Figure 5B:
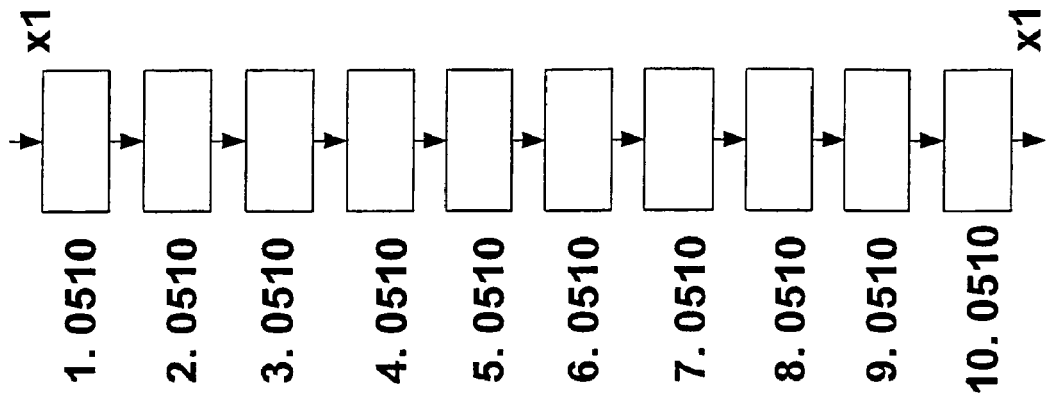

FOR i:=1 TO 10
    x1 := x1 * x1;

FIG. 5b shows the rolling out of the computation of

Figure 6:
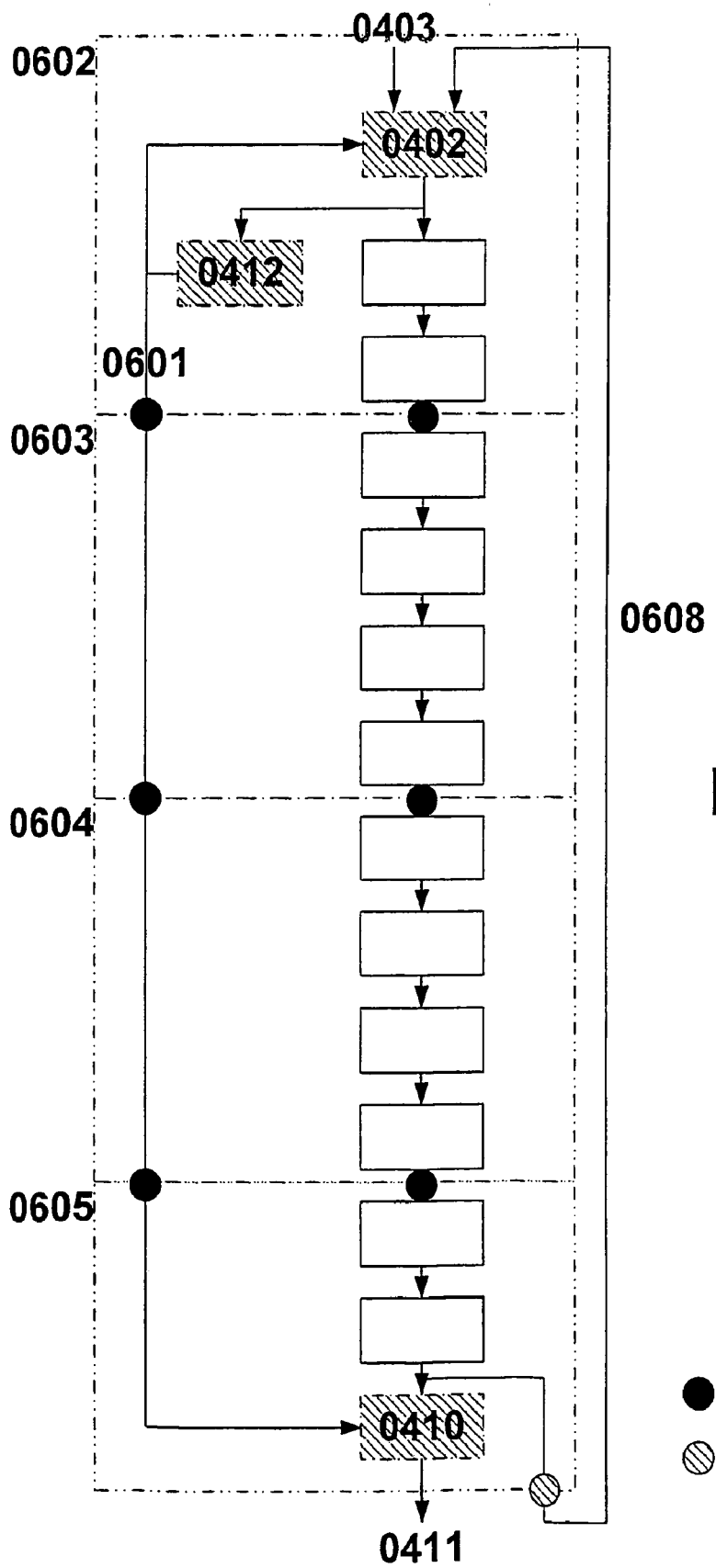

FOR i:=1 TO 10
    x1 := x1 * x1;

FIG. 6 shows the execution of a WHILE loop according to FIG. 4b over several configurations.

Figures 7A, 7B, 7C:
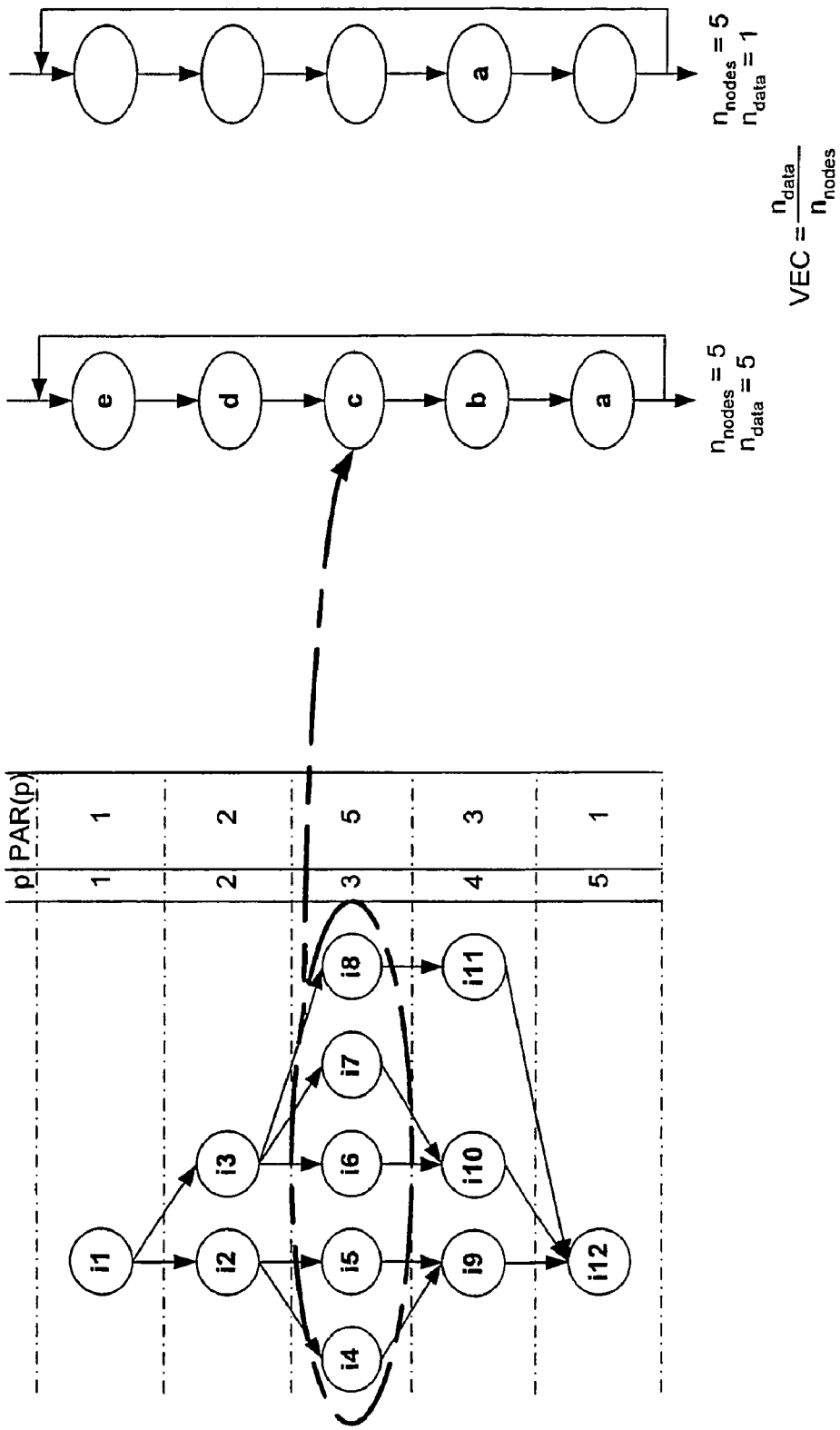

FIG. 7a shows how many ILPs may be achieved at a certain stage within the data flow graph.

FIG. 7b shows mapping onto five arithmetic means.

FIG. 7c shows processing in one arithmetic means.

Figure 8B:
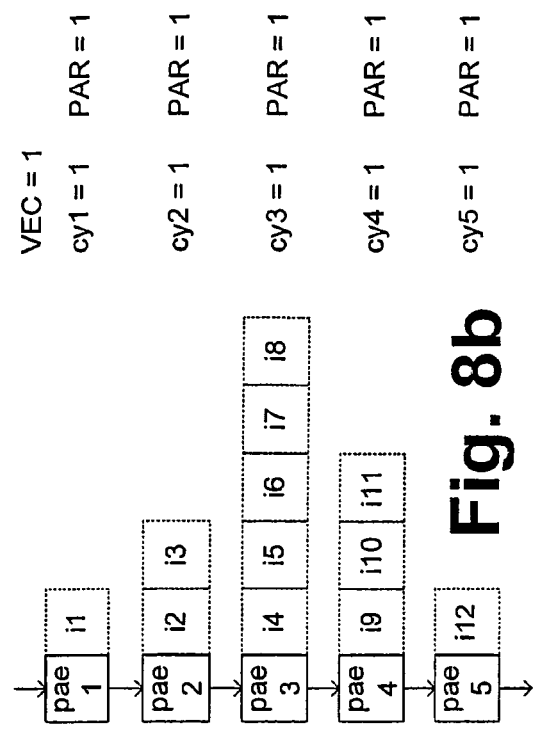
Figure 8A:
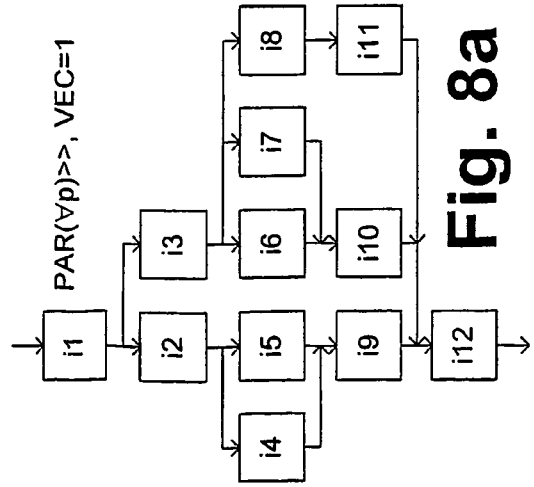

FIG. 8a shows the graph of FIG. 7a mapped onto a group of PAEs.

FIG. 8b shows sets of operations that are not parallel.

Figure 8D:
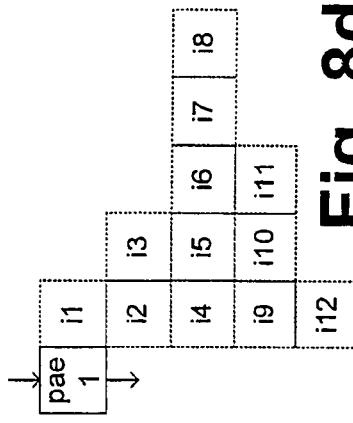
Figure 8C:
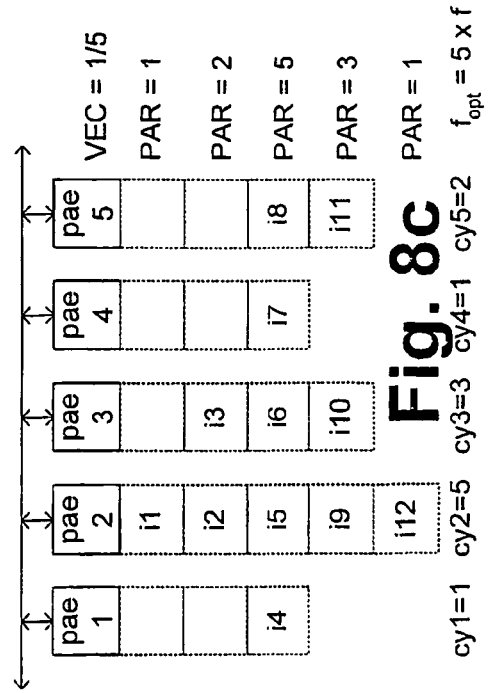

FIG. 8c shows vectorization is impossible, but PAR(p) is high.

FIG. 8d shows the graphs according to FIG. 7a in the case where there is no parallelism.

Figures 9A, 9B:
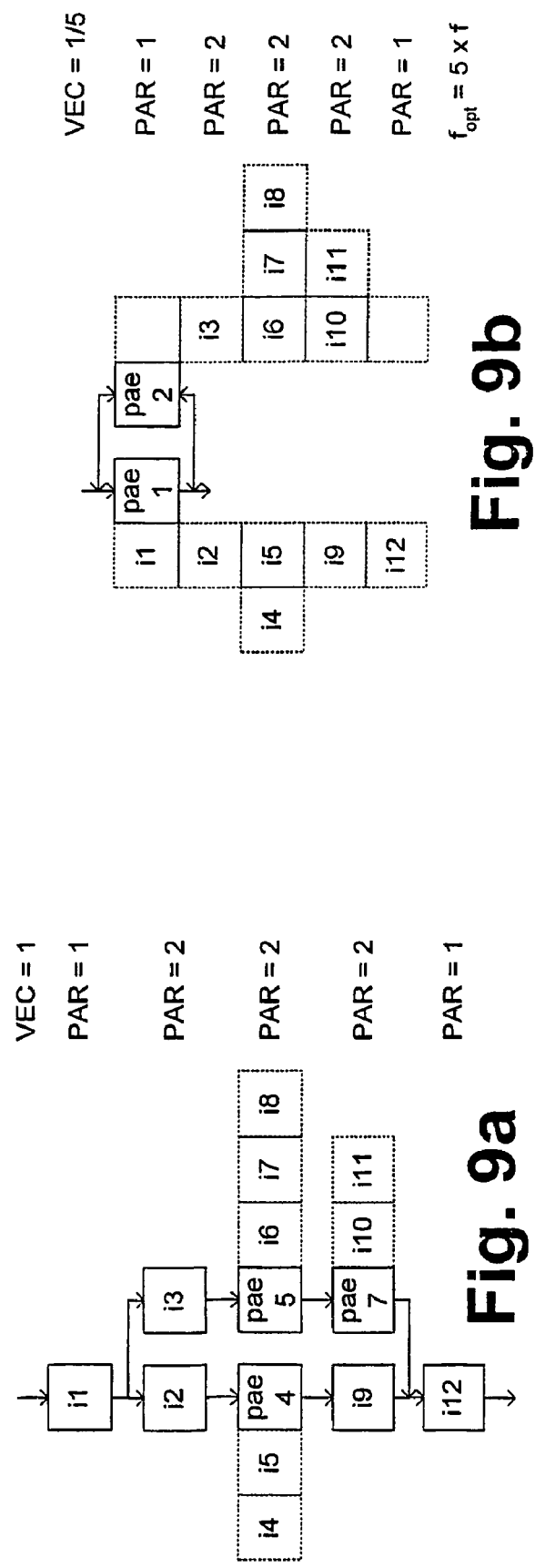

FIG. 9a shows the same function in which certain paths are executable simultaneously.

FIG. 9b shows an example in which vectorization is not possible.

2. DETAILED DESCRIPTION OF EXAMPLE EMBODIMENTS

A finite automaton is used as the basis for executing practically any method for specifying algorithms. The structure of a finite automaton is shown in FIG. 1. A simple finite automaton is broken down into a combinatory network and a register stage for temporary storage of data between the individual data processing cycles.

A finite automaton executes a number of purely combinatory data manipulations (i.e., logic and/or arithmetic manipulations, for example) and then reaches a stable state which is represented in a register (set). Based on this stable state, a decision is made as to which next state is to be reached in the next processing step and thus also which combinatory data manipulations are to be performed in the next step.

For example, a finite automaton is represented by a processor or sequencer. In a first processing step, subtraction of data may be performed. The result is stored. In the next step, a jump may be performed, based on the result of the subtraction, resulting in further processing, depending on the plus or minus sign of the result.

Figure 2:
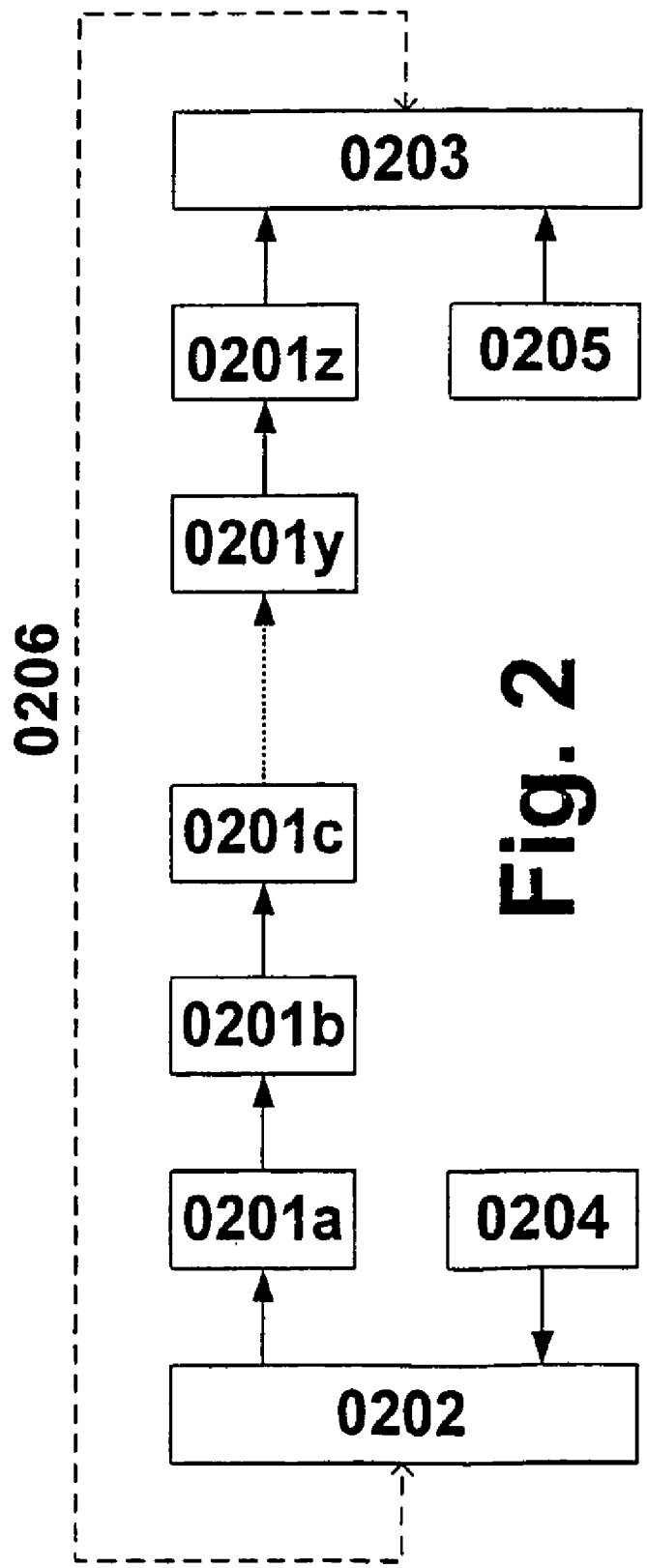
FIG. 2 shows the mapping of a finite automaton onto a reconfigurable architecture.

The finite automaton permits mapping of complex algorithms onto any sequential machines, as illustrated in FIG. 2. The complex finite automaton depicted here is made up of a complex combinatory network, a memory for storing data, and an address generator for addressing the data in the memory.

Any sequential program may fundamentally be interpreted as a finite automaton, but usually the result is a very large combinatory network. In programming classical "von Neumann" architectures—i.e., with all CPUs—the combinatory operations are therefore broken down into a sequence of simple individual fixedly predetermined operations (opcodes) on CPU-internal registers. This breakdown results in states for control of the combinatory operation, which is broken down into a sequence, but these states are not present per se within the original combinatory operation or are not required. Therefore, however, the states of a von Neumann machine that are to be processed differ fundamentally from the algorithmic states of a combinatory network, i.e., from the registers of finite automatons.

It has now been recognized that the VPU technology (such as that described by some or all of the publications PACT01, PACT02, PACT03, PACT04, PACT05, PACT08, PACT10, PACT13, PACT17, PACT18, PACT22, PACT24, which are herewith fully incorporated into the present patent application through this reference) in contrast with the rigid opcodes of CPUs makes it possible to compile complex instructions according to an algorithm to be mapped, as in flexible configurations.

2.1 The Compiler's Mode of Operation

In the mode of operation of the compiler, it may be particularly advantageous if the complex instructions are generated so that they are executed in the PAE matrix for the longest possible period of time without reconfiguration.

In addition, the compiler generates the finite automaton preferably from the imperative source text in such a way that it is particularly well adapted to the particular PAE matrix, i.e., operations which typically use coarse-grained logic circuits (ALUs, etc.), if necessary also fine-grained elements that are also present (FPGA cells in the VPU, state machines, etc.) particularly efficiently, are provided.

The compiler-generated finite automaton is then broken down into configurations.

The processing (interpretation) of the finite automaton is performed on a VPU in such a way that the generated configurations are mapped successively onto the PAE matrix and the operating data and/or states which are to be transmitted between the configurations are filed in the memory. The method described in PACT04 and/or the corresponding architecture may be used to this end. This memory is determined or provided by the compiler. A configuration here represents a plurality of instructions; at the same time, a configuration determines the operation of the PAE matrix for a plurality of cycles, and during these cycles a certain amount of data is processed in the matrix. This data comes from a VPU-external source and/or an internal memory and is written to an external source and/or an internal memory. The internal memories here replace the register set of a CPU according to the related art in such a way that, for example, a register is represented by a memory so that instead of one data word per register, a full data set is stored per memory.

The data and/or states of the processing of a configuration that is running may be filed in the memory in a manner determined by the compiler and are thus available for the next configuration to be run.

A significant difference from compilers which parallelize on the basis of instructions is thus that the method configures and reconfigures the PAE matrix in such a way that a configured sequence of combinatory networks is emulated on a VPU while traditional compilers combine loaded sequences of instructions (opcodes); in this case, an instruction may be considered a combinatory network.

2.2 Exemplary Embodiment: WHILE Language

The functioning of the compiler is illustrated below on the basis of a simple language as an example. This assumes a language the principles of which are already known, but a known publication [e.g., "Armin Nückel dissertation"] describes only the mapping of a function onto a static combinatory network, whereas in accordance with the present invention, the mapping is performed onto configurations which are then mapped onto the PAE matrix in a chronological order according to the algorithm and the states that result during processing.

The programming language assumes that there exists a "WHILE" instruction in addition to simple logical and/or arithmetic links, and this instruction is defined by the following syntax:
WHILE . . .
Possible constructs are thus:
Instruction
Sequence of instructions
Loop.

An instruction or a sequence of instructions is mappable onto a combinatory network using the compiler method described here.

Figure 3A:
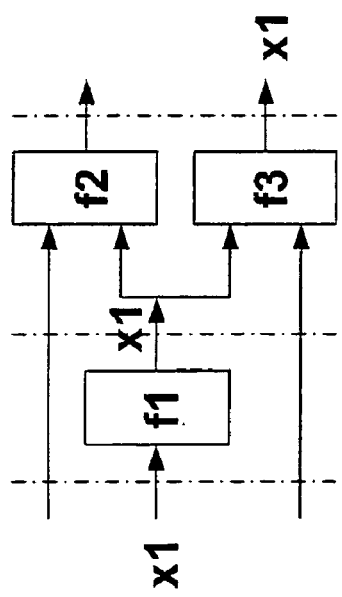
FIGS. 3a-3c shows different aspects for handling variables.

FIG. 3a shows a combinatory network and the pertinent variables. The content of one and the same variable (e.g., x1) may change from one step (0301) of the network to the next step (0302).

Figure 3B:
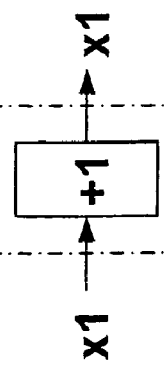

This change is depicted in FIG. 3b for the assignment

```
x1 := x1 + 1.
```

Figure 3C:
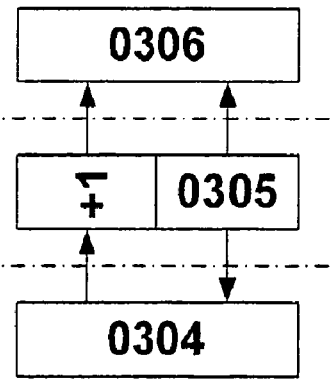

For addressing for reading the operands and for storing the results, address generators may now be synchronized with the combinatory network of the assignment. With each variable processed, corresponding new addresses are generated for operands and results (FIG. 3c). In principle, any type of address generator may be used, depending on the addressing schemes of the compiled application. Shared, combined, or completely independent address generators may be implemented for operands and results.

Typically a plurality of data is processed within a certain configuration of PAEs in the data processing as in the present data processing model. Therefore, the compiler is preferably designed for the simple FIFO mode which is possible in many if not most applications and is applicable at least for the data memories, which are used within this description for storing data and states of the data processing (more or less as a replacement for a traditional register set of conventional CPUs). In other words, memories are used for temporary storage of variables between configurations. Here again, a configuration is like an instruction of a normal processor, and the memories (in particular a plurality of memories) are comparable to the register set of a normal processor.

2.2.3 Sequences of Instructions

A sequence of the exemplary assignment may be generated as follows (FIG. 4a):

```
x1 := 0;
WHILE TRUE DO
    x1 := x1 + 1;
```

This sequence may now be mapped via an assignment according to 2.2.1 and address generators for operands and results.

Finite Sequences

For the sake of thoroughness, a particular embodiment of sequences apart from the defined constructs of the WHILE language will now be discussed. A finite sequence of the exemplary assignment may be generated as follows:

```
FOR i := 1 TO 10
    x1 := X1 + 1;
```

Such a sequence may be implemented by two methods:
a) By generating an adder for computing i according to the WHILE construct (see 2.2.4) and another adder for computing x1. The sequence is mapped as a loop and is computed iteratively (FIG. 5a).
b) By rolling out the loop, so that the computation of i as a function is eliminated. The computation of x1 is instantiated i times and is constructed as a pipeline, resulting in i adders connected in series (FIG. 5b).

2.2.4 Conditions

Conditions may be expressed via WHILE. For example:

```
x1 := 0;
WHILE x1 < 10 DO
    x1 := x1 + 1;
```

The mapping generates an additional PAE for processing the comparison. The result of the comparison is represented by a status signal (see, e.g., Trigger described in PACT08), which is analyzed by the PAEs processing the instruction and the address generators.

FIG. 4b shows the resulting mapping.

By analyzing the condition (WHILE here, in general and reasonably also other instructions such as IF; CASE implementable), a status is generated which may be made available to the subsequent data processing (DE 197 04 728.9) and/or may be sent to the CT or a local load control (DE 196 54 846.2) which then derives information therefrom regarding the further program flow and any pending reconfigurations.

2.2.5 Basic Method

According to the previous method, each program is mapped into a system having the following structure:
1. Memory for operands (comparable to the register of a CPU)
2. Memory for results (comparable to the register of a CPU)
3. Network of a) assignments and/or b) compare instructions, i.e., conditions such as IF, CASE, loops (WHILE, FOR, REPEAT)
4. Optional address generator(s) for triggering the memories according to 1 and 2.

2.2.6 Handling of States

For the purposes of the compiler described here, a distinction is now made between states that are relevant to the algorithm and those that are not. States are usually depicted in the VPU technology by status signals (e.g., trigger in PACT08) and/or handshakes (e.g., RDY/ACK in PACT02). In general, states (in particular in other technologies, e.g., FPGAs, DPGAs, Chameleon modules, Morphics, etc.) may be represented by any signals, signal bundles and/or registers. The compiler method described here may also be applied to such technologies, although important parts of the description are preferentially focused on the VPU.

Relevant states are necessary within the algorithm to describe its correct function. They may be important for the algorithm.

Irrelevant states occur due to the hardware used and/or the selected mapping or for other secondary reasons. They are thus may be essential for the mapping (i.e., the hardware).

Only the relevant states must be obtained with the data. Therefore, these states are filed together with the data in the memories because they occur with the data either as a result of the processing or they are necessary as operands with the data for the next processing cycle.

Irrelevant states, however, are necessary only locally and/or chronologically locally and therefore need not be stored.

Example a) The state information of a comparison is relevant for further processing of data because it determines the functions to be executed.
b) It is assumed that a sequential divider is formed, e.g., by mapping a division instruction onto hardware which supports only sequential division. This results in a state which characterizes the computation step within the division. This state is irrelevant because only the result (i.e., the division that is performed) is necessary for the algorithm. Thus, only the result and the time information (i.e., the availability) are required in this case. The compiler preferably differentiates between such relevant and irrelevant states.

The time information is accessible, for example, via the RDY/ACK handshake in VPU technology described in PACT01, 02, 13. However, it should be pointed out here that the handshake also does not represent a relevant state because it only signals the validity of the data so this in turn reduces the remaining relevant information to the existence of valid data.

2.2.7 Handling of Time

In many programming languages, in particular in sequential languages such as C, an exact chronological sequence is determined implicitly by the language. In sequential programming languages, this is accomplished, for example, by the sequence of individual instructions. If this is required by the programming language and/or the algorithm, the compiler method is executed in such a way that the time information may be mapped onto synchronization models such as RDY/ACK and/or REQ/ACK or a time stamp method described in German Patent Application No. DE 101 10 530.4.

In other words, the implicit time information of sequential languages is mapped into a handshake protocol in such a way that the handshake protocol (RDY/ACK protocol) transmits the time information and in particular ensures the sequence of instructions.

For example, the following FOR loop is run and iterated only when the variable inputstream is acknowledged using a RDY for each run. If there is no RDY, the loop run is stopped until RDY arrives.

```
while TRUE
    s := 0
    for i := 1 to 3
        s := s + inputstream;
```

The property of sequential languages of being controlled only by instruction processing is thus linked during compiling to the data flow principle to control the processing through the data stream, i.e., the existence of data. In other words, a command and/or an instruction (e.g., s:=s+inputstream;) is processed only when the operation may be executed and the data is available.

It is noteworthy that this method does not usually result in any change in the syntax or semantics of a high-level language. Thus, existing high-level language code may be brought to execution on a VPU without problems by recompiling.

2.2.8 Loading and Storing Data

For the principles of the load/store operations, the following is noteworthy.

The following types of addressing are treated differently:
1. External addressing, i.e., data transfers using external modules
2. Internal addressing, i.e., data transfer between PAEs, in particular between RAM PAEs and ALU PAEs.

Furthermore, special attention should be devoted to chronological decoupling of data processing and data loading and storing.

Bus transfers are broken down into internal and external transfers.

bt1) External read accesses (load operations) are separated, and in one possible embodiment, they are also preferentially translated into a separate configuration. The data is transferred from an external memory to an internal memory.

bt2) Internal accesses are linked to the data processing, i.e., the internal memories (register operation) are read and/or written to for the data processing.

bt3) External write accesses (store operation) are separated, i.e., in a preferred possible embodiment they are also translated into a separate configuration. The data is transferred from an internal memory to an external memory.

It is essential that bt1, bt2 and bt3—i.e., loading the data (load), processing the data (data processing and bt2) and writing the data (bt3)—may be translated into different configurations which may, if necessary, be executed at a different point in time.

This method will now be illustrated on the basis of the following:

```
function example (a, b : integer) → x : integer
    for i := 1 to 100
        for j := 1 to 100
            x[i] := a[i] * b[j]
```

This function may be transformed by the compiler into three parts, i.e., configurations (subconfig):

example#dload: loads the data from external memories, peripherals, etc. and writes it into internal memories. Internal memories are identified by r# and the name of the original variable.

example#process: corresponds to the actual data processing. It reads the data out of internal operands and writes the results back into internal memories.

example#dstore: writes the results from the internal memories to external memories, peripherals, etc.

```
function example# (a, b integer) → x : integer
    subconfig example#dload
        for i := 1 to 100
            r#a[i] := a[i]
        for j := 1 to 100
            r#b[j] := b[j]
    subconfig example#process
        for i := 1 to 100
            for j := 1 to 100
                r#x[i] := r#a[i] * r#b[j]
    subconfig example#dstore
        for i := 1 to 100
            x[i] := r#x[i]
```

One effect of this method is that instead of i*j=100*100=10,000 external accesses, only i+j=100+100=200 external accesses are executed to read the operands. These accesses are also completely linear, which greatly speeds up the transfer rate with today's bus systems (burst) and/or memories (SDRAM, DDRAM, RAMBUS, etc.).

The internal memory accesses are performed in parallel because different memories have been assigned to the operands.

For writing the results, i=100 external accesses are necessary and these may also be performed again linearly with maximum performance.

If the number of data transfers is not known in advance (e.g., WHILE loop) or is very large, a method that reloads the operands as needed through subprogram calls and/or which writes the results externally may be used. In a preferred embodiment, the states of the FIFOs may (also) be queried; 'empty' when the FIFO is empty and 'full' when the FIFO is full. The program flow responds according to the states. It should be pointed out that certain variables (e.g., ai, bi, xi) are defined globally. For performance optimization, a scheduler may execute the configurations example#dloada, example#dloadb even before the call of example#process according to the methods already described, so that data is already preloaded. Likewise, example#dstore(n) may also be called up after termination of example#process in order to empty r#x.

```
subconfig example#dloada(n)
    while !full(r#a) AND ai<=n
        r#a[ai] := a[ai]
        ai++
subconfig example#dloadb(n)
    while !full(r#b) AND bi<=n
        r#b[bi] := b[bi]
        bi++
subconfig example#dstore(n)
    while !empty(r#x) AND xi<=n
        x[xi] := r#x[xi]
        xi++
subconfig example#process
    for i := 1 to n
        for j := 1 to m
            if empty(r#a) then example#dloada(n)
            if empty(r#b) then example#dloadb(m)
            if empty(r#x) then example#dstore(n)
            r#x[i] := r#a[i] * r#b[j]
            bj := 1
```

The subprogram calls and the management of the global variables are comparatively complex for reconfigurable architectures. Therefore, in a preferred embodiment, the following optimization may be performed, in which all the configurations are running largely independently and terminate after complete processing. Since the data b[j] is needed repeatedly, example#dloadb must be run several times accordingly. Two alternatives are presented for this as an example:

Alternative 1: example#dloadb terminates after each run and is reconfigured by example#process for each restart.
Alternative 2: example#dloadb runs infinitely and is terminated by example#process.

A configuration is inactive (waiting) during 'idle.'

```
subconfig example#dloada(n)
    for i := 1 to n
        while full(r#a)
            idle
        r#a[i] := a[i]
    terminate
subconfig example#dloadb(n)
    while 1 // ALTERNATIVE 2
        for i := 1 to n
            while full(r#b)
                idle
            r#b[i] := a[i]
        terminate
subconfig example#dstore(n)
    for i := 1 to n
        while empty(r#b)
            idle
        x[i] := r#x[i]
    terminate
subconfig example#process
    for i := 1 to n
        for j := 1 to m
            while empty(r#a) or empty(r#b) or full (r#x)
                idle
            r#x[i] := r#a[i] * r#b[j]
            config example#dloadb(n) // ALTERNATIVE 1
        terminate example#dloadb(n) // ALTERNATIVE 2
    terminate
```

To prevent waiting cycles, configurations may also be terminated as soon as they are temporarily unable to continue fulfilling their function. The corresponding configuration is removed from the reconfigurable module but it remains in the scheduler. The instruction 'reenter' is used for this purpose below. The relevant variables are saved before termination and are restored in the repeated configuration:

```
subconfig example#dloada(n)
    for ai := 1 to n
        if full(r#a) reenter
        r#a[ai] := a[ai]
    terminate
subconfig example#dloadb(n)
    while 1 // ALTERNATIVE 2
        for bi := 1 to n
            if full(r#b) reenter
            r#[bi] := a[bi]
        terminate
subconfig example#dstore(n)
    for xi := 1 to n
        if empty(r#b) reenter
        x[xi] := r#x[xi]
    terminate
subconfig example#process
    for i := 1 to n
        for j := 1 to m
            if empty(r#a) or empty(r#b) or full (r#x) reenter
            r#x[i] := r#a[i] * r#b[j]
            config example#dloadb(n) // ALTERNATIVE 1
        terminate example#dloadb(n) // ALTERNATIVE 2
    terminate
```

2.3 Macros

More complex functions of a high-level language such as loops are typically implemented by macros. The macros are therefore preselected by the compiler and are instantiated at translation time (see FIG. 4).

The macros are either constructed from simple language constructs of the high-level language or they are constructed at the assembler level. Macros may be parameterized to permit simple adaptation to the algorithm described (see FIG. 5, 0502). In the present case, the macros are also to be incorporated.

2.4 Feedback Loops and Registers

Undelayed feedback loops may occur within the mapping of an algorithm into a combinatory network and may oscillate in an uncontrolled manner.

In VPU technologies implemented in practical terms according to PACT02, this is prevented by a construct of the PAE in which at least one register is defined for decoupling, more or less fixedly in the PAEs.

In general, undelayed feedback loops are discernible through graphic analysis of the resulting combinatory network. Registers are then deliberately inserted for separation into the data pathways in which there is an undelayed feedback loop. The compiler may thus manage register means, i.e., memory means.

Due to the use of handshake protocols (e.g., RDY/ACK according to 2.2.7), the correct function of the computation is also ensured by the insertion of registers.

2.5 Processor Model/Time Domain Multiplexing (TDM)

Basically, each PAE matrix implemented has virtually only one finite variable. In the following step, a partitioning of the algorithm according to section 2.2.5 paragraph 4 a/b into a plurality of configurations, which are configured one after the other into the PAE matrix, must therefore be performed. The goal is typically to compute the largest possible number of data packets in the network without having to perform a reconfiguration.

Between configurations, a temporary storage is performed, with the buffer memory—similar to a register in the case of CPUs—storing the data between the individual configurations that are executed sequentially.

A sequential processor model is thus created by reconfiguring configurations, data processing in the PAE matrix, and temporary storage in the memories.

In other words, due to the compiling described here, instead of an opcode, complex configurations are executed sequentially in VPU technology. While in the case of CPUS, an opcode typically processes a data word, in VPU technology a plurality of data words (a data packet) is processed by a configuration. The efficiency of the reconfigurable architecture is therefore increased due to a better ratio between reconfiguration complexity and data processing.

At the same time, instead of a register, a memory is used in VPU technology because instead of processing data words, data packets are processed between configurations.

This memory may be designed as a random access memory, a stack, a FIFO or any other memory architecture, although a FIFO is typically the best and the simplest option to be implemented.

Data is then processed by the PAE matrix according to the configured algorithm and is stored in one or more memories. The PAE matrix is reconfigured after processing a volume of data and the new configuration takes the intermediate results from the memory (memories) and continues the execution of the program. New data may then of course be incorporated into the computation from external memories and/or the periphery and likewise results may be written to external memories and/or the periphery.

In other words, the typical sequence in data processing is read-out from internal RAMs, processing the data in the matrix and writing data to the internal memories, and any external sources, or targets for the data transfer may be used additionally to or instead of the internal memories for data processing.

Although "sequencing" in CPUs is defined as reloading of an opcode, "sequencing" of VPUs is therefore defined as (re)configuring configurations according to what was said above. However, this does not mean that under certain conditions, parts of the field may not be operated as a sequencer in the conventional sense.

The information as to when and/or how sequencing is performed, i.e., which next configuration is to be configured, may be represented by various pieces of information which may be used individually or in combination. For example, the following strategies are appropriate for deriving the information either alone and/or in combination, i.e., alternatively:
a) defined by the compiler at translation time;
b) defined by the event network (trigger, DE 197 04 728.9), where the event network may represent internal and/or external states;
c) by the degree of filling of the memories (trigger, DE 197 04 728.9, DE 196 54 846.2-53).

2.5.1 Influence of the TDM on the Processor Model

Partitioning of the algorithm determines to a significant extent the relevant states which are filed in the memories between the various configurations. If a state is relevant only within a configuration (locally relevant state), it is not necessary to store it, which is taken into account preferentially by the compiler method.

For the purposes of debugging the program to be executed, however, it may nevertheless be expedient to store these states to permit that they are accessed by the debugger. Reference is made to German Patent Application No. DE 101 42 904.5, which is herewith incorporated to the full extent for disclosure purposes.

Furthermore, additional states may become relevant when using a task switch mechanism (e.g., by an operating system or interrupt sources) and the configurations being executed currently are interrupted, other configurations are loaded and/or the aborted reconfiguration is to be resumed at a later point in time. A detailed description follows in the section below.

A simple example should show a differentiating factor for locally relevant states:
a) A branching of the type "if ( ) then . . . else . . . " fits completely into a single configuration, i.e., both data paths (branches) are mapped jointly completely within the configuration. The state that is obtained in the comparison is relevant, but locally relevant, because it is no longer needed in the following configurations.
b) The same branching is too large to fit completely into a single configuration. Multiple configurations are necessary to map the complete data paths. In this case, the status is globally relevant and must be stored and assigned to the particular data because the subsequent configurations require the particular state of the comparison in further processing of the data.

2.6 Task Switching

The possible use of an operating system has an additional influence on the consideration and handling of states. Operating systems use task schedulers, for example, to manage multiple tasks to make multitasking available.

Task schedulers interrupt tasks at a certain point in time, and start other tasks, and after processing these other tasks, they resume further processing of the interrupted task.

If it is ensured that a configuration—which may correspond here to processing a task—is terminated only after being completely processed, i.e., when all the data and states to be processed within this configuration cycle have been stored—then locally relevant states may remain unstored. This method, i.e., complete processing of a configuration and the subsequent task switching, is the preferred method for operating reconfigurable processors and corresponds essentially to the sequence in a normal processor which first completes the assignments currently being processed and then changes tasks.

For many applications, however, a particularly prompt response to a task change request is necessary, e.g., in real-time applications. It may be expedient here to abort configurations before they are completely processed.

If the task scheduler aborts configurations before they are completely processed, local states and/or data must be saved. This is also advantageous when the processing time of a configuration is not predictable. In conjunction with the known halting problem and the risk that a configuration may not be terminated at all, e.g., due to an error, this also seems appropriate to prevent the entire system from being deadlocked. Therefore, in the present case, relevant states are also to be regarded as including those that are necessary for a task change and a renewed correct resumption of data processing, taking into account task switching.

In task switching, the memory for results is thus to be saved and, if necessary, the memory for operands is also to be saved and restored at a later point in time, i.e., when resuming this task. This may be performed in a manner comparable to that used with PUSH/POP instructions and conventional methods. In addition, the state of data processing must be saved, i.e., the pointer at the last operand processed completely. Reference is made here to PACT18 in particular.

Depending on the optimization of task switching, there are two possibilities here, for example:

a) The aborted configuration is reconfigured and only the operands are loaded. Data processing thus begins anew as if processing of the configuration had not yet begun. In other words, all data computations are simply executed from the beginning, even if some computations have been performed previously. This option is simple but not efficient.

b) The aborted configuration is reconfigured, with the operands and the results already computed being loaded into the particular memory. Data processing continues with operands that have not been computed completely. This method is much more efficient but presupposes that additional states which occur during processing of the configuration may become relevant, e.g., if at least one pointer, pointing to the last operands completely computed, must be saved, so that after a successful reconfiguration, their successors may be reset.

2.7 Context Switching

A particularly preferred variant for managing relevant data is made available through the context switching described below. In task switching and/or in execution of configurations and switching configurations (see, for example, German Patent Application No. DE 102 06 653.1, which is herewith incorporated to the full extent for disclosure purposes), it may be necessary to save data or states which are typically not saved in the memory together with the operating data, because they only mark an end value, for a subsequent configuration.

The context switching which is implemented preferentially according to the present invention is performed in such a way that a first configuration is removed and the data to be saved remains in the corresponding memories (REGs) (memories, registers, counters, etc.).

A second configuration which connects the REG to one or more global memories in a suitable manner and in a defined sequence may then be loaded.

The configuration may use address generators, for example, to access the global memory (memories). It is therefore not necessary to first have each individual memory location defined by the compiler and/or to access REGs embodied as memories.

According to the configured connection between REGs, the contents of the REGs are written in a defined sequence into the global memory, the particular addresses being preselected by address generators. The address generator generates the addresses for the global memory or memories so that the memory areas written (PUSH AREA) may be unambiguously assigned to the first configuration that has been removed.

Different address spaces are thus preferentially provided for different configurations. The configuration here corresponds to a PUSH of ordinary processors.

Other configurations then use the resources.

Now the first configuration is to be restarted. First, a third configuration, which interconnects the REGs of the first configuration in a defined sequence, is started.

The configuration may in turn use address generators, for example, to access the global memory or memories and/or to access REGs embodied as memories.

An address generator preferably generates addresses so that the PUSH AREA assigned to the first configuration is accessed correctly. The generated addresses and the configured sequence of the REGs are such that the data in the REGs is written from the memories into the REGs in the original order. This configuration corresponds to a POP of ordinary processors.

The first configuration is then restarted.

In summary, a context switch is preferably performed in such a way that by loading particular configurations, which operate like PUSH/POP of known processor architectures, data to be saved is exchanged with a global memory. This data exchange via global memories using PUSH/POP exchange configurations is regarded as being particularly relevant.

This function is to be illustrated in an example: A function adds two rows of numbers; the length of the rows is not known at translation time and is only known at run time.

```
proc example
    while i<length do
        x[i] = a[i] + b[i]
        i = i + 1
```

The function is then interrupted during its execution, e.g., by a task switch or because the memory provided for x is full; a, b, x are at this point in time in memories according to the present invention; however, i, and possibly length, must be saved.

To do so, the configuration "example" is terminated, with the register contents being saved and a PUSH configuration being started, and with i and length being read out of the registers and written to a memory.

```
proc push
    mem[<push_adr_example>] = i
    push_adr_example++
    mem[<push_adr_example>] = length
```

After execution, PUSH is terminated and the register contents may be deleted.

Other configurations are executed. After a period of time, the configuration "example" is restarted.

First a configuration "POP" is started, reading the register contents out of the memory again.

```
proc pop
    i = mem[<push_adr_example>]
    push_adr_example++
    length = mem[<push_adr_example>]
```

After execution, POP is terminated and the register contents are kept. The configuration "example" is restarted.

2.8 Algorithmic Optimization

Control structures are separated from algorithmic structures by the translation method described here. For example, a loop is broken down into a body (WHILE) and an algorithmic structure (instructions).

The algorithmic structures are preferably optionally optimizable by an additional tool downstream from the separation.

For example, downstream algebra software may optimize and minimize the programmed algorithms. These tools are known by such names as AXIOM, MARBLE, etc., for example. A more rapid execution of the algorithm and/or a substantially reduced space requirement may be achieved by minimization.

The result of the optimization is then sent back to the compiler and processed further accordingly.

It should also be pointed out that modern compilers (front ends) have already implemented a number of optimizations for algorithms (including in some cases algebraic optimizations) which are of course still usable as part of the method described here.

It should be pointed out explicitly that the example method described here, in particular section 2.2.7 "Handling of time" and section 2.3 "Macros," may also be applied to compilers according to PACT20. PACT20 is expressly incorporated herewith by reference in the present patent application to the full extent for disclosure purposes.

3. APPLICABILITY FOR PROCESSORS ACCORDING TO THE RELATED Art, in Particular Having a VLIW Architecture It should be pointed out in particular that instead of a PAE matrix, a system of arithmetic logic units (ALUs) according to the related art, such as those conventionally used in VLIW processors and/or a system of complete processors such as those conventionally used in multiprocessor systems, may be used, for example. The use of a single ALU constitutes a special case here, so that this method is also applicable for normal CPUs.

A method which permits translation of the WHILE language into semantically correct finite automatons was developed in the dissertation [see, e.g., dissertation of Armin Nückel]. In addition, a finite automaton may be used as a "subprogram" and vice-versa. This yields the possibility of mapping a configuration onto different implementation technologies such as CPUs, symmetrical multiprocessors, FPGAs, ASICs, VPUs.

In particular, it is possible to assign optimally suitable hardware to parts of an application and/or to determine a particular suitability and assign optimum hardware on the basis of the better or worse suitability. Preferably temporary distribution and reservation of resources may also be detectable. In other words, for example, a data flow structure would be assigned to a data flow architecture, while a sequential structure is mapped onto a sequencer if these are available and/or present.

The resulting problems of the resource assignments for the individual algorithms may be solved, e.g., by a "job assignment" algorithm for managing the assignment.

4. IMPLEMENTATION

The implementation of a compiler according to the present invention should be based on a "normal" sequential programming language such as C or Pascal. These languages have the property that due to their sequential character, a chronological sequence is implicitly and artificially generated due to the language definition per se.

Example A

| | |
|---|---|
| Line 1: | i++ |
| Line 2: | a = i * b |
| Line 3: | x = p - a |
| Line 4: | j = i * i |

The language definition fixedly predetermines that line 1 is executed before line 2 before line 3 before line 4. However, line 4 could also be executed directly after line 1 and thus simultaneously with lines 2 and 3.

In other words, through sequential languages, additional artificial and not algorithmically determined states are incorporated. Only the correct chronological sequence of the computations in example A is important. Line 4 must not be computed until i is correctly defined, i.e., after the processing of line 1. Line 2 also must not be processed until after the correct definition of i (i.e., after processing line 1). Line 3 requires the results of line 2 (variable a) and therefore may not be computed until after correct definition of variable a. This results in a data dependence but no particular states.

On the basis of the data dependencies of variable a in lines 2 and 3 (line 3 uses a as an operand; a is the result of line 2), the following transformation may thus be performed automatically by the compiler for representation of the parallelizability and/or vectorizability (ParVec transformation):

| | |
|---|---|
| Line 2: | VEC{a = i * b; |
| Line 3: | x = p - a} |

VEC means that each term separated by ';' is processed in succession; the terms inside the braces may basically be pipelined. Preferably all computations must be performed at the end of VEC{ } and concluded so that data processing is continued downstream from the VEC.

In an internal representation of the data structures in the compiler, the two computations are preferably marked as a vector:

| |
|---|
| VEC{a=i*b; x=p-q} |

Line 4 yields a simple vector:

$$\text{VEC}\{j = i*i\}$$

Since line 4 may be computed at the same time as lines 2 and 3, the parallelism may be expressed as follows:

$$\text{PAR}\{\{\text{VEC}\{a=i*b; x=p-a\}; \text{VEC}\{j=i*i\}\}$$

PAR means that each term separated by '{••}' may be processed at the same time. Preferably all computations roust be performed and concluded at the end of PAR{ } so that data processing is continued downstream from PAR.

If line 1 is included, this yields:

$$\text{VEC}\{i++; \text{PAR}\{\{\text{VEC}\{a=i*b; x=p-a\}\}\{\text{VEC}\{j=i*i\}\}\}\}$$

Since VEC{j=i*i} represents a vector having only one element, it may also be written as follows:

$$\text{VEC}\{i++; \text{PAR}\{\{\text{VEC}\{a=i*b; x=p-a\}\}\{j=i*i\}\}\}$$

Another example shows a real state.

Example B

| | | |
|---|---|---|
| Line 1: | i++ | |
| Line 2: | a = i * b | |
| Line 3: | if a < 100 { | |
| Line 4: | x = p − a | |
| Line 5: | } else { | |
| Line 6: | j = i * i | |

Line 6 may now be executed only after the computation of lines 2 and 3. Lines 4 and 6 are computed alternatively. The state of line 3 is thus relevant for further data processing (relevant state).

Conditional states may be expressed by IF in the case of a transformation:

| | |
|---|---|
| Lines 1–2: | VEC{i++; a=i*b} |
| Line 3: | IF{{a<100}{line4}{line 6}} |
| Line 4: | VEC{x=p−a} |
| Line 6; | VEC{j=i*i} |

In summary, this yields $$\text{VEC}\{i++; a=i*b; \text{IF}\{\{a<100\}\{\text{VEC}\{x=p-a\}\}\{\text{VEC}\{j=i*i\}\}\}\}$$

Other relevant states are generated by looping:

Example C

| | |
|---|---|
| Line 1: | for (i = 1, i < 100, i++) |
| Line 2: | a = a * i |
| Line 3: | q = p / a |

Line 3 may be executed only after the loop has been terminated. There are thus relevant states in the case of conditional jumps.

A first transformation of the loop yields:

| | |
|---|---|
| Line 1: | i=1; |
| Line 2: loop: | if i >= 100 then exit |
| Line 3: | a = a * i |
| Line 4: | i++ |
| Line 5: | jump loop |
| Line 6: exit: | q = p / a |

Lines 3 and 4 may be computed in parallel because line 4 does not depend on the result of line 3:

$$\text{PAR}\{\{a=a*i\}\{i++\}\}$$

Line 5 yields a vector with the generated PAR because only after complete computation of values is it possible to jump back into the loop (so there is a time dependence here).

$$\text{VEC}\{\text{PAR}\{\{a=a*i\}\{i++\}\}; \text{jump loop}\}$$

This yields the following for the condition:

$$\text{loop: IF}\{\{i>=100\}\{\text{jump exit}\}\{\text{VEC}\{\text{PAR}\{\{a=a*i\}\{i++\}\}; \text{jump loop}\}\}\}$$

Line 1 is a vector with the condition since it must be executed before the condition (IF uses i as an operand; i is the result of line 1).

Line 6 is in turn a vector with the condition since a is used as an operand, and a is the result of the condition.

This yields the following (in simplified notation):

```
VEC{
    i++;
    loop: IF{
        {i>=100}
        {jump exit}
        {VEC{
            PAR{
                {a=a*i}
                {i++}
            };
            jump loop
        }
    }
    };
    exit: q=p/a
}
```

The contents of VEC{ } and PAR{ } may be considered as purely combinatory networks.

VEC and PAR are preferably designed as a Petri network to control further processing after complete processing of the particular contents, as is preferred.

Due to the possibility of considering VEC and PAR as a purely combinatory network, it becomes necessary to ensure the state of the loop. In other words, in this case it is in fact necessary to create a finite automaton.

The instruction REG{ } stores variables in a register to this end. Thus, a finite automaton which is constructed exactly according to the algorithm is obtained due to the use of the combinatory networks VEC and PAC in conjunction with the register REG:

```
VEC{
    i++;
    loop: IF{
        {i>=100}
        {jump exit}
        {VEC{
            PAR{
                {a=a*i}
                {i++}
            };
            REG {a:i}
            jump loop
            }
        }
    };
    exit: q=p/a
}
```

It should be pointed out in particular that in PACT XPP's VPU technology (see PACT21) input and/or output registers are provided on the PAEs, the chronological correctness and the availability of data are ensured by an integrated handshake protocol (RDY/ACK). To this extent, the requirement of having their internal data processing concluded preferably on leaving VEC{ } or PAR{ } is automatically met for all variables to be used subsequently (if data processing were not concluded, the subsequent computation steps would wait for the end and the arrival of the data). Oscillating feedback is also ruled out due to the integrated registers.

To this extent, the following term is correct for this technology:

```
VEC{PAR{{a=a*i}{i++}}; jump loop}
```

For other technologies which do not have the aforementioned embodiments or have them only partially, the term should be formulated as follows:

```
VEC{PAR{{a=a*i}{i++}}; REG{a,i}; jump loop}
```

It should be pointed out that this form also results in correct and optimum mapping of the algorithm onto the reconfigurable processor in the applicant's VPU technology.

REG may be used within combinatory networks VEC and PAR. Strictly considered, VEC and PAR thus lose the property of combinatory networks. Abstractly, however, REG may be regarded as a complex element (REG element) of a combinatory network on which a processing time of its own is based. Processing of the following elements is made dependent on termination of computation of the REG element.

With an awareness of this conceptual inaccuracy, use of REG within VEC and PAR is allowed hereinafter and may also be necessary in particular.

As already mentioned above, use of REG is typically not necessary within a configuration of a VPU of the applicant, but is generally always explicitly necessary when the computation results of a configuration are stored so that REG in fact corresponds to the explicit register of a finite automaton in this application case.

In addition to synthesis of finite automatons for loops, finite automatons may be necessary in another case in particular:

If an algorithm is too large to be processed completely within the PAEs of a reconfigurable processor, it must be broken down into several subalgorithms. Each subalgorithm represents a configuration for the reconfigurable processor. The subalgorithms are configured in succession, i.e., sequentially on the processor, the results of the preceding configuration(s) being used as operands for the particular new configuration.

In other words, the reconfiguration results in a finite automaton which processes and stores data at a point in time t, and processes, differently if necessary, and re-stores the stored data at a point in time t+1, possibly after reconfiguration. It is essential that t is not defined in the traditional sense by clock pulses or instructions but instead by configurations. Reference is made here in particular to the processor model presentation (PACT, October 2000, San Jose).

In other words, a configuration includes a combinatory network of VEC and/or PAR the results of which are stored (REG) for further use in the next configuration:

| Configuration 1: | VEC{Operands; {VEC|PAR};REG{Results1}} |
| Configuration 2: | VEC{Results1; {VEC|PAR};REG{Results2}} |
| ... | |

For the sake of simplicity, the above examples and descriptions have introduced the constructs VEC, PAR and REG into the high-level languages and structured them accordingly. Typically and preferably, this structuring is only performed at the level of the intermediate language (see *Principles of Compiler Design (Red Dragon)*, Aho, Sethi, Ullmann).

It should be pointed out in particular that the structuring of algorithms using VEC, PAR and REG is typically performed completely automatically by the compiler by methods such as graph analysis, for example.

In particular, however, it is also possible and to some extent advantageous to permit the programmer himself to structure in the high-level language by permitting VEC, PAR and REG to be written to directly in the high-level language as described above.

Generation

Automatic generation of VEC, PAR, and REG may be performed at different levels of a compilation operation. The most enlightening initially is described during a preprocessor run on the basis of the source code as in the preceding examples. However, a particularly adapted compiler is then necessary for further compilation.

Another aspect is that compilers usually perform automatic code optimization (e.g., in loops). Therefore, an efficient breakdown of the code is advisable only after the optimization runs, in particular when compilers (such as SUIF, University of Stanford) are already optimizing the code for parallelization and/or vectorization.

The particularly preferred method is therefore to tie the analyses into the back end of a compiler. The back end translates a compiler-internal data structure to the instructions of a target processor.

Pointer structures such as DAGs/GAGs, trees or 3-address codes are usually used as the compiler-internal data structures (see *Principles of Compiler Design* (*Red Dragon*), Aho, Sethi, Ullmann). Stack machine codes are also used to some extent (see *Compiler selbstgeschneidert* [Compiler self-tailored] C'T, 1986 1-5). Since the data formats are equivalent in principle and may be transformed into one another, the preferred method according to the present invention is based on further processing of graphs, preferably trees.

Data dependencies and possible parallelisms corresponding to the method described above may be discerned automatically within trees simply on the basis of the structure. To do so, for example, known and established methods of graphic analysis may be used, for example. Alternatively or optionally, an algorithm may be analyzed for data dependencies, loops, jumps, etc. through appropriately adapted parsing methods. A method similar to the method used for analyzing expressions in compilers may be used.

Mapping

Further transformation of the algorithm now depends greatly on the target architecture. For example, the present applicant's processor architecture (VPU, XPP) offers automatic data synchronization in the hardware. This means that the correct chronological sequence of data dependencies is automatically handled in the hardware. Other architectures in some cases additionally require the synthesis of suitable state machines for controlling the data transfer.

Handling of conditional jumps is particularly interesting. For example, the present applicant's processor architecture makes available a plurality of mechanisms for mapping and execution:
1. Reconfiguration of the processor or parts of the processor by a higher-level configuration unit (see, e.g., patent application(s) PACT01, 04, 05, 10, 13, 17)
2. Rolling out the function into the array of PAEs (see, e.g., patent application PACT08), where both possible branches of a comparison are mapped onto the array at the same time, for example.
3. Wave reconfiguration, as described in, e.g., patent application(s) PACT08, 13, 17; a token is attached to the data to be processed differently, and the token selects the particular valid configuration.

It should be pointed out that mechanism number 1 is in general the case typically to be used. Mechanism 2 is already very complex with most technologies or it is not even implementable, and case 3 is so far known only from the VPU technology of the present applicant.

The execution method to be selected in each case will depend on the complexity of the algorithm, the required data throughput (performance) and the precise embodiment of the target processor (e.g., the number of PAEs).

EXAMPLES

A simple comparison should compute the following:

if i < 0 then a=a*(−i) else a=a*i

Reconfiguration of the processor (mechanism 1) depending on the result of the comparison seems to be less appropriate. It is basically possible to roll out both branches into the array (mechanism 2). Depending on the result of the comparison, the PAEs computing either a=a*(−i) or a=a*i are triggered (see PACT08).

It is particularly efficient in terms of space to superimpose the two computations (mechanism 3) so that after the comparison, the same PAEs continue to process the data regardless of the result, but the data is provided with a token which then selects either the function a=a*(−i) or a=a*i locally in the data processing PAEs which follow the latter as a function of the result of the comparison (see, e.g., PACT08, 13, 17).

According to mechanism 1, there is a globally relevant state because the complete subsequent configuration depends on it.

According to mechanisms 2 and 3, there is only a locally relevant state, because it is no longer needed beyond the computation, which is completely implemented.

In other words, the local or global relevance of states may also depend on selected mapping onto the processor architecture.

A state which is relevant beyond a configuration and thus beyond the combinatory network of the finite automaton representing a configuration (i.e., needed by subsequent finite automatons) may basically be considered as global. The diffuse terminology of the term combinatory network as used here should also be pointed out.

Instruction Model of the Resulting Processor

According to the present invention, there is a processor model for reconfigurable processors which includes all the essential instructions:

Arithmetic/logic instructions are mapped directly into the combinatory network.

Jumps (jump/call) are either rolled out directly into the combinatory network or are implemented by reconfiguration.

Condition and control flow instructions (if, etc.) are either completely resolved and processed in the combinatory network or are relayed to a higher-level configuration unit which then executes a reconfiguration according to the resulting status.

Load/store operations are preferably mapped into separate configurations and are implemented by address generators similar to the known DMAs which write internal memories (REG{ }) into external memories by using address generators or which load them from external memories and/or peripherals. However, they may also be configured and operate together with the data processing configuration.

Register move operations are implemented in the combinatory network by buses between the internal memories (REG{ }).

PUSH/POP operations are implemented by separate configurations which optionally write to certain internal registers in the combinatory network and/or the internal memories (REG{ }) via address generators into external memories or read out of external memories and are preferably executed before or after the actual data processing configurations.

5. DESCRIPTION OF THE FIGURES

The following figures show examples of implementation and exemplary embodiments of the compiler.

Figure 1A:
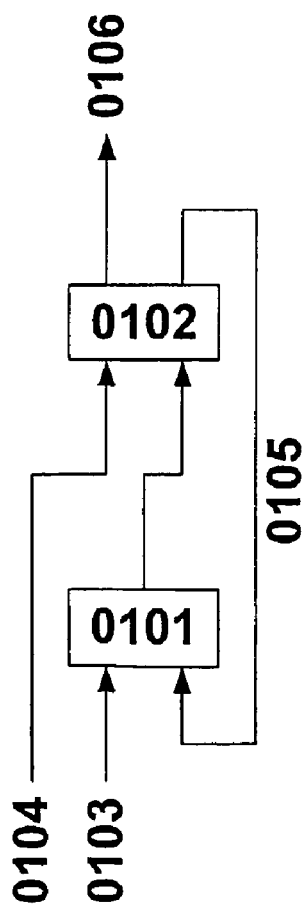
FIG. 1a shows the design of an ordinary finite automaton in which a combinatory network (0101) is linked to a register.

FIG. 1*a* shows the design of an ordinary finite automaton in which a combinatory network (0101) is linked to a register (0102). Data may be sent directly to 0101 (0103) and 0102 (0104). Processing of a state as a function of the preceding state(s) is possible via feedback (0105) from the register to the combinatory network. The processing results are represented by 0106.

Figure 1B:
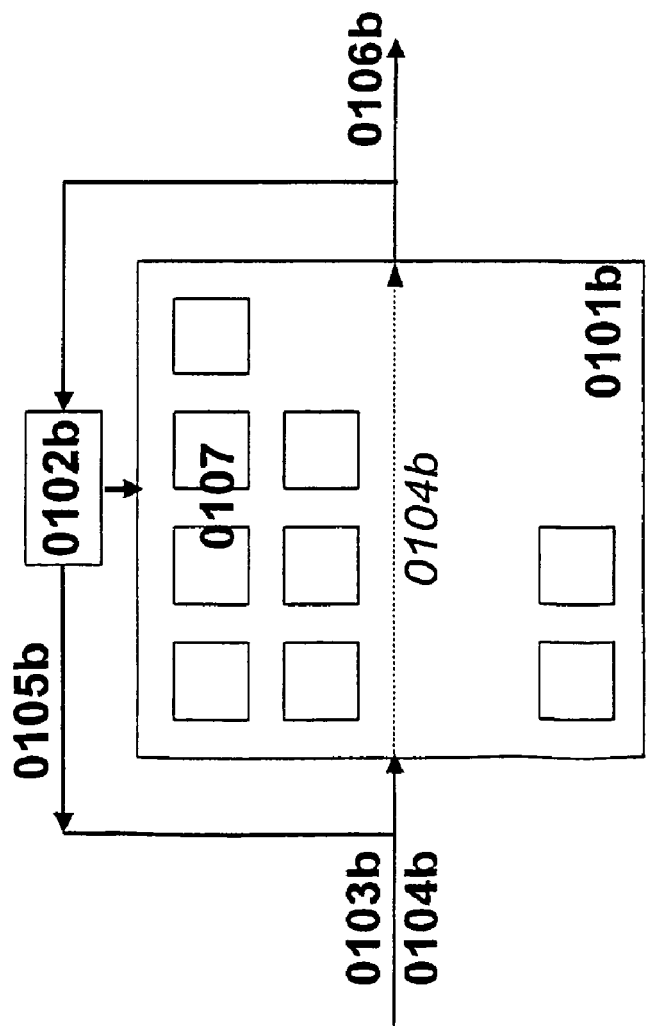
FIG. 1b shows a representation of the finite automaton by a reconfigurable architecture.

FIG. 1*b* shows a representation of the finite automaton by a reconfigurable architecture according to PACT01 and PACT04 (PACT04 FIGS. 12 through 15). The combinatory network from FIG. 1*a* (0101) is replaced (0101*b*) by a system of PAEs 0107. Register (0102) is implemented by a memory (0102*b*) which is capable of storing a plurality of cycles. The feedback according to 0105 takes place via 0105*b*. Inputs (01013*b* and/or 0104*b*) are equivalent to 0103 and 0104, respectively. Direct access to 0102*b* may be implemented via a bus through array 0101*b*, if necessary. Output 0106*b* is in turn equivalent to 0106.

FIG. 2 shows the mapping of a finite automaton onto a reconfigurable architecture. 0201(*x*) represents the combinatory network (which may be designed as PAEs according to FIG. 1*b*). There exist one or more memories for operands (0202) and one or more memories for results (0203). Additional data inputs according to 0103*b*, 0104*b*, 0106*b* are not shown for the sake of simplicity. An address generator (0204, 0205) is assigned to each memory.

Operand and results memories (0202, 0203) are physically or virtually interlinked so that the results of a function and/or an operation may be used as operands for another function and/or operation, for example, and/or both results and newly added operands of one function may be used as operands for another function. Such a linkage may be established, for example, by bus systems or by (re)configuration through which the function and interconnection of the memories with the 0201 is reconfigured.

FIG. 3 shows different aspects for handling variables.

In FIG. 3*a*, 0301, 0302 and 0303 indicate different stages of the computation. These stages may be purely combinatory or they may be separated via registers, where f1, f2, f3 are functions, x1 is a variable according to the patent description.

FIG. 3*b* shows the use of a variable x1 in the function $$x1 := x1 + 1.$$

FIG. 3*c* shows the behavior of a finite automaton for computation of x1:=x1+1 within a configuration. In the next configuration, 0306 and 0304 are to be switched around in order to obtain a complete finite automaton. 0305 represents the address generators for memories 0304 and 0306.

FIG. 4 shows implementations of loops. The modules shown as hatched may be generated by macros (0420, 0421). 0421 may be inserted by analysis of the graph at occurrences of undelayed feedback.

FIG. 4*a* shows the implementation of a simple loop of the type $$\text{WHILE TRUE DO} \\ x1 := x1 + 1;$$

At the core of the loop is counter+1 (0401). 0402 is a multiplexer which at the beginning supplies the starting value of x1 (0403) to 0401 and then causes feedback (0404*a*, 0404*b*) with each iteration. A register (see REG{ }) (0405) is used in the feedback to prevent undelayed and thus uncontrolled feedback of the output of 0401 to its input. 0405 is pulsed with the working clock pulse of the VPU and thus determines the number of iterations per unit of time. The particular count could be picked up at 0404*a* or 0404*b*. Depending on the definition of the high-level language, however, the loop does not terminate. For example, the signal at 0404 would be useful in an HDL (according to the related art (e.g., VHDL, Verilog)), whereas 0404 it is not usable in a sequential programming language (e.g., C) because the loop does not terminate and thus does not yield any exit value.

Multiplexer 0402 implements a macro formed from the loop construct. This macro is instantiated by the translation of WHILE.

Register 0405 is either also part of the macro or is inserted according to a graphic analysis according to the related art exactly at the location and time where there is undelayed feedback in order to thus suppress the vibration tendency.

FIG. 4*b* shows the design of a true loop of the type $$\text{WHILE x1 < 10 DO} \\ x1 := x1 + 1;$$

This design corresponds essentially to FIG. 4*a*, which is why the same references have been used.

In addition, a circuit is shown which checks on the validity of the results (0410) and relays the signal of 0404*a* to the downstream functions (0411) only when the abortion criterion of the loop has been reached. The abortion criterion is determined by the comparison x1<10 (comparison stage 0412). As a result of the comparison, the particular status flag (0413) is sent to a multiplier means 0402 for controlling the loop and functions 0411 for controlling the forwarding of results. Status flag 0413 may be implemented, for example, by triggers described in German Patent Application No. DE 197 04 728.9. Likewise, status flag means 0413 may be sent to a CT which then recognizes that the loop has been terminated and performs a reconfiguration.

Figure 5A:
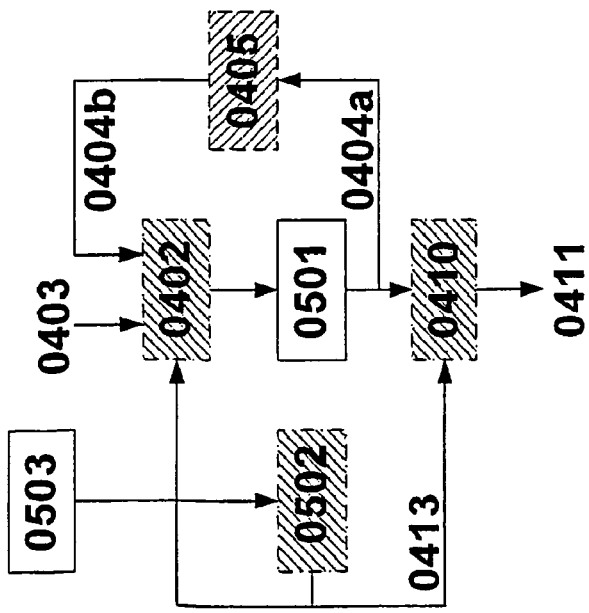

FIG. 5*a* shows the iterative computation of $$\text{FOR i:=1 TO 10} \\ x1 := x1 * x1;$$

The basic function corresponds to that in FIG. 4*b*, which is why the same references have also been used here. Function block 0501 computes the multiplication. The FOR loop is then implemented by another loop according to FIG. 4*b* and is indicated only by block 0503. Block 0503 supplies the status of the comparison to the abortion criterion. The status is used directly for triggering the iteration, thus largely eliminating means 0412 (represented by 0502).

FIG. 5*b* shows the rolling out of the computation of $$\text{FOR i :=1 TO 10} \\ x1 := x1 * x1;$$

Since the number of iterations at translation time is known exactly, the computation may be mapped into a sequence of i multipliers (0510).

FIG. 6 shows the execution of a WHILE loop according to FIG. 4*b* over several configurations. The state of the loop (0601) here is a relevant state because it has a significant influence on the function in the subsequent configurations. The computation extends over four configurations (0602,

0603, 0604, 0605). Between the configurations, the data is filed in memories (see REG{ }) (0606, 0607). 0607 also replaces 0405.

The filling level of the memories may be used as a reconfiguration criterion as indicated via 0606, 0607: memory full/empty and/or 0601 which indicates abortion of the loop. In other words, the filling level of the memories generates triggers (see, e.g., PACT01, PACT05, PACT08, PACT10) which are sent to the configuration unit and trigger a reconfiguration. The state of the loop (0601) may also be sent to the CT. The CT may then configure the subsequent algorithms on reaching the abortion criterion and/or may first process the remaining parts of the loop (0603, 0604, 0605) and then load the subsequent configurations.

6. PARALLELIZABILITY

FIG. 6 shows potential limits to parallelizability.

If computation of the operands is independent of feedback 0608, the loop may be computed in blocks, i.e., by filling memories 0606/0607 each time. This achieves a high degree of parallelism.

If computation of an operand depends on the result of the previous computation, i.e., feedback 0608 or the like enters into the computation, the method is less efficient because it is possible to compute only one operand within the loop.

If the usable ILP (instruction level parallelism) within the loop is high and the time for reconfiguration is short (see, e.g., PACT02, PACT04, PACT13, PACT17), a computation rolled out on PAEs may also be efficient on a VPU.

If this is not the case, it is appropriate to map the loop onto a sequential architecture (processor separate from the PA or implementation within the PA described in DE 196 51 075.9-53, DE 196 54 846.2-53, and in particular DE 199 26 538.0 (FIGS. 5, 11, 16, 17, 23, 30, 31, 33)).

Analysis of the computation times may be performed in the compiler at translation time according to the following section and/or it may be measured empirically at run time or at a run time to induce a subsequent optimization, which results in a compiler capable of learning, in particular a self-learning compiler.

Analytical methods and parallelization methods are important for the present invention.

Various methods according to the related art are available for analysis and implementation of the parallelization.

A preferred method is described below.

Functions to be mapped are represented by graphs (see, e.g., PACT13; DE 199 26 538.0); an application may be composed of any number of different functions. The graphs are analyzed for the parallelism they contain; all optimization methods may be used in advance.

For example, the following tests are to be performed:
6.0.1 ILP (Instruction Level Parallelism)

ILP expresses which instructions may be executed simultaneously (see PAR{ }). Such an analysis is easily possible on the basis of the consideration of dependencies of nodes in a graph. Similar methods are known sufficiently well from the related art and mathematics per se, and reference shall be made to VLIW compilers and synthesis tools as examples.

However, conditional, possibly nested, executions (IF), for example, deserve special attention because a correct statement regarding the paths to be executed simultaneously is often impossible or hardly possible because there is a strong dependence on the value space of the individual parameters, which is often known only inadequately or not at all. Furthermore, an exact analysis may take so much computation time that it may no longer be reasonably performed.

In such cases, the analysis may be simplified by instructions from the programmer, for example, and/or it is possible to operate on the basis of corresponding compiler switches so that in case of doubt either high parallelizability is to be assumed (possibly squandering resources) or low parallelizability is to be assumed (possibly squandering performance).

In these cases, an empirical analysis may also be performed at run time. PACT10, PACT17, described methods which make it possible to compile statistics regarding the program behavior at run time. It is thus possible to initially assume maximum parallelizability, for example. The individual paths return messages to a statistics unit (e.g., implemented in a CT or some other stage, see, e.g., PACT10, PACT17, but basically also units according to PACT04 may be used) regarding each run cycle. Using statistical measures, it is now possible to analyze which paths are actually run through simultaneously. In addition, there is also the possibility of evaluating which paths are run through simultaneously frequently or rarely or never, based on the data at run time. This type of path usage message is not obligatory but is advantageous.

Accordingly, the execution may be optimized in a next program call. It should be pointed out that the statistics information may not be written away in particular in a nonvolatile manner as on a hard drive. PACT22, PACT24 described that either a plurality of configurations may be configured simultaneously and then triggered by triggers (PACT08) or only a subset may be configured, the remaining configurations being loaded subsequently as necessary by sending the corresponding triggers to a loading unit (CT, PACT10).

Value PAR(p) which is used below indicates for the purpose of clarification which parallelism is achievable on an instruction level, i.e., how many ILPs may be achieved at a certain stage (p) within the data flow graph transformed from the function (FIG. 7*a*).

Vector parallelism is also significant (see VEC{ }). Vector parallelism is useful when large volumes of data must be processed. In this case, linear sequences of operations are vectorizable, i.e., all operations may process data at the same time, typically with each separate operation processing a separate data word.

Within loops, this procedure may be impossible to some extent. Analyses and optimizations are therefore necessary. For example, the graph of a function may be expressed by a Petri network. Petri networks have the property that forwarding of results is controlled by nodes so that loops may be modeled, for example. Data throughput is determined by the feedback of the result in a loop. Examples:

The result of computation n is needed for computation n+1: only one computation may be executed within the loop.

The result of computation n is needed for computation n+m: m−1 computations may be executed within the loop.

The result determines the abort of the loop, but it does not enter into the computation of the results: no feedback is necessary. Although incorrect values (too many values) enter the loop under some circumstances, the output of results may be interrupted directly on reaching the end condition at the end of the loop.

Before the analysis of loops, they may be optimized according to the related art. For example, certain instructions may be extracted from the loop and placed before or after the loop.

Value VEC which is used below for clarification may illustrate the degree of vectorizability of a function. In other words, VEC indicates how many data words may be processed simultaneously within a set of operations. For example, VEC may be computed from the number of required arithmetic means for a function $n_{nodes}$ and data $n_{data}$ calculable within the vector at the same time, e.g., by VEC=$n_{nodes}/n_{data}$.

If a function may be mapped onto five arithmetic means ($n_{nodes}$=5), for example, and if data may be processed at the same time in each of the arithmetic means ($n_{data}$=5), then VEC=1 (FIG. 7b).

However, if a function may be mapped onto five arithmetic means ($n_{nodes}$=5) and data may be processed in only one arithmetic means, e.g., based on feedback of the results of the pipeline back to the input ($n_{data}$=5), then VEC=⅕ (FIG. 7c).

VEC may be computed for an entire function and/or for partial sections of a function. For the compiler according to the present invention, both variants may be advantageous, as is the case in general for determination and analysis of VEC.

According to FIG. 7a, PAR(p) is determined for each line of a graph, as is possible in an advantageous manner. A line of a graph is defined by being executed within one clock unit. The number of operations depends on the implementation of the particular VPU.

If PAR(p) corresponds to the number of nodes in line p, then all the nodes may be executed simultaneously.

If PAR(p) is smaller, certain nodes are executed only alternatively. The alternative executions of one node are each combined in one PAE. A selection device permits activation of the alternative corresponding to the status of data processing at run time as described in PACT08, for example.

VEC is also assigned to each line of a graph. If VEC=1 for one line, this means that the line remains as a pipeline stage. If one line is less than 1, then all the following lines which are also less than 1 are combined because pipelining is impossible. They are combined according to the sequence of operations to yield a sequence which is then configured into a PAE and is processed sequentially at run time. Similar methods are described in PCT/DE 97/02949 and/or PCT/DE 97/02998, for example.

Using the method described here, any complex parallel processor models may be constructed by groups of sequencers. In particular, sequencer structures may be generated for mapping reentrant code.

The synchronizations required to accomplish this may be implemented, for example, by the time stamp method described in PACT18 or preferably by the triggering method described in PACT08.

If a plurality of sequencers or sequential parts is mapped onto a PA, then it is preferable to coordinate the power of individual sequencers for power consumption reasons. This may be accomplished in a particularly preferable manner by adapting the working frequencies of the sequencers to one another. For example, methods which allow individual clocking of individual PAEs or groups of PAEs are described in PACT25 and PACT18.

The frequency of a sequencer may be determined on the basis of the number of cycles typically needed for processing the function assigned to it.

For example, if it needs five clock cycles for processing its function while the remaining system needs exactly one clock cycle to process assigned tasks, then its clocking should be five times faster than the clocking of the remaining system. In the case of a plurality of sequencers, different clock cycles are possible. A clock multiplication and/or a clock division may also be provided.

Functions are partitioned according to the aforementioned method. In partitioning, memories for data and relevant status are inserted accordingly. Additional alternative and/or extended methods are described in PACT13 and PACT18.

According to PACT01, PACT10, PACT13, PACT17, PACT22, PACT24, some VPUs offer the possibility of differential reconfiguration. This may be used if only relatively few changes are necessary within the system of PAEs in a reconfiguration. In other words, only the changes in a configuration in comparison with the existing configuration are reconfigured. Partitioning in this case may be such that the (differential) configuration following a configuration contains only the required reconfiguration data and does not constitute a complete configuration. The compiler of the present invention is preferably designed to recognize and support this.

Scheduling of the reconfiguration may be performed through the status which reports function(s) to a loading unit (CT) which in turn selects on the basis of the incoming status the next configuration or partial configuration and configures it. Such methods are described in detail in PACT01, PACT05, PACT10, PACT13, PACT17.

In addition, scheduling may support the possibility of preloading configurations during the run time of another configuration. A plurality of configurations may also be preloaded speculatively, i.e., without knowing whether the configurations are needed at all. This is preferred in particular when the CT is at least largely without load and in particular has little or no task load, e.g., in the case of lengthy data streams that are processable without configuration. Due to the selection mechanisms such as those described in DE 197 04 728.9, for example, the configurations to be used are then selected at run time (see also example NLS in PACT22/24).

The local sequencers may likewise be controlled by the status of their data processing as is known, for example, from DE 196 51 075.9-53, DE 196 54 846.2-53, DE 199 26 538.0. To perform their reconfiguration, another dependent or independent status may be reported to the CT (see PACT04, LLBACK, for example).

The present invention will now be described with reference to additional figures, the following characters being used below to simplify the notation: $\vee$ or, $\wedge$ and.

FIG. 8a shows the graph according to FIG. 7a mapped on a group of PAEs at maximum achievable parallelism. All operations (instructions i1-i12) are mapped into individual PAEs.

FIG. 8b shows the same graphs, e.g., with maximum usable vectorizability, but the sets of operations V2={i1, i3}, V3={i4, i5, i6, i7, i8}, V4={i9, i10, i11} are not parallel par (par({2,3,4})=1). This makes it possible to save on resources by assigning one set P2, P3, P4 of operations to one PAE each time. A status signal for each data word in each stage selects the operation to be executed in the particular PAE. The PAEs are interconnected as a pipeline (vector) and each PAE executes one operation on a different data word per each clock cycle.

This yields the following sequence:

PAE1 computes data and sends it to PAE2. Together with the data, it forwards a status signal which indicates whether i1 or i2 is to be executed.

PAE2 continues to compute the data of PAE1. The operation to be executed (i1, i2) is selected and computed according to the incoming status signal. According to the computation, PAE2 forwards a status signal to PAE3, indicating whether (i4 $\vee$ i5) $\vee$ (i6 $\vee$ i7 $\vee$ i8) is to be executed.

PAE3 continues to compute the data of PAE2. The operation to be executed (i4 $\vee$ i5) $\vee$ (i6 $\vee$ i7 $\vee$ i8) is selected and computed according to the incoming status signal. As a result of the computation, PAE3 forwards a status signal to PAE4, indicating whether i9 $\vee$ i10 $\vee$ i11 is to be executed.

PAE4 continues to compute the data of PAE3. The operation to be executed ($i9 \vee i10 \vee i11$) is selected and computed according to the incoming status signal.

PAE5 continues to compute the data of PAE4.

One possible similar method and hardware which allow a particularly favorable implementation of the method described here are described in DE 197 04 728.9 (FIGS. 5 and 6). PACT04 and PACT10, PACT13 also describe methods that may be used in general but are more complex.

FIG. 8c again shows the same graph. In this example, vectorization is impossible but PAR(p) is high, which means that a plurality of operations may be executed within one line at the same time. The operations to be implemented in parallel are P2={$i1 \wedge i2$}, P3={$i4 \wedge i5 \wedge i6 \wedge i7 \wedge i8$}, P4={$i9 \wedge i10 \wedge i11$}. The PAEs are interconnected so that they may exchange any data among themselves in any way. The individual PAEs perform operations only when there is an ILP in the corresponding cycle; otherwise they behave neutrally (NOP), and there may optionally be a clocking down and/or a clock shutdown and/or a current shutdown to minimize power loss.

The following sequence is provided:

In the first cycle, only PAE2 operates and forwards data to PAE2 and PAE3.

In the second cycle, PAE2 and PAE3 are operating in parallel and forward data to PAE1, PAE2, PAE3, PAE4, PAE5.

In the third cycle, PAE1, PAE2, PAE3, PAE4 and PAE5 are operating and forward data to PAE2, PAE3 and PAE5.

In the fourth cycle, PAE2, PAE3 and PAE5 are operating and forward data to PAE2.

In the fifth cycle, only PAE2 is operating.

This function thus requires five cycles for the computation. The corresponding sequencer should thus operate with a five-fold clock cycle in relation to its environment in order to achieve a similar performance.

A possible similar method is described in PACT02 (FIGS. 19, 20 and 21). PACT04 and PACT10, PACT13 also describe methods that may be used in general but are more complex. Additional methods and/or hardware may also be used.

FIG. 8d shows the graphs according to FIG. 7a in the case where there is no usable parallelism. To compute a data word, each stage must be run through in succession. Within the stages only one of the branches is always processed.

The function also requires five cycles for the computation: cy1=(i1), cy2=($i2 \vee i3$), cy3=($i4 \vee i5 \vee i6 \vee i7 \vee i8$), cy4=($i9 \vee i10 \vee i11$), cy5=(i12). Thus the corresponding sequencer should work with a clock cycle five times faster in relation to its environment to achieve a similar performance.

Such a function is mappable, for example, as in FIG. 8c by using a simpler sequencer according to PACT02 (FIGS. 19, 20 and 21). PACT04 and PACT10, 13 also describe methods that may be used in general but are more complex.

The illustrations represented in FIG. 8 may be combined and grouped at will.

In FIG. 9a, for example, the same function is shown in which the paths ($i2 \wedge (i4 \vee i5) \wedge i9$) and ($i3 \wedge (i6 \vee i7 \vee i8) \wedge (i9 \vee i10)$) are executable simultaneously. ($i4 \vee i5$), ($i6 \vee i7 \vee i8$), ($i9 \vee i10$) are each alternatives. The function is also vectorizable. It is thus possible to construct a pipeline in which the particular function to be executed is determined on the basis of status signals for three PAEs (PAE4, PAE5, PAE7).

FIG. 9b shows a similar example in which vectorization is impossible. However, the paths ($i1 \wedge i2 \wedge (i4 \vee i5) \wedge i9 \wedge i12$) and ($i3 \wedge (i6 \vee i7 \vee i8) \wedge (i10 \vee i11)$) are parallel. Optimum performance may thus be achieved by using two PAEs which also process the parallel paths simultaneously. The PAEs are synchronized with one another by status signals which are generated preferably by PAE1 because it computes the start (i1) and the end (i12) of the function.

It should be pointed out in particular that a symmetrically parallel processor model (SMP) or the like could yield the multiprocessor models in use today by a multiple array of sequencers.

It should also be pointed out that all configuration registers for scheduling may also be loaded with new configurations in the background and/or during data processing.

This is possible if the hardware has the design described in DE 196 51 075.9-53, for example. Independent memory areas or registers are then available and may be addressed independently. It is possible to jump to certain locations due to incoming triggers; jump instructions (JMP, CALL/RET) are also possible and may also be executed conditionally, if necessary.

As described in DE 196 54 846.2-53, independent read and write pointers are available, so that basically there is independence and thus the possibility of access in the background. In particular, it is possible to partition the memories, thus providing additional independence. Jumps are possible via jump instructions (JMP, CALL/RET) which may also be executed conditionally if necessary.

As described in DE 197 04 728.9, the individual registers which may be selected by the triggers are basically independent and therefore allow independent configuration in particular in the background. Jumps within the register are not possible, and selection is made exclusively via the trigger vectors.

An important factor for evaluating the efficiency of PAR and VEC may be the type of data processed by the particular structure. For example, it is worthwhile to roll out a structure, i.e., to pipeline or parallelize a structure which processes a large volume of data, as is the case with video data or telecommunications data, for example. It is not worthwhile to roll out structures which process low data volumes (e.g., keyboard input, mouse, etc.); on the contrary, they would block resources for other algorithms.

Thus it is proposed that only the algorithms, structures or parts of algorithms which appropriately process large volumes of data shall be parallelized and vectorized on the basis of different instructions.

Such instructions might be, for example:

1. The data type (on the basis of the higher data volume, arrays, streams should be rolled out with preference over individual characters, for example).
2. The type of access (linear program sequences should be mapped into sequencers, for example, whereas it is worthwhile to roll out loops because of the high number of runs, for example).
3. The type of source and/or the target (keyboard and mouse, for example, have a data rate that is too low to be rolled out efficiently, but the data rate of a network, for example, and/or video sources or targets is much higher).

Any set of these instructions may be used for analysis.

7. DEFINITION OF TERMS

| | |
|---|---|
| locally relevant state | state that is relevant only within a certain configuration; |
| globally relevant state | state that is relevant in multiple configurations and must be exchanged among configurations; |

-continued

| | |
|---|---|
| relevant state | state that is needed within an algorithm for correct execution thereof and is thus described and used by the algorithm; |
| irrelevant state | state that is not important for the actual algorithm and is also not described in the algorithm but is needed by the executing hardware, depending on the implementation. |

What is claimed is:

1. A method of translating high-level language code into a plurality of executable configuration definitions for data processing on a reconfigurable processor chip that includes an arrangement including (a) a plurality of configurable elements, (b) a configurable interconnect adapted for interconnecting the plurality of configurable elements, and (c) memories, wherein memories are also provided external to said arrangement, the method comprising:
constructing a finite automaton for computation in such a way that a complex combinatory network of individual functions is formed;
assigning memories to the complex combinatory network for storage of operand data and result data; and
generating, by a computer processor, the plurality of executable configuration definitions based on the finite automaton and the memory assignments;
wherein the plurality of executable configuration definitions define (a) configurations of at least one of the configurable interconnect and the plurality of configurable elements for performing the computation, and (b) configurations of the at least one of the configurable interconnect and the plurality of configurable elements for external memory accesses for providing a transfer of at least one of the operand data and result data as data from an external memory to a memory of said arrangement, the configurations for performing the computation being separate from the configurations for external memory accesses such that the configurations for performing the computation and the configurations for external memory accesses are scheduled for execution on the processor chip at different times.

2. The method as recited in claim 1 wherein, of a plurality of ways in which to at least one of construct and break down the complex combinatory network, a way that provides for operation of the reconfigurable architecture for a longest possible period of time without reconfiguration compared to the other ways is selected.

3. The method as recited in claim 1, further comprising:
determining complex instructions to one of construct and break down the complex combinatory network according to one of a plurality of ways that provides for the reconfigurable architecture to be operated for a longest possible period of time without reconfiguration compared to the others of the plurality of ways.

4. The method as recited in claim 1, wherein the finite automaton is constructed directly from imperative source text.

5. The method as recited in claim 1, wherein the finite automaton is constructed from operations adapted to at least one of coarse-grained logic circuits and existing fine-grained elements.

6. The method as recited in claim 5, wherein the fine-grained elements include at least one of Field Programmable Gate Array (FPGA) cells and state machines.

7. The method as recited in claim 1, further comprising:
breaking down the finite automaton into the plurality of executable configuration definitions.

8. The method as recited in claim 1, further comprising:
executing the executable configuration definitions by successively configuring the reconfigurable architecture according to the plurality of executable configuration definitions; and
filing at least one of operating data and states, that are to be transmitted between the executed configuration definitions, in a memory.

9. The method as recited in claim 8, wherein the memory among which the at least one of operating data and states is filed is at least one of provided and determined by the compiler.

10. The method as recited in claim 8, wherein during processing by the configurable elements configured according to a configuration definition, data from at least one of an external source of the reconfigurable architecture and a memory of the arrangement is processed and written to at least one of an external source and a memory of the arrangement.

11. The method as recited in claim 1, further comprising:
providing a memory for an entire data record which is more extensive than a single data word.

12. The method as recited in claim 11, wherein data is filed in the memory for said entire data record as determined by the compiler during processing by the configurable elements configured according to a configuration definition.

13. The method as recited in claim 1, further comprising:
providing a memory for operand data, a memory for result data and a network of at least one of assignments and comparison instructions, with the automaton.

14. The method as recited in claim 13, wherein the comparison instructions include at least one high level language instruction selected from a group including an IF instruction, a CASE instruction, a WHILE instruction, a FOR instruction, and a REPEAT instruction.

15. The method according to claim 13, further comprising:
providing with the automaton an address generator for triggering the memory provided for the operand data.

16. The method as recited in claim 1, wherein states are assigned to memories, a distinction being made between algorithmically relevant and irrelevant states, the relevant states including those states which are necessary within an algorithm to describe its correct function, and the irrelevant states including those which occur due to at least one of hardware used, a selected mapping, and other secondary reasons.

17. The method as recited in claim 1, further comprising:
providing LOAD/STORE operations including data transfers with external modules, and data transfers between processing elements of the reconfigurable architecture.

18. The method as recited in claim 17, wherein the LOAD/STORE operations include data transfers between Random Access Memory (RAM) elements and Arithmetic Logic Unit (ALU) processing elements.

19. The method as recited in claim 1, further comprising:
removing a first configuration during data processing, wherein data to be saved remains in corresponding memories.

20. The method as recited in claim 19, further comprising:
reloading the first configuration and accessing previously saved data assigned to it.

21. The method as recited in claim 19, further comprising:
loading a second configuration for access to previously saved data, the second configuration connecting registers to at least one of global memories to access the global memory using address generators, the address generator generating addresses for the global memory, so that memory areas may be unambiguously assigned to the first configuration removed.

22. The method as recited in claim 1, further comprising: automatically performing a transformation to represent at least one of a parallelizability and a vectorizability of the configurable architecture.

23. The method as recited in claim 1, wherein arithmetic/logic instructions are mapped directly into the combinatory network.

24. The method as recited in claim 1, wherein jump instructions are rolled out directly into the combinatory network.

25. The method as recited in claim 1, wherein jump instructions are implemented by reconfiguration.

26. The method as recited in claim 1, wherein condition and control flow instructions are completely resolved in the combinatory network.

27. The method as recited in claim 1, wherein condition and control flow instructions are processed in the combinatory network.

28. The method as recited in claim 1, wherein condition and control flow instructions are relayed to a higher-level configuration unit which performs a reconfiguration accounting to a resulting status.

29. The method as recited in claim 1, wherein LOAD/STORE instructions are mapped into separate configurations.

30. The method as recited in claim 1, wherein LOAD/STORE instructions are implemented by address generators which write data from memories of said arrangement to external memories via address generator.

31. The method as recited in claim 1, wherein LOAD/STORE operations are implemented by address generators which load memories of said arrangement from at least one of external memories, and an external peripheral device.

32. The method as recited in claim 1, wherein register move operations are implemented in the combinatory network by buses between memories of said arrangement.

33. The method as recited in claim 1, wherein PUSH/POP operations are implemented using separate configurations by which to write to internal registers in the combinatory network.

34. The method as recited in claim 1, wherein PUSH/POP operations are implemented using separate configurations by which to write data for memories of said arrangement to external memories via address generators.

35. The method of claim 1, wherein the configurations defined by the executable configuration definitions are executed sequentially one after another, each of the executions providing a respective reconfiguration of the at least one of the configurable interconnect and the plurality of configurable elements.

36. The method as recited in claim 1, wherein the configurable interconnect is further adapted for interconnecting the plurality of configurable elements with the memories of the arrangement.

37. A method of enabling processing of data according to a high-level language code for data processing on a reconfigurable processor chip that includes an arrangement including (a) a plurality of configurable elements, (b) a configurable interconnect adapted for interconnecting the plurality of configurable elements, and (c) memories, wherein memories are also provided external to said arrangement, the method comprising:
based on the high-level language code, constructing a finite automaton for computation in such a way that a complex combinatory network of individual functions is formed;
assigning memories to the complex combinatory network for storage of operand data and result data; and
generating, by a computer processor, a plurality of executable configuration definitions based on the finite automaton and the memory assignments, the configuration definitions defining (a) configurations of at least one of the configurable interconnect and the plurality of configurable elements for transferring processing data between an external memory and a memory of said arrangement, and (b) configurations of the at least one of the configurable interconnect and the plurality of configurable elements for performing functions defined by said high-level language code, wherein the configurations for transferring processing data are separate from the configurations for performing functions, such that the configurations for transferring processing data and the configurations for performing functions are scheduled for execution on the processor chip at different times.

38. The method as recited in claim 37, further comprising: providing a memory for an entire data record which is more extensive than a single data word.

39. The method as recited in claim 38, wherein data is filed in memory as determined by a compiler during processing by the configurable elements configured according to a configuration definition.

40. The method as recited in claim 37, further comprising: providing a memory for operands, a memory for results and a network of at least one of assignments and comparison instructions.

41. The method as recited in claim 40, wherein the comparison instructions include at least one high level language instruction selected from a group including an IF instruction, a CASE instruction, a WHILE instruction, a FOR instruction, and a REPEAT instruction.

42. The method according to claim 41, further comprising: providing an address generator for triggering memory.

43. The method as recited in claim 37, wherein states are assigned to memories, a distinction being made between algorithmically relevant and irrelevant states, the relevant states including those states which are necessary within an algorithm to describe its correct function, and the irrelevant states including those which occur due to at least one of hardware used, a selected mapping, and other secondary reasons.

44. The method as recited in claim 37, further comprising: providing LOAD/STORE operations including data transfers with external modules, and data transfers between processing elements of the reconfigurable architecture.

45. The method as recited in claim 44, wherein the LOAD/STORE operations include data transfers between Random Access Memory (RAM) elements and Arithmetic Logic Unit (ALU) processing elements.

46. The method as recited in claim 37, further comprising: removing a first configuration during data processing, wherein data to be saved remains in corresponding memories.

47. The method as recited in claim 46, further comprising: reloading the first configuration and accessing previously saved data assigned to it.

48. The method as recited in claim 46, further comprising: loading a second configuration for access to previously saved data, the second configuration connecting registers to at least one global memory to access the global memory using address generators, the address generator generating addresses for the global memory, so that memory areas may be unambiguously assigned to the first configuration removed.

49. The method as recited in claim 37, further comprising: automatically performing a transformation to represent at least one of a parallelizability and a vectorizability of the configurable architecture.

50. The method as recited in claim 37, wherein jump instructions are implemented by reconfiguration.

51. The method as recited in claim 37, wherein condition and control flow instructions are relayed to a higher-level configuration unit which performs a reconfiguration accounting to a resulting status.

52. The method as recited in claim 37, wherein LOAD/STORE instructions are mapped into separate configurations.

53. The method as recited in claim 37, wherein LOAD/STORE instructions are implemented by address generators which write data from memories of said arrangement to external memories via address generator.

54. The method as recited in claim 37, wherein LOAD/STORE operations are implemented by address generators which load memories of said arrangement from at least one of external memories, and an external peripheral device.

55. The method as recited in claim 37, wherein register move operations are implemented in the combinatory network by buses between memories of said arrangement.

56. The method as recited in claim 37, wherein PUSH/POP operations are implemented using separate configurations by which to write data for memories of said arrangement to external memories via address generators.

57. The method of claim 37, wherein the configurations defined by the executable configuration definitions are executed sequentially one after another, each of the executions providing a respective reconfiguration of the at least one of the configurable interconnect and the plurality of configurable elements.

58. The method as recited in claim 37, wherein the configurable interconnect is further adapted for interconnecting the plurality of configurable elements with the memories of the arrangement.

59. A method of executing code for data processing on a reconfigurable processor chip that includes an arrangement including (a) a plurality of configurable elements, (b) a configurable interconnect adapted for interconnecting the plurality of configurable elements, and (c) memories, wherein memories are also provided external to said arrangement, the method comprising:
generating, by a computer processor, a first executable configuration definition that defines a configuration of at least one of the configurable interconnect and the plurality of configurable elements for performing individual functions on the reconfigurable processor chip using memories assigned for storage of operand data and result data, performance of the individual functions including addressing part of the memories assigned for storage of operand data and result data internally from within said arrangement;
generating, by the processor, a second executable configuration definition that defines a configuration of at least one of the configurable interconnect and plurality of configurable elements for external memory accesses to transfer processing data between an external memory and a memory of said arrangement;
scheduling executions of the configurations defined by the first and second executable configuration definitions for performance at different times;
performing the individual functions using the processor chip configured according to the configuration defined by the first executable configuration definition until a time period scheduled for the configuration of the second executable configuration definition; and
at the time scheduled for the configuration of the second executable configuration definition, reconfiguring the processor chip from the configuration defined by the first executable configuration definition to the configuration defined by the second executable configuration definition.

60. The method as recited in claim 59, further comprising: providing a memory for an entire data record which is more extensive than a single data word.

61. The method as recited in claim 60, wherein data is filed in memory as determined by a compiler during processing by the configurable elements according to a configuration definition.

62. The method as recited in claim 59, wherein a memory for operand data, a memory for result data and a network of at least one of assignments and comparison instructions are provided.

63. The method as recited in claim 62, wherein the comparison instructions include at least one high level language instruction selected from a group including an IF instruction, a CASE instruction, a WHILE instruction, a FOR instruction, and a REPEAT instruction.

64. The method according to claim 63, further comprising: providing an address generator for triggering memory.

65. The method as recited in claim 59, wherein states are assigned to memories, a distinction being made between algorithmically relevant and irrelevant states, the relevant states including those states which are necessary within an algorithm to describe its correct function, and the irrelevant states including those which occur due to at least one of hardware used, a selected mapping, and other secondary reasons.

66. The method as recited in claim 59, further comprising: providing LOAD/STORE operations including data transfers with external modules, and data transfers between processing elements of the reconfigurable architecture.

67. The method as recited in claim 66, wherein the LOAD/STORE operations include data transfers between Random Access Memory (RAM) elements and Arithmetic Logic Unit (ALU) processing elements.

68. The method as recited in claim 59, further comprising: removing a first configuration during data processing, wherein data to be saved remains in corresponding memories.

69. The method as recited in claim 68, further comprising: reloading the first configuration and accessing previously saved data assigned to it.

70. The method as recited in claim 68, further comprising: loading a second configuration for access to previously saved data, the second configuration connecting registers to at least one global memory to access the global memory using address generators, the address generator generating addresses for the global memory, so that memory areas may be unambiguously assigned to the first configuration removed.

71. The method as recited in claim 59, further comprising: automatically performing a transformation to represent at least one of a parallelizability and a vectorizability of the configurable architecture.

72. The method as recited in claim 59, wherein jump instructions are implemented by reconfiguration.

73. The method as recited in claim 59, wherein condition and control flow instructions are relayed to a higher-level configuration unit which performs a reconfiguration accounting to a resulting status.

74. The method as recited in claim 59, wherein LOAD/STORE instructions are mapped into separate configurations.

75. The method as recited in claim 59, wherein LOAD/STORE instructions are implemented by address generators which write data from memories of said arrangement to external memories via address generator.

76. The method as recited in claim 59, wherein LOAD/STORE operations are implemented by address generators which load memories of said arrangement from at least one of external memories, and an external peripheral device.

77. The method as recited in claim 59, wherein register move operations are implemented in the combinatory network by buses between memories of said arrangement.

78. The method as recited in claim 59, wherein PUSH/POP operations are implemented using separate configurations by which to transfer data for memories of said arrangement to external memories via address generators.

79. The method of claim 59, wherein the configurations defined by the executable configuration definitions are executed sequentially one after another, each of the executions providing a respective reconfiguration of the at least one of the configurable interconnect and the plurality of configurable elements.

80. The method as recited in claim 59, wherein the configurable interconnect is further adapted for interconnecting the plurality of configurable elements with the memories of the arrangement.

* * * * *